(12) United States Patent
Tian et al.

(10) Patent No.: US 12,069,357 B2
(45) Date of Patent: Aug. 20, 2024

(54) CAMERA MODULE WITH FIXED LENSES AND ELECTRONIC DEVICE

(71) Applicant: Honor Device Co., Ltd., Shenzhen (CN)

(72) Inventors: Jiyuan Tian, Shenzhen (CN); Guoliang Huo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 289 days.

(21) Appl. No.: 17/604,888

(22) PCT Filed: May 9, 2020

(86) PCT No.: PCT/CN2020/089477
§ 371 (c)(1),
(2) Date: Oct. 19, 2021

(87) PCT Pub. No.: WO2020/228648
PCT Pub. Date: Nov. 19, 2020

(65) Prior Publication Data
US 2022/0217253 A1   Jul. 7, 2022

(30) Foreign Application Priority Data

May 10, 2019   (CN) .......................... 201910387745.0
Aug. 12, 2019   (CN) .......................... 201910738974.2

(51) Int. Cl.
| | |
|---|---|
| *H04N 23/55* | (2023.01) |
| *G02B 7/02* | (2021.01) |
| *G02B 27/64* | (2006.01) |
| *H04N 23/51* | (2023.01) |
| *H04N 23/54* | (2023.01) |

(52) U.S. Cl.
CPC ............. *H04N 23/55* (2023.01); *G02B 7/022* (2013.01); *G02B 27/646* (2013.01); *H04N 23/51* (2023.01); *H04N 23/54* (2023.01)

(58) Field of Classification Search
CPC ........ H04N 23/55; H04N 23/51; H04N 23/54; H04N 23/632; H04N 23/633; H04N 23/687; H04N 23/57; H04N 23/50; H04N 23/62; H04N 23/667; H04N 23/67; H04N 23/90; G02B 7/022; G02B 27/646; G02B 7/004;
(Continued)

(56) References Cited

U.S. PATENT DOCUMENTS

| | | |
|---|---|---|
| 5,986,254 A | 11/1999 | Tsai |
| 7,493,032 B2 | 2/2009 | Chang |

(Continued)

FOREIGN PATENT DOCUMENTS

| | | |
|---|---|---|
| CN | 2757153 Y | 2/2006 |
| CN | 1837880 A | 9/2006 |

(Continued)

*Primary Examiner* — Padma Haliyur
(74) *Attorney, Agent, or Firm* — Conley Rose, P.C.

(57) ABSTRACT

A camera module includes a lens group, an image sensor, a reflective member, and a driving assembly. The lens group includes a plurality of lenses, the reflective member is configured to reflect, to the image sensor, light rays focused by at least one of the plurality of lenses, and the driving assembly is configured to drive the reflective member to move. An electronic device includes the camera module mounted on a housing.

20 Claims, 46 Drawing Sheets

(58) Field of Classification Search
CPC .. G02B 7/005; G02B 7/1805; G02B 13/0065; H04M 2250/52; H04M 1/0264
See application file for complete search history.

(56) References Cited

U.S. PATENT DOCUMENTS

| | | | |
|---|---|---|---|
| 10,121,236 B2 | 11/2018 | Chen et al. | |
| 10,732,377 B2 | 8/2020 | Wippermann et al. | |
| 2005/0179807 A1 | 8/2005 | Lin | |
| 2005/0253951 A1* | 11/2005 | Fujimoto | H04N 23/55 348/335 |
| 2007/0188631 A1* | 8/2007 | Yoshitsugu | G02B 27/646 348/240.3 |
| 2008/0266443 A1 | 10/2008 | Lee | |
| 2010/0066894 A1* | 3/2010 | Seo | G02B 15/06 348/340 |
| 2011/0063446 A1* | 3/2011 | McMordie | G06V 40/166 348/E7.086 |
| 2011/0298966 A1 | 12/2011 | Kirschstein et al. | |
| 2012/0075726 A1 | 3/2012 | Takakubo | |
| 2012/0128339 A1 | 5/2012 | Hu | |
| 2014/0193144 A1* | 7/2014 | Coster | F16M 11/2014 396/325 |
| 2018/0109660 A1* | 4/2018 | Yoon | H04N 23/687 |
| 2020/0084308 A1* | 3/2020 | Yoon | H04N 23/55 |
| 2022/0057693 A1* | 2/2022 | Wang | G02B 13/0065 |

FOREIGN PATENT DOCUMENTS

| | | | | |
|---|---|---|---|---|
| CN | 201491117 U | | 5/2010 | |
| CN | 104980541 A | | 10/2015 | |
| CN | 107404604 A | | 11/2017 | |
| CN | 107465859 A | | 12/2017 | |
| CN | 107515459 A | | 12/2017 | |
| CN | 206960757 U | | 2/2018 | |
| CN | 107995485 A | | 5/2018 | |
| CN | 108139565 A | | 6/2018 | |
| CN | 208581282 U | | 3/2019 | |
| CN | 115993751 A | * | 4/2023 | ............ G02B 7/021 |
| EP | 2388633 A1 | | 11/2011 | |
| JP | H10254055 A | | 9/1998 | |
| JP | H10262167 A | | 9/1998 | |

\* cited by examiner

CAMERA MODULE WITH FIXED LENSES AND ELECTRONIC DEVICE

CROSS-REFERENCE TO RELATED APPLICATIONS

This application is a U.S. National Stage of International Patent Application No. PCT/CN2020/089477, filed on May 9, 2020, which claims priority to Chinese Patent Application No. 201910387745.0, filed with the China National Intellectual Property Administration on May 10, 2019, and Chinese Patent Application No. 201910738974.2, filed with the China National Intellectual Property Administration on Aug. 12, 2019, all of which are incorporated herein by reference in their entireties.

TECHNICAL FIELD

Embodiments of this application relate to the field of photographing technologies, and in particular, to a camera module and an electronic device.

BACKGROUND

At present, to increase the diversity of shooting functions in electronic devices (such as mobile phones), a plurality of independent camera modules are usually arranged to meet different shooting needs, significantly increasing costs of the electronic devices.

SUMMARY

This application is intended to provide a low-cost camera module and electronic device.

According to a first aspect, an embodiment of this application provides a camera module. The camera module includes a lens group, an image sensor, a reflective member, and a driving assembly. The lens group includes a plurality of lenses. The reflective member is configured to reflect light rays focused by at least one of the plurality of lenses to the image sensor. "At least one" includes one or more. The driving assembly is configured to drive the reflective member to move. In other words, the driving assembly can drive the reflective member to move between different positions.

In this embodiment, when the driving assembly drives the reflective member to move to different positions, the reflective member can reflect light rays focused by different lenses to the image sensor, so the image sensor can capture a variety of different images based on a change of the position of the reflective member. That is, the camera module integrates a plurality of lenses into one module. Based on the change of the position of the reflective member, one image sensor is shared to provide a plurality of different shooting functions at the same time. In comparison with a conventional solution of setting a plurality of camera modules, costs of the camera module in this embodiment are significantly reduced.

Because the reflective member is located between the lens group and the image sensor, in comparison with an optical path in which light directly enters the image sensor from the lens group, an optical path in which light is directed from the lens group to the reflective member, and then the reflective member reflects the light to the image sensor has a longer length. That is, the arrangement of the reflective member increases the light path, so that the camera module can use a lens with a longer equivalent focal length to obtain a telephoto shooting function, or even an ultra-telephoto shooting function.

Because the reflective member can change a direction of the light path, relative positions of the lens group and the image sensor can be flexibly designed. Therefore, an overall volume of the camera module can be reduced by further designing a position of a lens in the lens group and a position of the image sensor for the camera module. For example, in comparison with the conventional periscope lens module, the lenses in the lens group of the camera module in this embodiment are designed to be tiled, so that a diameter of the lens does not affect a thickness of the camera module, helping make the camera module thinner.

Because the camera module transmits light rays focused by different lenses by changing the position of the reflective member, displacement of a lens in the lens group with a high precision requirement is avoided, and the lens can be fixed to a module bracket of the camera module and serve as a fixed part in the camera module, thereby ensuring the reliability of the camera module.

Furthermore, because the overall volume of the camera module can be reasonably controlled, the camera module uses a lens with a larger aperture without significantly increasing the volume, so as to obtain more light rays, improving the shooting quality of the camera module, and facilitating shooting at night or in a dark environment.

In some embodiments, the equivalent focal lengths of the plurality of lenses are different. Therefore, by changing a dwell position of the reflective member, the camera module switches a lens through which the light collected by the image sensor passes, and the lens has its corresponding fixed equivalent focal length, thereby implementing zooming. Therefore, the camera module can implement step-wise optical zoom, so as to output different image resolution and quality according to different needs of users.

In some embodiments, the reflective member can stay at a plurality of dwell positions, and the plurality of dwell positions and the plurality of lenses are arranged in a one-to-one correspondence. The driving assembly is configured to drive the reflective member to switch between a plurality of dwell positions. In this case, the position adjustment of the reflective member by the driving assembly is step-wise adjustment.

In this embodiment, the driving assembly can drive the reflective member to switch between different dwell positions, different dwell positions correspond to different lenses, and the reflective member can reflect light rays focused by the corresponding lens to the image sensor. Therefore, the image sensor can capture a variety of images based on a change of the position of the reflective member.

In some other embodiments, the adjustment of the reflective member by the driving assembly may alternatively be stepless adjustment. In addition to being able to stay on the foregoing plurality of dwell positions, the reflective member can alternatively stay between adjacent dwell positions. In this case, light rays focused by the lenses corresponding to one or more dwell positions adjacent to the current dwell position of the reflective member can be reflected by the reflective member to the image sensor. In this embodiment, the shooting modes of the camera module are more diversified, improving the user's shooting experience.

In some embodiments, the camera module may further include a motor assembly. The motor assembly is mounted on the module bracket. The image sensor is mounted in the motor assembly. The motor assembly is configured to adjust a position of the image sensor to enable the camera module to implement image focusing, thereby obtaining a clearer target image. A direction of adjusting the image sensor by the motor assembly is designed based on the optical path of the camera module.

In some embodiments, incident light directions of the plurality of lenses are the same, equivalent focal lengths of the plurality of lenses are different, and the plurality of lenses are arranged in a straight line. The driving assembly is configured to drive the reflective member to move, and a moving direction of the reflective member is parallel to the arrangement direction of the plurality of lenses.

In this embodiment, the plurality of lenses are arranged in a straight line, making appearance of the camera module more concise, and helping simplify a structure of the driving assembly, so that when the driving assembly drives the reflective member to move, the movement of the reflective member is more stable, thereby improving the reliability of the camera module. Because the equivalent focal lengths of the plurality of lenses are different, by changing a dwell position of the reflective member, the camera module can switch a lens through which the light collected by the image sensor passes, and the lens has its corresponding fixed equivalent focal length, thereby implementing zooming.

In some embodiments, there are a plurality of ways for the driving assembly to drive the reflective member to move. For example, mechanical driving, that is, driving by a motor, and transmission through a nut and a lead screw, a gear and a rack, or a rope; electromagnetic driving, that is, movement is implemented through attraction and repulsion between an electromagnet and an electromagnet or a permanent magnet; manual adjustment, that is, a part of the structure of the driving assembly is exposed outside the module bracket and adjusted by human hands; manual-automatic integrated adjustment, that is, integration of an automatic adjustment mode and a manual adjustment mode; and intelligent material deformation adjustment.

In some embodiments, the driving assembly includes a motor, a lead screw, and a nut. The nut is sleeved on the outer side of the lead screw and is threadedly connected to the lead screw. The reflective member is fixedly connected to the nut. The motor is configured to drive the lead screw to rotate, so as to drive the reflective member to move between a plurality of dwell positions through the nut.

In this embodiment, the driving assembly uses the manner of driving by a motor and transmission by a nut and a lead screw, to enable the reflective member to move between a plurality of dwell positions. The driving manner of the driving assembly is stable and highly controllable, making the camera module more reliable.

In some embodiments, incident light directions of the plurality of lenses are the same, and equivalent focal lengths of the plurality of lenses are different, the plurality of lenses are in a triangular arrangement, an array arrangement, or an annular arrangement. The driving assembly is configured to drive the reflective member to move and rotate.

In this embodiment, an arrangement manner of a plurality of lenses of the camera module is more flexible and diversified, and an application range of the camera module is wider. Because the equivalent focal lengths of the plurality of lenses are different, by changing a dwell position of the reflective member, the camera module can switch a lens through which the light collected by the image sensor passes, and the lens has its corresponding fixed equivalent focal length, thereby implementing zooming.

In some embodiments, the driving assembly includes a first driving part, a second driving part, and a third driving part. The first driving part is configured to drive the reflective member to move in a first direction. The second driving part is configured to drive the reflective member to move in a second direction, and the second direction is perpendicular to the first direction. The third driving part is configured to drive the reflective member to rotate in a third direction, the third direction is perpendicular to the first direction and the second direction, and the third direction is parallel to the incident light direction of the plurality of lenses.

In this embodiment, through the cooperation of the first driving part, the second driving part, and the third driving part, the reflective member can move between a plurality of dwell positions corresponding to the plurality of lenses, and reflect the light passing through the lenses to the image sensor, so that the camera module implements zooming.

In some embodiments, the incident light directions of the plurality of lenses are different, and the plurality of lenses are arranged around a periphery of the reflective member. The driving assembly is configured to drive the reflective member to rotate, or the driving assembly is configured to drive the reflective member to rotate and move.

In this embodiment, because the plurality of lenses in the lens group have different incident light directions, the reflective member can rotate (or rotate and move) to reflect the light rays focused by different lenses, the camera module can implement multi-directional shooting, making the function of the camera module more diversified.

In some embodiments, a quantity of lenses with different incident light directions is more than two, so that the lens group has more than three incident light directions, and the camera module has more shooting angles and fewer dead angles, helping implement panoramic shooting and 3D shooting.

In this embodiment, the plurality of lenses, the image sensor, the reflective member, the driving assembly, and the like are located inside the module bracket of the camera module. The module bracket can completely seal other components of the camera module inside the module bracket from the outside. The lens group does not need to be moved, but zooming is implemented through the rotation of the reflective member located inside the module bracket, significantly improving the air-tightness of the camera module. The camera module features a long service life and high reliability, and may be applied to an environment that requires extreme conditions such as waterproof, dustproof, and high pressure.

In some embodiments, the equivalent focal lengths of a plurality of lenses with different incident light directions are different. In this case, the camera module can perform multi-directional shooting, and can implement zoom shooting, making the functions of the camera module more diversified. In some other embodiments, the equivalent focal lengths of a plurality of lenses with different incident light directions may alternatively be the same. In still some embodiments, among the plurality of lenses with different incident light directions, some of the lenses have the same equivalent focal length, and some of the lenses have different equivalent focal lengths.

In some embodiments, the plurality of lenses include a first lens and a second lens. The first lens and the second lens are arranged back to back and have opposite incident light directions. A direction of a rotating shaft of the reflective member is perpendicular to a direction of a connection line between the first lens and the second lens.

In this embodiment, because the incident light directions of the first lens and the second lens are opposite, the camera module can capture images in two opposite directions, and a shooting orientation is wide. When the camera module is applied to an electronic device, one of the first lens and the second lens can capture an image located in front of the electronic device (a display screen of the electronic device emits light toward the front of the electronic device), and the other lens can capture an image located behind the electronic device, so that the electronic device implements front shooting and rear shooting, with good shooting experience and low costs.

In some embodiments, the lens group includes at least two lens subgroups with different incident light directions. Each lens subgroup includes a plurality of lenses with the same incident light direction and different equivalent focal lengths. The reflective member is located between two lens subgroups. The driving assembly is configured to drive the reflective member to move and rotate.

In this embodiment, because the lens subgroup includes a plurality of lenses with the same incident light direction and different equivalent focal lengths, the camera module can increase the change in focal length during the 3D shooting, and cooperate with a telephoto lens to capture a distant object while obtaining shooting with different angles of view, so that the captured image of the distant object can have more detailed 3D changes.

In some embodiments, the plurality of lenses in the same lens subgroup are in a linear arrangement, a triangular arrangement, an array arrangement, or an annular arrangement. In this way, the arrangement manner of lenses and the arrangement manner of internal components of the camera module are more flexible and diversified.

In some embodiments, a photosensitive surface of the image sensor is perpendicular to an equivalent center plane of each lens of the lens group. The equivalent center plane of the lens is a plane on which a diameter of an equivalent optical center passing through the lens is located.

In this embodiment, the light rays focused by each lens are reflected by the reflective member and then enter the image sensor after being deflected by 90°. The light can fully use space in the two perpendicular directions of the camera module in the propagation process, that is, space in the direction of the main optical axis of the lens and the vertical direction of the photosensitive surface of the image sensor, making the arrangement positions of the components in the camera module more optimized.

In some embodiments, the reflective member includes a reflective layer for reflecting light. An included angle between the reflective layer and the main optical axis of the lens corresponding to the reflective member is 45°. In this case, the light passing through the lens is deflected by 90° after being reflected by the reflective layer, thereby smoothly entering the image sensor.

In some embodiments, the lens group includes a reference lens. A width of the reflective layer is a radial size passing through the center point of the reflective layer. The reflective layer may have a plurality of widths in different radial directions. A minimum width A of the reflective layer meets the following:

$$A \geq \sqrt{2} \cdot B(B+C)(C-E)/B^2+C^2,$$

where B represents a radius of the reference lens, C represents an equivalent focal length of the reference lens, and E represents a minimum distance between the equivalent center plane of the reference lens and the reflective layer.

In this embodiment, when all the widths of the reflective layer are greater than the minimum width A, the reflective layer can reflect all the light rays focused by the reference lens. That is, with the limitation on the minimum width of the reflective layer, all the light rays can enter the reflective layer after being focused by the reference lens, and then be reflected to the image sensor, so that the camera module can collect sufficient light rays to achieve better shooting quality.

In some embodiments, the reference lens is one of the lenses in the lens group, and the reference lens can be selected in a plurality of manners. Examples are as follows:

For example, the reference lens may be the lens with the largest equivalent focal length in the lens group. For example, the reference lens is a telephoto lens or an ultra-telephoto lens in the lens group. In this case, the reflective layer has a sufficiently large area and can reflect all the light rays focused by the lenses in the lens group to the image sensor, so that the camera module can collect sufficient light rays in various shooting modes to achieve better shooting quality.

For example, the reference lens may alternatively be a standard lens in the lens group. In this case, light rays focused by a lens (such as a wide-angle lens) with an equivalent focal length less than or equal to that of the standard lens can be all reflected by the reflective layer to the image sensor, so that the camera module achieves better shooting quality in the corresponding shooting mode. For a lens (such as a telephoto lens) with an equivalent focal length greater than that of the standard lens, the reflective layer can also reflect most of light rays focused by the lens to the image sensor, so that the camera module achieves good shooting quality in the corresponding shooting mode. Because the size of the reflective layer in this embodiment is designed according to the standard lens, the size of the reflective layer is smaller than the size of the reflective layer in the foregoing example, facilitating miniaturization of the camera module.

In some embodiments, when the reflective member is located at the dwell position, the center of the reflective layer is located on the main optical axis of the lens corresponding to the reflective member, or the center of the reflective layer may slightly deviate from the main optical axis of the lens corresponding to the reflective member. For example, the reflective layer may deviate from the main optical axis of the lens corresponding to the reflective member in a direction away from the image sensor, so as to better reflect the light rays focused by the lens to the image sensor.

In some embodiments, the reflective member further includes a substrate. The reflective layer is formed on a side surface of the substrate facing the lens corresponding to the reflective member. In this case, the reflective layer is arranged toward the lens and is inclined relative to the equivalent center plane of the lens.

In this embodiment, because the reflective layer is formed on the side surface of the substrate facing the lens corresponding to the reflective member, the light is reflected by the reflective layer without entering the substrate, and a light loss is small, helping ensure the shooting quality of the camera module.

In some other embodiments, the reflective member further includes a substrate. The substrate is made of a transparent material. The substrate includes a first side surface, a second side surface, and a third side surface. The first side surface faces the lens corresponding to the reflective member. The second side surface faces the image sensor. The reflective layer is formed on the third side surface and is configured to reflect the light entering the substrate from the first side surface to the second side surface.

In this embodiment, the light rays focused by the lens enter the substrate from the first side surface, and after being reflected by the reflective layer, the light rays exit the substrate from the second side surface and then are directed toward the image sensor. Therefore, although a slight loss occurs after the light enters the substrate, a propagation path of the light has increased, so that the camera module can set a lens with a larger focal length, thereby implementing telephoto shooting or even ultra-telephoto shooting.

In some embodiments, the reflective member further includes a substrate. The substrate is made of a transparent material. The reflective layer is embedded in the substrate. The reflective member can be made through in-mold injection molding.

In this embodiment, the reflective member increases the length of the light transmission path in the camera module, helping the camera module implement telephoto shooting or ultra-telephoto shooting. In addition, the reflective layer is arranged inside the substrate, and the substrate protects the reflective layer to prevent the reflective layer from being worn during manufacturing or assembling of the reflective member, thereby ensuring the reliability of the camera module.

For example, the reflective layer may be a film layer formed by coating a material on a side surface of the substrate, or may be formed by fixing a formed film layer to a side surface of the substrate, or may be formed by performing a processing operation such as grinding on a side surface of the substrate.

In some embodiments, a photosensitive surface of the image sensor is parallel to an equivalent center plane of each lens of the lens group. The equivalent center plane of the lens is a plane on which a diameter of an equivalent optical center passing through the lens is located. The camera module further includes a reflecting member, and the reflecting member is configured to reflect, to the image sensor, the light reflected by the reflective member. In an example, an included angle of 45° is formed between the reflective layer of the reflective member and the main optical axis of the lens, and an reflecting layer of the reflecting member is perpendicular to the reflective layer of the reflective member. The reflective layer of the reflective member is configured to reflect light. The reflecting layer of the reflecting member is configured to reflect light.

In this embodiment, the light passing through the lens is sequentially reflected by the reflective member and the reflecting member, and then enters the image sensor after being deflected by 180°. Unlike the previous embodiments, in this embodiment, the quantity of reflector components (including the reflective member and the reflecting member) is increased so that the light is deflected a plurality of times. This not only makes the arrangement position of the image sensor more flexible and helps improve the flexibility of arranging the components of the camera module, but also ensures that the light propagation path is longer and the camera module can set a lens with a larger focal length to implement telephoto shooting or ultra-telephoto shooting.

In some other embodiments, the quantity of reflector components such as reflective members or reflecting members may alternatively be two or more than two, which is not strictly limited in this application. There may alternatively be another relationship between the position of the reflector component such as the reflective member or the reflecting member and the position of the equivalent center plane of the lens, which is not strictly limited in this application. Because the quantity and the position of the reflector components are set in cooperation with the position of the photosensitive surface of the image sensor, the position of the photosensitive surface of the image sensor can be changed by adjusting the quantity and the position of the reflector components, that is, the positional relationship between the photosensitive surface of the image sensor and the equivalent center plane of the lens of the lens group is changed, so that the camera module can implement a greater variety of structural solutions and forms, and a wider application range.

In some embodiments, the camera module further includes a fixing frame and an anti-shake assembly. The fixing frame is fixedly connected to the driving assembly. The anti-shake assembly is connected to the fixing frame and the reflective member, and is configured to enable the reflective member to rotate relative to the fixing frame.

In this embodiment, the camera module is provided with an anti-shake assembly for driving the rotation of the reflective member to implement optical anti-shake through the rotation compensation of the reflective member, thereby avoiding a failure of light focusing due to the shaking of the hand during the shooting. This ensures that the image captured by the camera module is clear, and user experience is better.

The anti-shake assembly can be implemented by a variety of driving methods, such as multi-point electromagnetic driving of the reflective member to rotate, mechanical driving (gear driving and connecting rod transmission) of the reflective member to rotate, and intelligent material deformation driving of the reflective member to rotate.

In some embodiments, the fixing frame includes a first arm and a second arm. An included angle is formed between the first arm and the second arm. The reflective member is a triangular prism body. The reflective member includes a first side edge, and a first surface and a second surface that are connected to the first side edge. The first surface faces the first arm, and the second surface faces the second arm. The anti-shake assembly includes a spherical hinge and two sets of magnetic attracting parts. The spherical hinge is connected between the first side edge and the fixing frame. The two sets of magnetic attracting parts are respectively connected between the first surface and the first arm, and between the second surface and the second arm.

In this embodiment, by controlling the charging and discharging actions of the two sets of magnetic attracting parts and the magnitude of the charging current, the reflective member can be controlled to implement the rotation of three degrees of freedom. The reflective member can separately rotate around the width direction of the camera module, the length direction of the camera module, and the thickness direction of the camera module. In addition, the driving assembly can drive the reflective member to move in the width direction of the camera module. Therefore, the reflective member of the camera module can implement the anti-shake of four degrees of freedom, and the shooting quality of the camera module is better.

According to a second aspect, an embodiment of this application further provides an electronic device. The electronic device includes a housing and the camera module according to any one of the foregoing embodiments. The camera module is mounted on the housing. The electronic device has functions such as shooting and video recording. In this embodiment, the costs of the camera module are relatively low, which can effectively reduce the overall costs of the electronic device.

It should be understood that descriptions of technical features, technical solutions, beneficial effects, or similar statements in this application do not imply that all features and advantages can be implemented in any single embodiment. On the contrary, it may be understood that descriptions of the features or the beneficial effects mean that one or more embodiments include a specific technical feature, technical solution, or beneficial effect. Therefore, descriptions of the technical features, the technical solutions, or the beneficial effects in this specification may not necessarily be specific to a same embodiment. Further, the technical features, technical solutions, or beneficial effects described in the embodiments may be combined in any proper manner. A person skilled in the art may understand that a specific embodiment may be implemented without using one or more specific technical features, technical solutions, or beneficial effects of the embodiment. In some other embodiments, additional technical features and beneficial effects may further be identified in a specific embodiment that does not reflect all the embodiments.

DESCRIPTION OF EMBODIMENTS

The following describes the following embodiments of this application with reference to the accompanying drawings in the embodiments of this application.

An embodiment of this application provides an electronic device. The electronic device has a shooting or video recording function. For example, the electronic device may be a mobile phone, a tablet computer, a notebook computer, a camera, a wearable device, an electronic eye, a video camera, or the like. The foregoing wearable device may be a smart band, a smartwatch, a smart head-mounted display, smart glasses, or the like.

Figure 1:
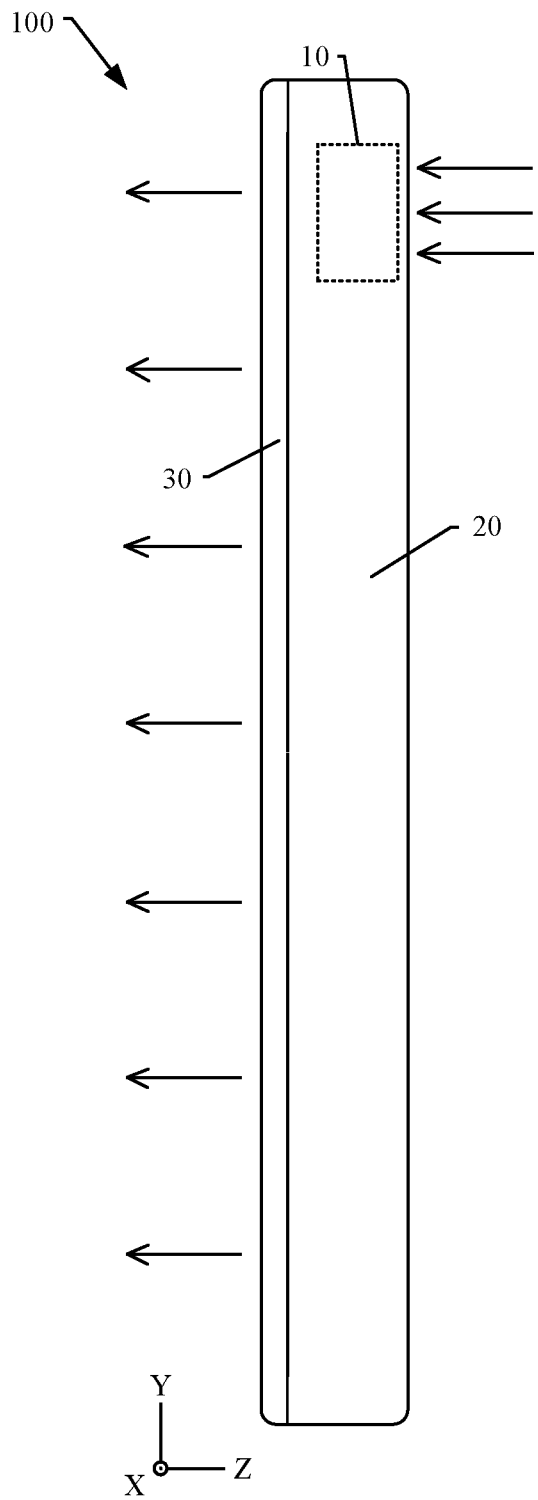
FIG. 1 is a side view of an electronic device according to an embodiment of this application.
Figure 2:
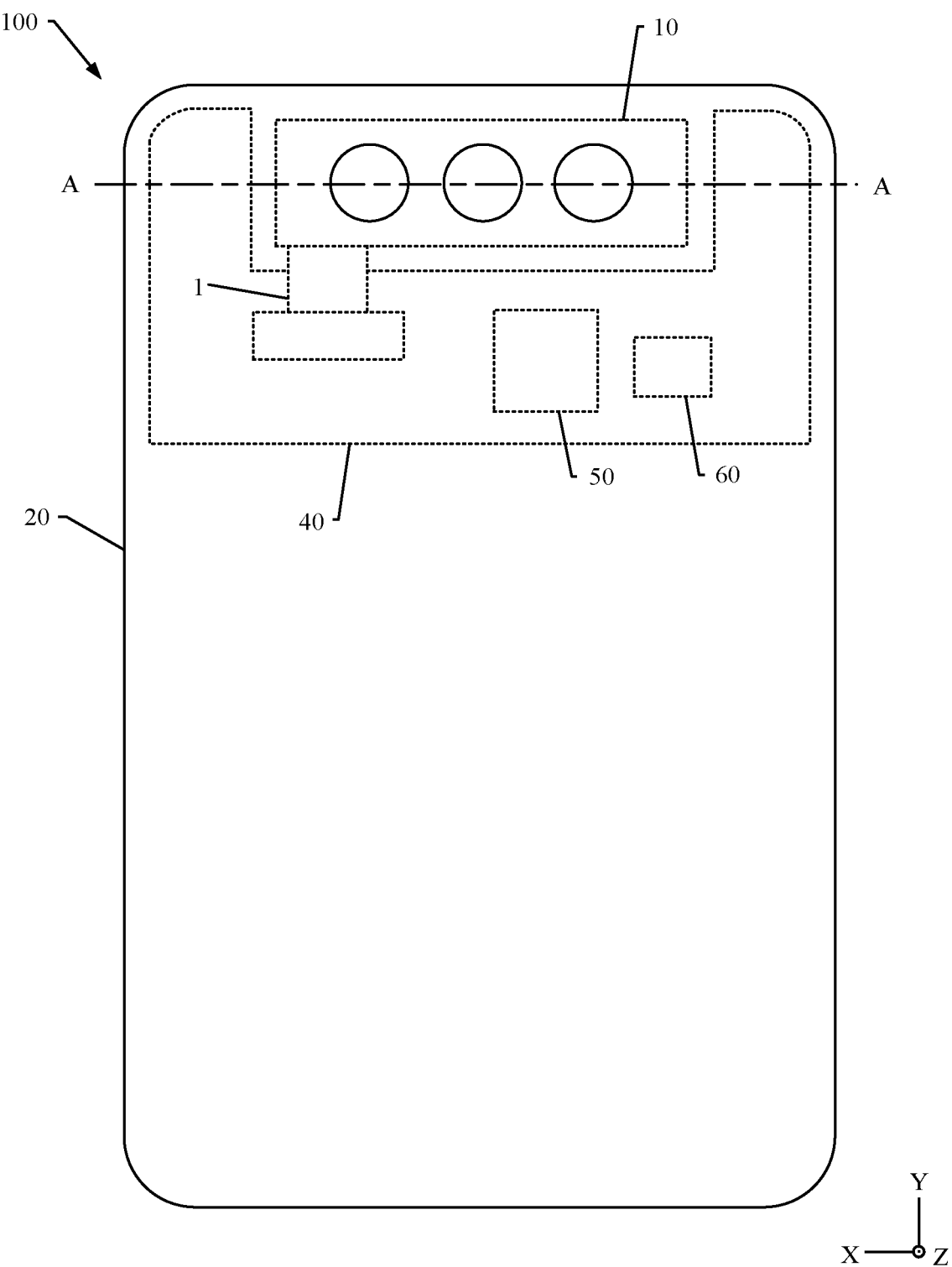
FIG. 2 is a rear view of the electronic device shown in FIG. 1.

Refer to FIG. 1 and FIG. 2. FIG. 1 is a side view of an electronic device 100 according to an embodiment of this application. FIG. 2 is a rear view of the electronic device 100 shown in FIG. 1. In this embodiment, an example in which the electronic device is a mobile phone is used for description.

The electronic device 100 includes a camera module 10, a housing 20, a display screen 30, a circuit board 40, a processor 50, and a memory 60. The display screen 30 is mounted on the housing 20. The housing 20 may include a frame and a back cover. The display screen 30 and the back cover are respectively mounted on two opposite sides of the frame. The display screen 30 is configured to display an image. The camera module 10 is mounted on the housing 20. The camera module 10 is configured to capture an image. The circuit board 40 is accommodated in the housing 20. The processor 50 and the memory 60 are fixed on the circuit board 40. The display screen 30, the camera module 10, and the memory 60 are coupled to the processor 50. The memory 60 is configured to store computer program code. The computer program code includes a computer instruction. The processor 50 is configured to invoke the computer instruction to enable the electronic device 100 to perform a corresponding operation, for example, enabling the display screen 30 to display a target image, or enabling the camera module 10 to capture a target image.

To facilitate the following description of the camera module 10, a width direction of the camera module 10 is defined as a direction X in the figure, a length direction of the camera module 10 is defined as a direction Y in the figure, and a thickness direction of the camera module 10 is defined as a direction Z in the figure. In this embodiment, an example in which "the width direction X of the camera module 10 is parallel to the width direction of the electronic device 100, the length direction Y of the camera module 10 is parallel to the length direction of the electronic device 100, and the thickness direction Z of the camera module 10 is parallel to the thickness direction of the electronic device 100" is used for description.

In some embodiments, the display screen 30 may be an organic light-emitting diode (organic light-emitting diode, OLED) display screen, an active-matrix organic light-emitting diode (active-matrix organic light-emitting diode, AMOLED) display screen, a mini organic light-emitting diode (mini organic light-emitting diode) display screen, a micro organic light-emitting diode (micro organic light-emitting diode) display screen, a quantum dot light-emitting diode (quantum dot light emitting diodes, QLED) display screen, a liquid crystal display (liquid crystal display, LCD), or the like.

In some embodiments, as shown in FIG. 1, the front of the electronic device 100 is located on one side of the electronic device 100, the rear of the electronic device 100 is located on the other side of the electronic device 100, and the display screen 30 emits light toward the front of the electronic device 100. The camera module 10 can capture an image located behind the electronic device 100. For example, the back cover of the electronic device 100 is provided with a camera hole, and the camera module 10 takes a photo through the camera hole.

In some other embodiments, the camera module 10 can alternatively capture an image in front of the electronic device 100. For example, the camera module 10 takes a photo through a non-display area of the display screen 30. The display screen 30 may be a special-shaped screen. For example, the top of the display screen 30 forms a trapezoidal or waterdrop-shaped non-display area. The display screen 30 may alternatively be a relatively regular rectangular screen. In this case, the top space or the bottom space of the display screen 30 forms a non-display area. Alternatively, the display screen 30 is provided with a light-transmitting hole or a light-transmitting part, the camera module 10 is located below the display screen 30, and the camera module 10 takes a photo through the light-transmitting hole or the light-transmitting part.

In some embodiments, as shown in FIG. 2, the circuit board 40 may be provided with a hollow avoidance area, and the camera module 10 may be arranged in the avoidance area. In this way, an overall size of an assembly structure of the camera module 10 and the circuit board 40 in the thickness direction of the electronic device 100 (that is, the thickness direction Z of the camera module 10) is small, facilitating the lightening and thinning of the electronic device 100. The camera module 10 includes a flexible circuit board 1, and one end of the flexible circuit board 1 is provided with an electrical connector. The electrical connector of the flexible circuit board 1 is connected to an electrical connector on the circuit board 40, so that the camera module 10 is coupled to the circuits and components on the circuit board 40. For example, the electrical connector of the flexible circuit board 1 may be a board to board (board to board, BTB) connector. The electrical signal transmitted between the flexible circuit board 1 and the circuit board 40 may include a camera function signal, a driving assembly control signal, and the like. In some other embodiments, the camera module 10 may alternatively be coupled to the circuits and components on the circuit board 40 through a wireless connection.

Figure 3:
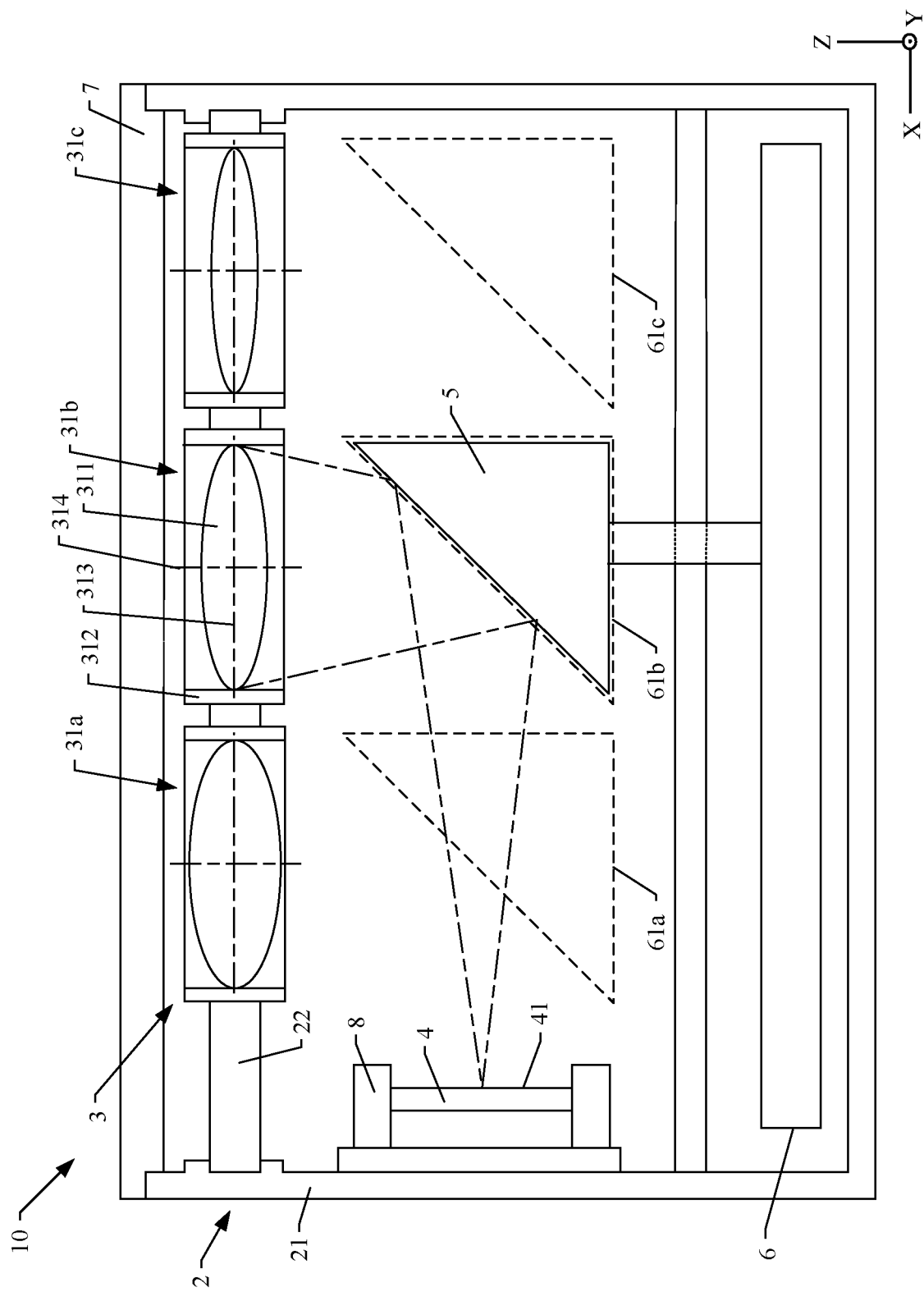
FIG. 3 is a schematic diagram of a partial structure of a camera module of the electronic device shown in FIG. 2 in some embodiments.

FIG. 3 is a schematic diagram of a partial structure of a camera module 10 of the electronic device 100 shown in FIG. 2 in some embodiments. A plane on which the diagram of FIG. 3 is located corresponds to a position of the A-A line of the electronic device 100 shown in FIG. 2.

The camera module 10 may include a module bracket 2, a lens group 3, an image sensor 4, a reflective member 5, and a driving assembly 6. The image sensor 4 may alternatively be referred to as a photosensitive element. The module bracket 2 is configured to fix and protect other components of the camera module 10. The lens group 3, the image sensor 4, the reflective member 5, and the driving assembly 6 are mounted on the module bracket 2. The module bracket 2 is mounted in the housing of the electronic device 100.

The lens group 3 may include a plurality of lenses with different equivalent focal lengths. "A plurality of" means at least two, that is, two or more. For example, the quantity of lenses in the lens group 3 may be two, three, four, or more. For example, as shown in FIG. 3, some embodiments of this application are described in detail by using an example in which the lens group 3 includes three lenses (31a, 31b, and 31c). In some embodiments, as shown in FIG. 3, the plurality of lenses (31a, 31b, and 31c) in the lens group 3 may be arranged in the width direction X of the camera module 10. In some other embodiments, the plurality of lenses in the lens group 3 may alternatively be arranged in the length direction Y of the camera module 10 or another direction.

In the embodiment shown in FIG. 3, the equivalent focal length of the lens 31c located on the right is greater than the equivalent focal length of the lens 31b located in the middle, and the equivalent focal length of the lens 31b located in the middle is greater than the equivalent focal length of the lens 31a located on the left. In other words, the lens closer to the image sensor 4 has a smaller equivalent focal length, and the lens further away from the image sensor 4 has a larger equivalent focal length. In this case, light rays focused by the lenses can form a relatively clear image on the image sensor 4, so that the quality of the image captured by the camera module 10 is better. It can be understood that in the embodiments of this application, "left", "middle", "right", and the like are only orientations with reference to the drawings, and the orientation terms used are intended for describing and understanding this application, rather than indicating or implying that the indicated apparatus or element must have a particular orientation or be constructed and operated in a particular orientation. Therefore, these terms should not be understood as a limitation on the embodiments of this application.

For example, the three lenses in the lens group 3 may include a wide-angle lens, a standard lens, and a telephoto lens. For example, in FIG. 3, the lens 31b may be a standard lens, the lens 31c may be a telephoto lens, and the lens 31a may be a wide-angle lens. In some other embodiments, the lens group 3 may alternatively include five lenses, and the five lenses may be an ultra-wide-angle lens, a wide-angle lens, a standard lens, a telephoto lens, and an ultra-telephoto lens, respectively. In some other embodiments, the quantities and types of lenses in the lens group 3 may alternatively have different combinations, which are not strictly limited in this application.

The standard lens may be a main lens of the electronic device 100. In this embodiment, a plurality of lenses are distinguished by equivalent focal lengths. For example, the equivalent focal length of the ultra-wide-angle lens may be in a range of 13 mm to 20 mm. The equivalent focal length of a wide-angle lens may be in a range of 24 mm to 38 mm. The equivalent focal length of a standard lens may be in a range of 40 mm to 55 mm. The equivalent focal length of a telephoto lens may be in a range of 85 mm to 300 mm. The equivalent focal length of an ultra-telephoto lens may be greater than 300 mm. The field of view of the ultra-wide-angle lens may be in a range of 94 degrees to 118 degrees. The field of view of the wide-angle lens may be in a range of 60 degrees to 84 degrees. The field of view of the standard lens is approximately 50 degrees.

In some embodiments, the reflective member 5 is configured to reflect light rays focused by one of the plurality of lenses to the image sensor 4. The driving assembly 6 is configured to drive the reflective member 5 to move. For example, the driving assembly 6 can be configured to drive the reflective member 5 to switch between a plurality of dwell positions, a plurality of dwell positions are in a one-to-one correspondence with a plurality of lenses. The quantity of dwell positions is equal to the quantity of lenses, and each dwell position corresponds to one lens. The reflective member 5 is configured to reflect light rays focused by the corresponding lens to the image sensor 4. The corresponding lens is a lens corresponding to the dwell position at which the reflective member 5 is located.

As shown in FIG. 3, the camera module 10 has three dwell positions (61a, 61b, and 61c), and the three dwell positions (61a, 61b, and 61c) are arranged in a one-to-one correspondence with three lenses (31a, 31b, and 31c). When the reflective member 5 is located at a specific dwell position, the reflective member 5 can reflect light rays focused by the lens corresponding to the dwell position to the image sensor 4. For example, when the reflective member 5 is located at the dwell position 61b, the dwell position 61b corresponds to the lens 31b, and the reflective member 5 reflects the light rays focused by the lens 31b to the image sensor 4, and the image sensor 4 can capture the image passing through the lens 31b with the help of the reflective member 5. When the reflective member 5 is located at the dwell position 61a, the dwell position 61a corresponds to the lens 31a, and the reflective member 5 reflects the light rays focused by the lens 31a to the image sensor 4, and the image sensor 4 can capture the image passing through the lens 31a with the help of the reflective member 5. When the reflective member 5 is located at the dwell position 61c, the dwell position 61c corresponds to the lens 31c, and the reflective member 5 reflects the light rays focused by the lens 31c to the image sensor 4, and the image sensor 4 can capture the image passing through the lens 31c with the help of the reflective member 5.

In some embodiments, the distances between the foregoing three dwell positions (61a, 61b, and 61c) may be the same. The distances between the three lenses (31a, 31b, and 31c) are also the same. Therefore, the appearance consistency of the camera module 10 is better. In some other embodiments, the distances between the foregoing three dwell positions (61a, 61b, and 61c) may alternatively be different, so that the arrangement of the three lenses (31a, 31b, and 31c) is more flexible. The design solutions for the equivalent focal lengths of the plurality of lenses in the lens group 3 can be more diversified.

In the foregoing embodiment, the driving assembly 6 can drive the reflective member 5 to switch between different dwell positions, different dwell positions correspond to lenses with different equivalent focal lengths, and the reflective member 5 can reflect light rays focused by the corresponding lens to the image sensor 4. Therefore, the image sensor 4 can capture a variety of images with different focal lengths based on a change of the position of the reflective member 5. That is, the camera module 10 integrates a plurality of lenses with different equivalent focal lengths into one module. Based on the change of the position of the reflective member 5, one image sensor 4 is shared to provide a plurality of shooting functions meeting different focal length needs at the same time. In comparison with a conventional solution of setting a plurality of camera modules, costs of the camera module 10 in this embodiment are significantly reduced, and the space inside the electronic device is also reduced.

In addition, by changing a dwell position of the reflective member 5, the camera module 10 switches a lens through which the light collected by the image sensor 4 passes, thereby implementing zooming. Therefore, the camera module 10 can implement step-wise optical zoom, so as to output different image resolution and quality according to different needs of users. Because the camera module 10 transmits light rays focused by lenses with different equivalent focal lengths by changing the position of the reflective member 5, displacement of a lens in the lens group 3 with a high precision requirement is avoided, and the lens is fixed to a module bracket 2 and serves as a fixed part in the camera module 10, thereby ensuring the reliability of the camera module 10.

Because the reflective member 5 is located between the lens group 3 and the image sensor 4, in comparison with an optical path in which light directly enters the image sensor from the lens group, an optical path in which light is directed from the lens group 3 to the reflective member 5, and then the reflective member 5 reflects the light to the image sensor 4 has a longer length. That is, the arrangement of the reflective member 5 increases the light path, so that the camera module 10 can use a lens with a longer equivalent focal length to obtain a telephoto shooting function, or even an ultra-telephoto shooting function.

In some embodiments, the plurality of dwell positions of the camera module 10 may include an initial dwell position. The initial dwell position may be a position at which the reflective member 5 stays when the camera module 10 starts or stops working (for example, the image sensor 4 is in a sleep or power-off state). In other words, when the camera module 10 is started, the reflective member 5 stays at the initial dwell position, or switches from another dwell position to the initial dwell position, and the image sensor 4 collects the light rays focused by the lens corresponding to the initial dwell position; when the camera module 10 stops working, the reflective member 5 is located at the initial dwell position, or switches from another dwell position to the initial dwell position and stays there.

In some embodiments, to help the user perform the shooting operation, the foregoing initial dwell position may be the dwell position that the user uses most frequently in a time period, so that the user can quickly take a photo in the way the user likes. In this case, the foregoing initial dwell position may be dynamically changed. Referring to FIG. 3, for example, in a specific time period, the dwell position 61b is the most frequently used dwell position, and the dwell position 61b is the initial dwell position. In another time period, the dwell position 61c is the most frequently used dwell position, and the dwell position 61c is the initial dwell position.

Figure 4A:
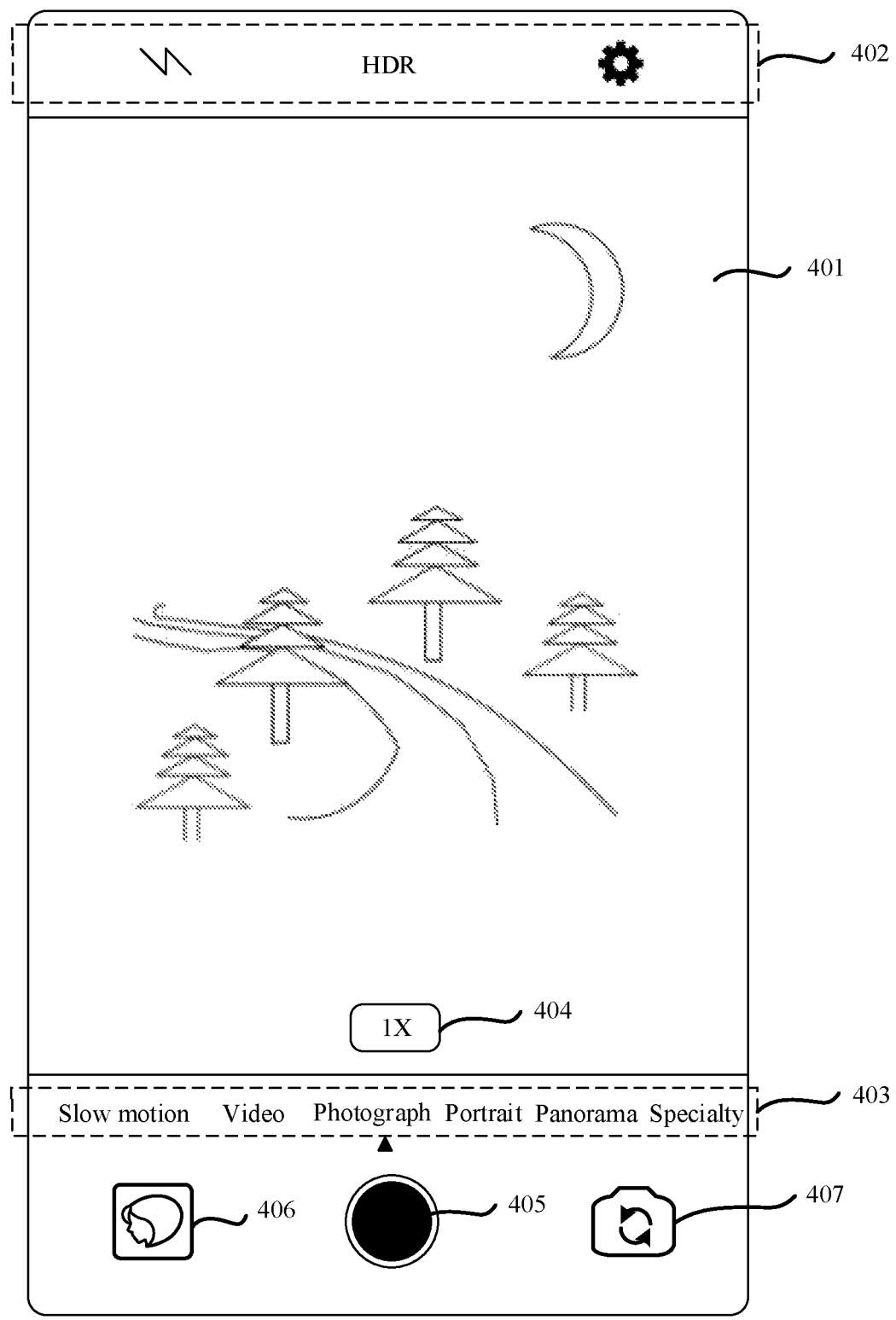
FIG. 4A is a schematic diagram of a user interface of the electronic device shown in FIG. 1 in a shooting mode.
Figure 4B:
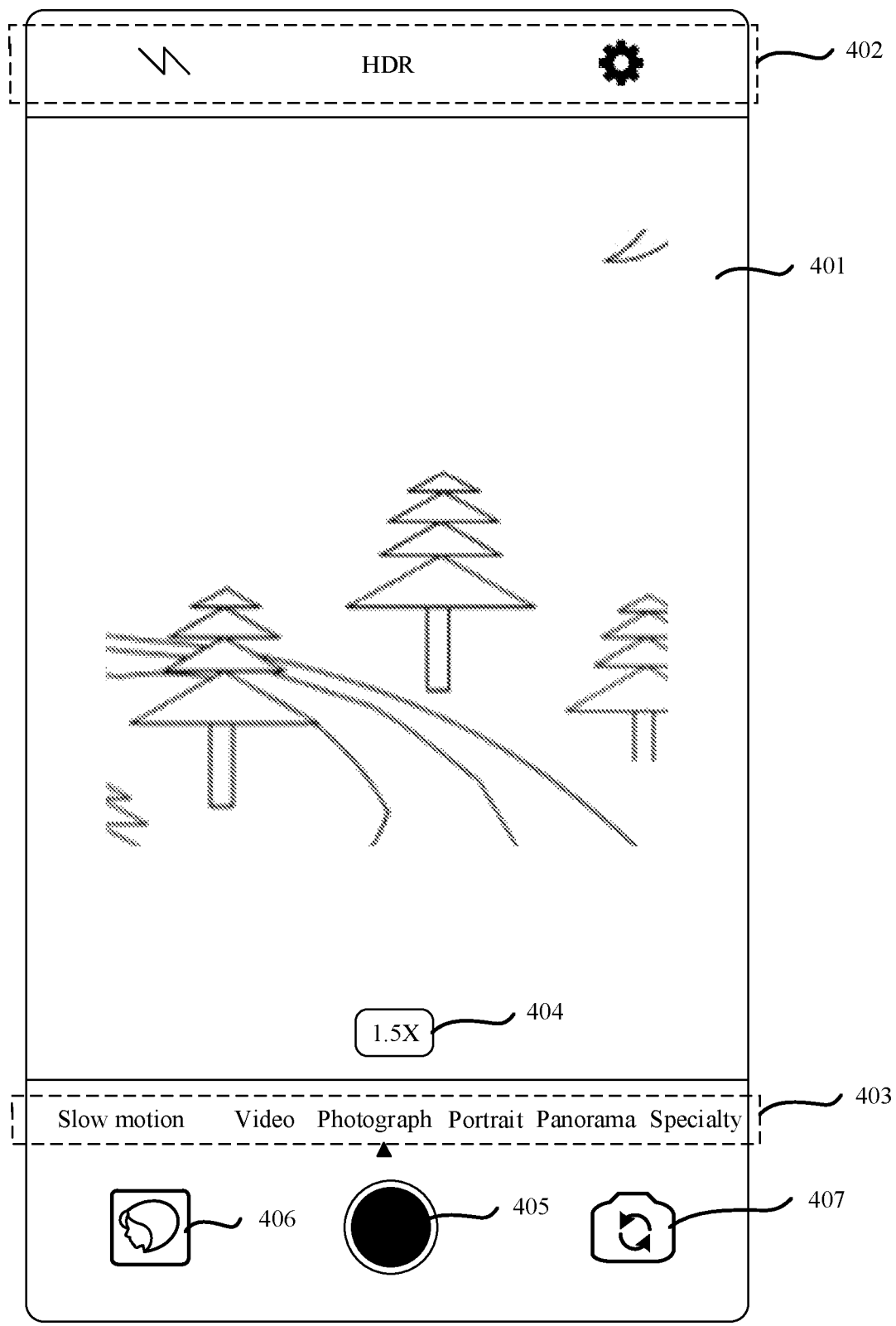
FIG. 4B is a schematic diagram of a user interface of the electronic device shown in FIG. 1 in another shooting mode.
Figure 4C:
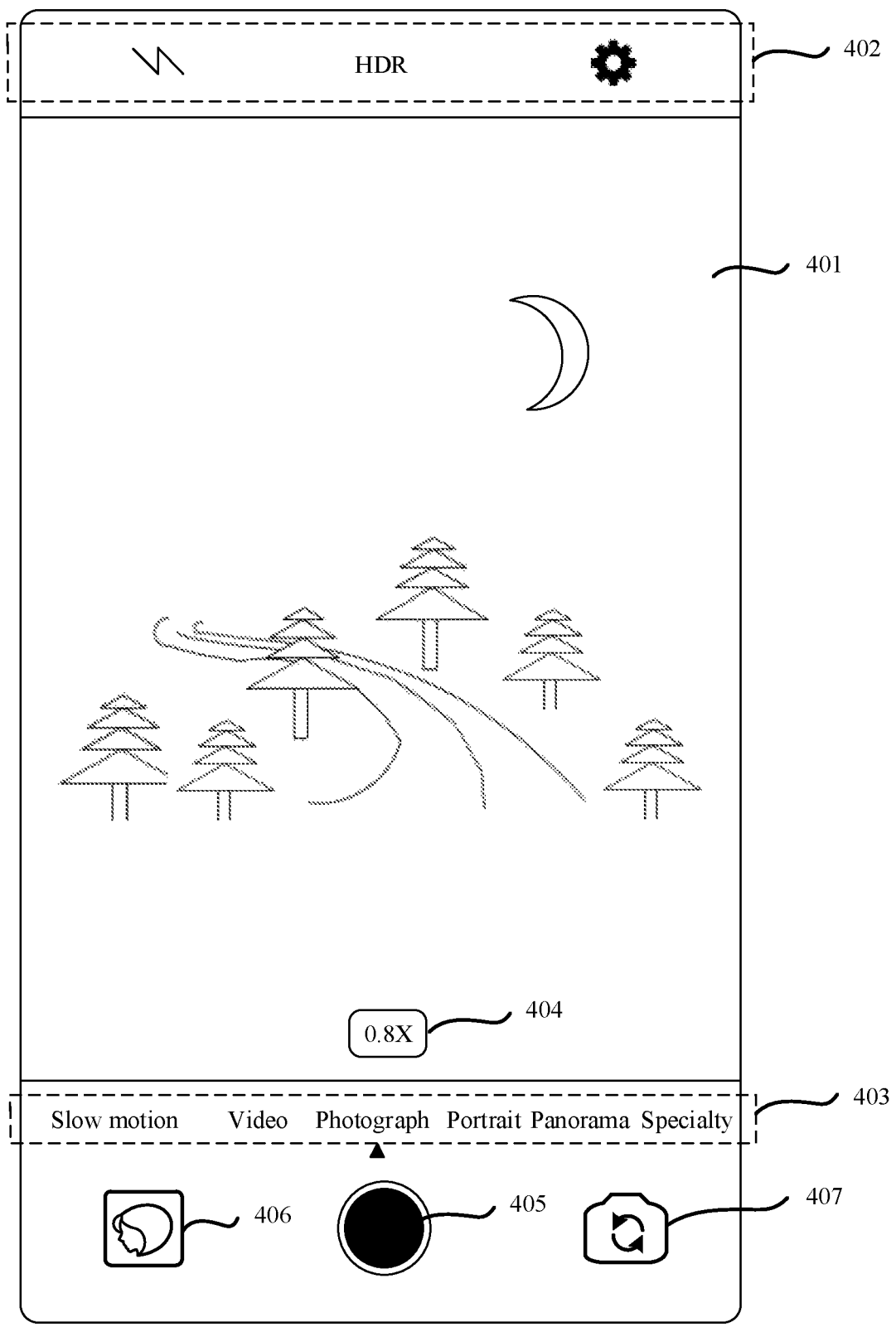
FIG. 4C is a schematic diagram of a user interface of the electronic device shown in FIG. 1 in still another shooting mode.

Refer to FIG. 3 to FIG. 4C together. FIG. 4A is a schematic diagram of a user interface of the electronic device 100 shown in FIG. 1 in a shooting mode. FIG. 4B is a schematic diagram of a user interface of the electronic device 100 shown in FIG. 1 in another shooting mode. FIG. 4C is a schematic diagram of a user interface of the electronic device 100 shown in FIG. 1 in still another shooting mode. The following describes examples of several possible shooting modes of the camera module 10 with reference to the user interface of the electronic device 100.

Refer to FIG. 3 and FIG. 4A together. FIG. 4A corresponds to a default shooting mode. The electronic device 100 starts the camera module 10 after receiving the user's operation of starting shooting (for example, starting a photographing application). The operation of starting shooting may be an operation of triggering a shooting icon in the user interface, an operation of triggering a mechanical button of the electronic device 100 by a preset action, or an operation of triggering the electronic device 100 by a preset voice. When the camera module 10 is started, the reflective member 5 may be located at the initial dwell position (for example, the dwell position 61b in FIG. 3), or may quickly switch from another dwell position to the initial dwell position. In this embodiment, when the reflective member 5 is located at the initial dwell position, the camera module 10 is in the normal shooting mode. In this case, the user interface of the electronic device 100 displays an image shown in FIG. 4A.

For example, the user interface shown in FIG. 4A includes a preview box 401, a setting bar 402 (including the setting of shooting parameters such as flash and HDR), a shooting mode bar 403, a zoom ratio indicator 404, a shooting shutter button 405, an echo control 406, a control 407 for switching between the front camera and the rear camera, and the like. The shooting shutter button 405 is configured to receive an operation (for example, clicking, tapping, or pressing) of the user, and the electronic device 100 saves the image shown in the preview box 401 as a picture in response to the operation. The control 407 is configured to receive the user's operation. In response to the operation, the electronic device 100 switches the reflective member 5 of the camera module 10 from the current dwell position to another dwell position with a different incident light direction (refer to the dwell positions 61d and 61f in the embodiment of FIG. 36 in the following), or switch the current camera module to another camera module with a different incident light direction.

In this embodiment of this application, after the camera module 10 is started, if the electronic device 100 confirms the shooting operation, the image sensor 4 of the camera module 10 captures an image of a target scene. The shooting operation may be an operation of triggering a shooting icon in the user interface, an operation of triggering a mechanical button of the electronic device 100 by a preset action, or an operation of triggering the electronic device 100 by a preset voice.

It can be understood that different dwell positions correspond to different zoom ratio ranges. If the electronic device 100 confirms a target zoom ratio, the reflective member 5 of the camera module 10 can switch from the initial dwell position or another dwell position to a dwell position corresponding to a zoom ratio range of the target zoom ratio, so as to implement zooming.

For example, referring to FIG. 3, when the zoom ratio range corresponding to the dwell position 61a is less than 1, and the reflective member 5 is located at the dwell position 61a, the camera module 10 is in the wide-angle shooting mode; when the zoom ratio range corresponding to the dwell position 61b is greater than or equal to 1 and less than 1.5, and the reflective member 5 is located at the dwell position 61b, the camera module 10 is in the default shooting mode; when the zoom ratio range corresponding to the dwell position 61c is greater than or equal to 1.5, and the reflective member 5 is located at the dwell position 61c, the camera module 10 is in the telephoto shooting mode.

Refer to FIG. 3 and FIG. 4A together. The electronic device 100 confirms that the target zoom ratio is 1, and the zoom ratio range (greater than or equal to 1 and less than 1.5) of the target zoom ratio 1 corresponds to the dwell position 61b. In this case, the reflective member 5 is located at the dwell position 61b.

Refer to FIG. 3 and FIG. 4B together. FIG. 4B corresponds to the telephoto shooting mode. The electronic device 100 confirms that the target zoom ratio is 1.5, and the zoom ratio range (greater than or equal to 1.5) of the target zoom ratio 1.5 corresponds to the dwell position 61c. In this case, the reflective member 5 can move to the dwell position 61c from the initial dwell position or another dwell position, and the camera module 10 is in telephoto shooting mode. In this case, the user interface of the electronic device 100 displays an image shown in FIG. 4B.

Refer to FIG. 3 and FIG. 4C together. FIG. 4C corresponds to the wide-angle shooting mode. The electronic device 100 confirms that the target zoom ratio is 0.8, and the zoom ratio range (less than or equal to 1) of the target zoom ratio 0.8 corresponds to the dwell position 61a. In this case, the reflective member 5 can move to the dwell position 61a from the initial dwell position or another dwell position, and the camera module 10 is in the wide-angle shooting mode. In this case, the user interface of the electronic device 100 displays an image shown in FIG. 4C.

Figure 5:
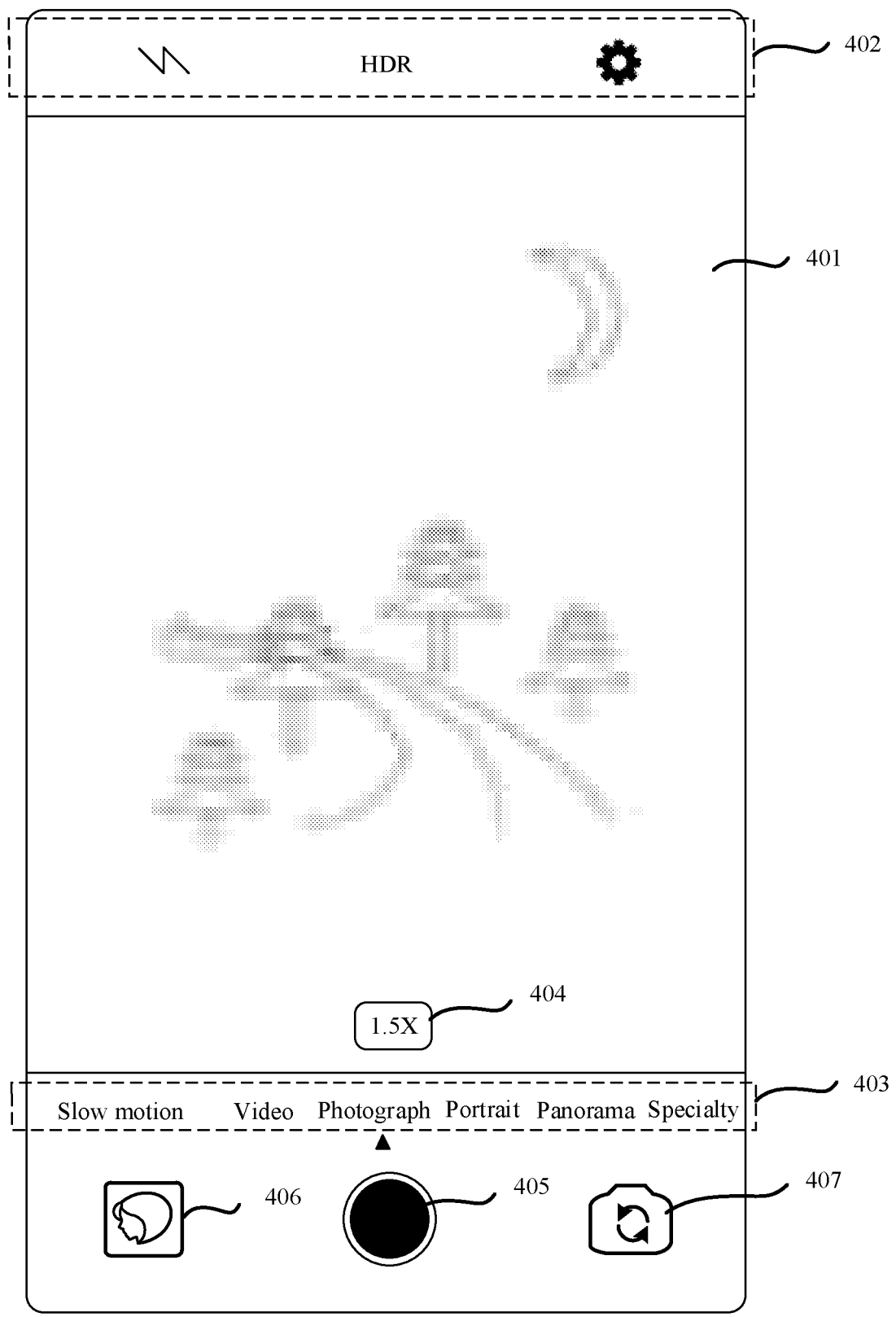
FIG. 5 is a schematic diagram of a possible user interface when the electronic device shown in FIG. 1 switches a shooting mode.

It should be understood that when the reflective member 5 is switched between the dwell positions, the image in the preview box of the electronic device 100 has a short switching time gap. In some embodiments, the image in the preview box of the electronic device 100 may use a transition image to fill the gap. After the switch of the reflective member 5 is completed, the image captured by the current lens is displayed in the preview box. The transition image may be screen-off or a blurred image after the previous image is frozen. FIG. 5 is a schematic diagram of a possible user interface when the electronic device 100 shown in FIG. 1 switches a shooting mode. FIG. 5 illustrates that when the reflective member 5 is switched from the initial dwell position to the target dwell position, the electronic device 100 uses the blurred image after the previous image is frozen as the transition image. In some embodiments, the transition image may have an animation effect of gradual blurring from FIG. 4C to FIG. 5, thereby improving the user's shooting experience. In some other embodiments, when the reflective member 5 is switched between the dwell positions, the image captured by the image sensor 4 in real time may alternatively be displayed in the preview box of the electronic device 100. The image is a dynamic image, and the user can clearly perceive the zooming process of the camera module 10 through the dynamic image, thereby improving the user's shooting experience.

In some embodiments, when the reflective member 5 of the camera module 10 is switched between the dwell positions, the camera module 10 implements step-wise optical zoom, and the electronic device 100 can further use the processor to process the image captured by the image sensor 4, and combine the digital zoom with the step-wise optical zoom of the camera module 10 to implement stepless zoom for the image display.

Referring to FIG. 3, because the reflective member 5 can change a direction of the light path, relative positions of the lens group 3 and the image sensor 4 can be flexibly designed. Therefore, a volume of the camera module 10 can be reduced by further designing positions of lenses (31a, 31b, and 31c) in the lens group 3 and a position of the image sensor 4 for the camera module 10, thereby further reducing a volume of the electronic device 100. For example, in comparison with the conventional periscope lens module, the lenses (31a, 31b, and 31c) in the lens group 3 of the camera module 10 in this embodiment are designed to be tiled, so that diameters of the lenses (31a, 31b, and 31c) do not affect a thickness (the direction Z in FIG. 3) of the camera module 10, helping make the camera module 10 thinner.

Furthermore, because the volume of the camera module 10 can be reasonably controlled, the camera module 10 uses a lens with a larger aperture without significantly increasing the volume, so as to obtain more light rays, improving the shooting quality of the camera module 10, and facilitating shooting at night or in a dark environment.

In some embodiments, a lens may include one lens or a combination of a plurality of lenses. When the lens includes a plurality of lenses, the plurality of lenses include a convex lens, and may further include a concave lens. In the embodiment shown in FIG. 3, an example in which the lens 31b includes one lens 311 is used for description.

For example, the structures of the lenses (31a, 31b, and 31c) in the lens group 3 is substantially the same, and the main difference is that the lens sizes or the lens materials of the lenses with different equivalent focal lengths may be different.

For example, the diameters of the plurality of lenses in the lens group 3 may be the same or different. In the embodiment of FIG. 3, an example in which the diameters of the plurality of lenses (31a, 31b, and 31c) in the lens group 3 is used for description.

In some embodiments, each lens in the lens group 3 has an equivalent center plane. The equivalent center plane of the lens is a plane on which a diameter of an equivalent optical center passing through the lens is located. The equivalent center plane of the lens is perpendicular to the main optical axis of the lens. When the lens includes one lens, the equivalent optical center of the lens is the optical center of the lens. When the lens includes a plurality of lenses, the equivalent optical center of the lens is the optical center of the lens group formed by the plurality of lenses.

For example, as shown in FIG. 3, the lens 31b has an equivalent center plane 313, the lens 31b has a main optical axis 314, and the equivalent center plane 313 is perpendicular to the main optical axis 314. The lens 31b includes one lens 311, and the equivalent optical center of the lens 31b is the optical center of the lens 311. In this embodiment, an example in which "the equivalent center planes of the lenses with the same incident light direction of the lens group 3 are flush" is used for description. In some other embodiments, the equivalent center planes of the lenses with the same incident light direction of the lens group 3 may alternatively be not flush.

In some embodiments, as shown in FIG. 3, the plurality of lenses (31a, 31b, and 31c) in the lens group 3 may each have an independent lens barrel, and the plurality of lenses are separately mounted on the module bracket 2 through their respective lens barrels. For example, the lens 31b includes a lens barrel 312. In some other embodiments, a plurality of lenses in the lens group 3 may share a lens barrel frame, the lens or lens group of each lens is mounted on the lens frame, and the lens barrel frame is fixed to the module bracket 2. In this embodiment, the camera module 10 can fix a plurality of lenses at the same time through the module bracket 2. In comparison with the conventional solution of compactly arranging a plurality of independent camera modules (each having a module bracket) to form a camera module, the camera module 10 in this embodiment has a smaller overall volume and requires smaller mounting space, and can be mounted in the electronic device 100 more flexibly.

In some embodiments, as shown in FIG. 3, the module bracket 2 may include a bracket base 21 and a lens fixing frame 22, and the lens fixing frame 22 is fixed to the bracket base 21. The plurality of lenses (31a, 31b, and 31c) are mounted on the lens fixing frame 22. The lens fixing frame 22 is detachably mounted on the bracket base 21, so that during subsequent maintenance of the camera module 10, the lens group 3 can be removed by disassembling the lens fixing frame 22, facilitating the maintenance and featuring low costs. In other embodiments, the lens fixing frame 22 may alternatively be non-detachably mounted on the bracket base 21 to ensure the structural strength and firmness of the camera module 10.

In some embodiments, as shown in FIG. 3, the camera module 10 may further include a light-transmitting protective cover 7. The structural strength of the protective cover 7 is relatively high. The protective cover 7 is mounted on the module bracket 2 and covers a plurality of lenses (31a, 31b, and 31c) to protect the lenses or lens groups of the plurality of lenses (31a, 31b, and 31c). In this case, the lenses (31a, 31b, and 31c) in the lens group 3 are placed close to the protective cover 7, and relatively far away from the reflective member 5, so as to shorten an optical path between the lenses (31a, 31b, and 31c) and the protective cover 7, and increase an optical path between the lenses (31a, 31b, and 31c) and the reflective member 5, so that the camera module 10 can use a lens with a longer equivalent focal length to implement a telephoto shooting function or even an ultra-telephoto shooting function. In addition, because the lens group 3 is placed close to the protective cover 7, although the protective cover 7 has no field of view, the lenses (31a, 31b, and 31c) in the lens group 3 have a field of view, so the camera module 10 can obtain a larger quantity of light rays, thus achieving higher shooting quality. It can be understood that when the distance between the lens group 3 and the protective cover 7 is relatively long, the external light is easily blocked by the structure between the lens group 3 and the protective cover 7, resulting in insufficient light rays for the camera module 10. Therefore, during the design, the lens group 3 can be placed as close to the protective cover 7 as possible. The protective cover 7 can be made of glass material, or high-permeability plastic material.

In some other embodiments, each lens of the lens group 3 may have an independent protective cover, and the protective cover of each lens is fixed to the lens barrel to protect the lens. In this case, the lens fixing frame 22 is in a sealed connection with the top of the bracket base 21, the lens fixing frame 22 is in a sealed connection with the lens, and the lens is partially exposed outside the module bracket 2.

In some embodiments, as shown in FIG. 3, the camera module 10 may further include a motor assembly 8. The motor assembly 8 is mounted on the module bracket 2. The image sensor 4 is mounted in the motor assembly 8. The motor assembly 8 is configured to adjust a position of the image sensor 4 to enable the camera module 10 to implement image focusing, thereby obtaining a clearer target image. A direction of adjusting the image sensor 4 by the motor assembly 8 is designed based on the optical path of the camera module 10. For example, in the embodiment shown in FIG. 3, the motor assembly 8 can drive the image sensor 4 to float left and right, that is, move in the direction X.

Figure 6A:
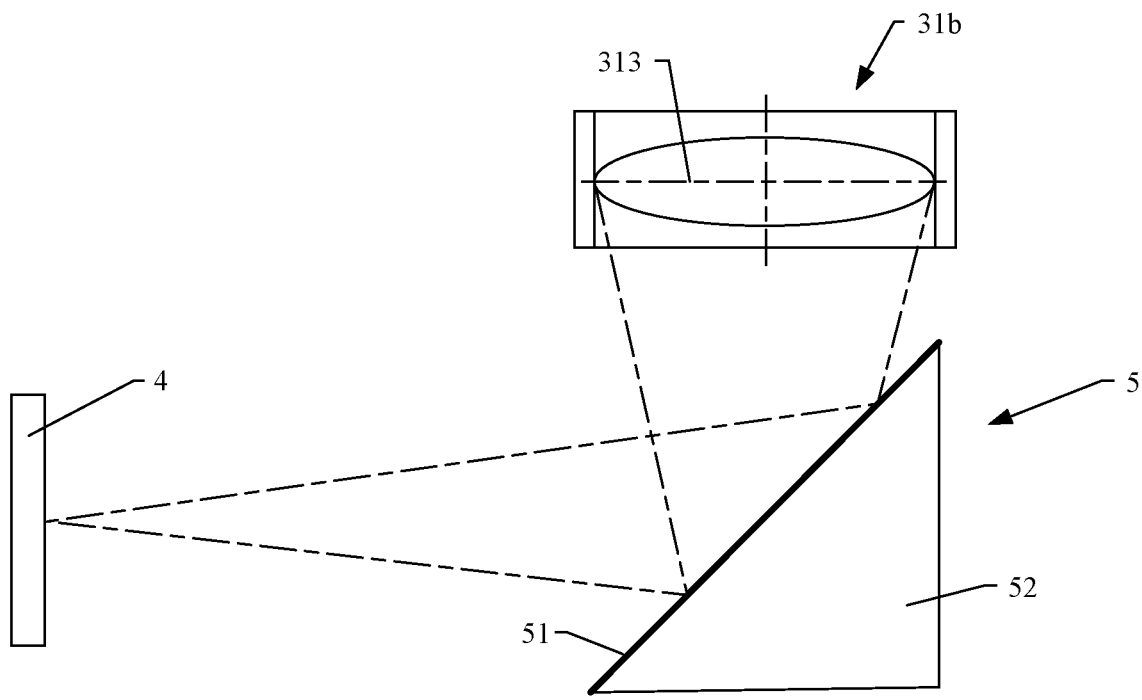
FIG. 6A is a schematic structural diagram of a reflective member of the camera module shown in FIG. 3 in an implementation manner.

It can be understood that the structure of the reflective member 5 in the foregoing embodiment can be implemented in a plurality of manners. Examples are as follows:

In an implementation manner, FIG. 6A is a schematic structural diagram of a reflective member 5 of the camera module 10 shown in FIG. 3 in an implementation manner. To illustrate the structure and position of the reflective member 5, FIG. 6A shows both the lens 31b and the image sensor 4 of the camera module 10.

The reflective member 5 includes a reflective layer 51 for reflecting light. The reflective member 5 may further include a substrate 52. The reflective layer 51 is formed on a side surface of the substrate 52 facing the lens 31b corresponding to the reflective member 5. In this case, the reflective layer 51 is arranged toward the lens 31b and is inclined relative to the equivalent center plane 313 of the lens 31b.

The shape of the substrate 52 may have a plurality of implementation forms, such as a triangular prism, a cuboid, a flat plate, or an irregular shape. The shape of the reflective layer 51 may be a circle, a square, a triangle, an irregular shape, or the like. The material of the substrate 52 may be transparent or opaque. In this implementation manner, an example in which the substrate 52 is in the shape of a triangular prism is used for description. The reflective layer 51 is formed on a side surface of the substrate 52. The reflective layer 51 has a square shape.

The reflective layer 51 may be a film layer formed by coating a material on a side surface of the substrate 52, or may be formed by fixing a formed film layer to a side surface of the substrate 52, or may be formed by performing a processing operation such as grinding on a side surface of the substrate 52. In this embodiment of this application, the composition and the forming manner of the reflective layer 51 are not strictly limited.

In the foregoing implementation manner, because the reflective layer 51 is formed on the side surface of the substrate 52 facing the lens 31b corresponding to the reflective member 5, the light is reflected by the reflective layer 51 without entering the substrate 52, and a light loss is small, helping ensure the shooting quality of the camera module 10.

Figure 6B:
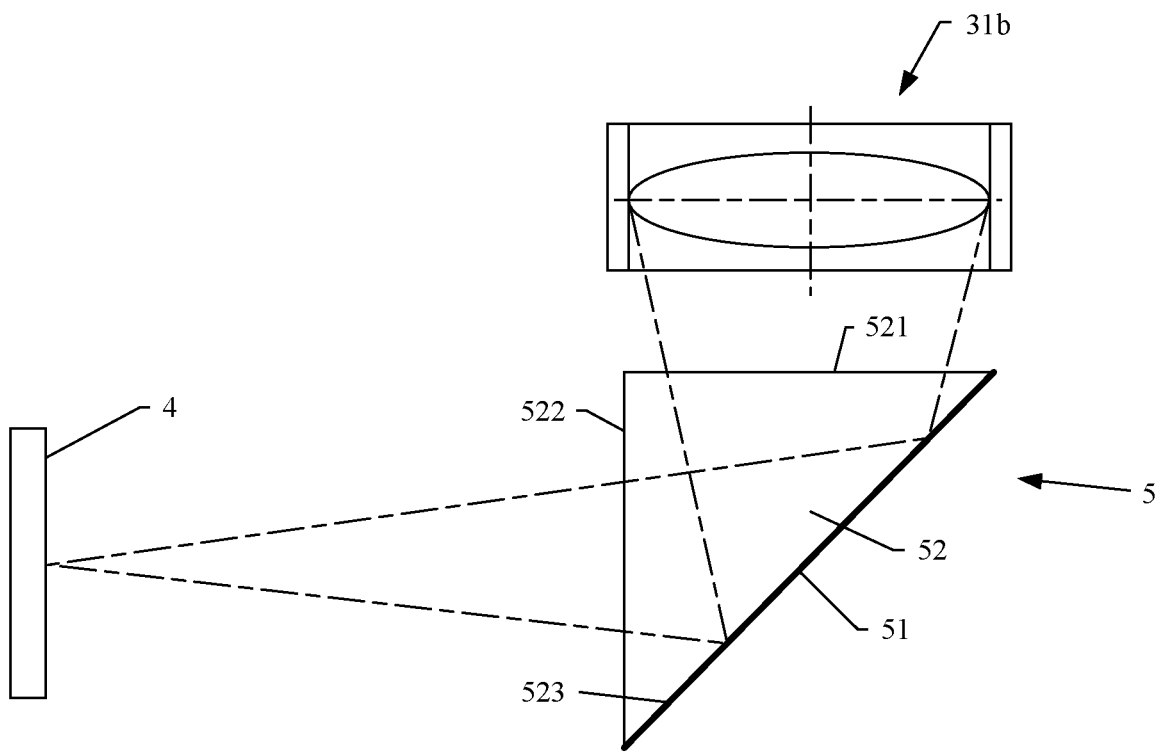
FIG. 6B is a schematic structural diagram of a reflective member of the camera module shown in FIG. 3 in another implementation manner.

In another implementation manner, FIG. 6B is a schematic structural diagram of a reflective member 5 of the camera module 10 shown in FIG. 3 in another implementation manner. To illustrate the structure and position of the reflective member 5, FIG. 6B shows both the lens 31b and the image sensor 4 of the camera module 10. FIG. 6B does not show the refraction of light when the light enters and exits the surface of the reflective member 5. The following mainly describes the difference between this implementation manner and the foregoing implementation manner, and most of the technical content of this implementation manner that is the same as the foregoing implementation manner is not repeated hereinafter.

The reflective member 5 may include a reflective layer 51 for reflecting light. The reflective member 5 may further include a substrate 52. The substrate 52 is made of a transparent material. The substrate 52 includes a first side surface 521, a second side surface 522, and a third side surface 523. The first side surface 521 faces the lens 31b corresponding to the reflective member 5. The second side surface 522 faces the image sensor 4. The reflective layer 51 is formed on the third side surface 523 and is configured to reflect the light entering the substrate 52 from the first side surface 521 to the second side surface 522. For example, the substrate 52 is a triangular prism. The two sides of the first side surface 521 are respectively connected to the second side surface 522 and the third side surface 523, the side of the second side surface 522 away from the first side surface 521 is connected to the side of the third side surface 523 away from the first side surface 521.

In this implementation manner, the light rays focused by the lens 31b enter the substrate 52 from the first side surface 521, and after being reflected by the reflective layer 51, the light rays exit the substrate 52 from the second side surface 522 and then are directed toward the image sensor 4. Therefore, although a slight loss occurs after the light enters the substrate 52, a propagation path of the light has increased, so that the camera module 10 can set a lens with a larger focal length, thereby implementing telephoto shooting or even ultra-telephoto shooting.

Figure 6C:
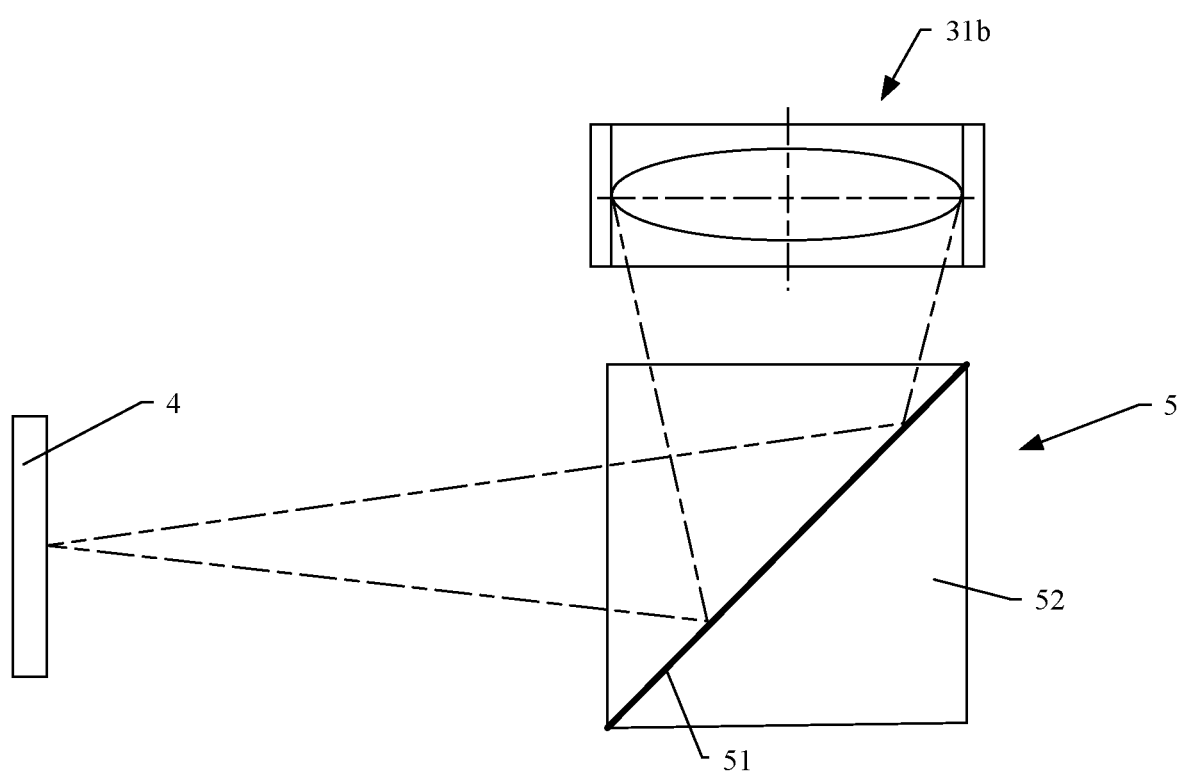
FIG. 6C is a schematic structural diagram of a reflective member of the camera module shown in FIG. 3 in still another implementation manner.

In still another implementation manner, FIG. 6C is a schematic structural diagram of a reflective member 5 of the camera module 10 shown in FIG. 3 in still another implementation manner. To illustrate the structure and position of the reflective member 5, FIG. 6C shows both the lens 31b and the image sensor 4 of the camera module 10. FIG. 6C does not show the refraction of light when the light enters and exits the surface of the reflective member 5. The following mainly describes the difference between this implementation manner and the foregoing implementation manner, and most of the technical content of this implementation manner that is the same as the foregoing implementation manner is not repeated hereinafter.

The reflective member 5 may include a reflective layer 51 for reflecting light. The reflective member 5 may further include a substrate 52. The substrate 52 may be made of a transparent material. The reflective layer 51 is embedded in the substrate 52. The reflective member 5 can be made through in-mold injection molding.

In this implementation manner, the reflective member 5 increases the length of the light transmission path in the camera module 10, helping the camera module 10 implement telephoto shooting or ultra-telephoto shooting. In addition, the reflective layer 51 is arranged inside the substrate 52, and the substrate 52 protects the reflective layer 51 to prevent the reflective layer 51 from being worn during manufacturing or assembling of the reflective member 5, thereby ensuring the reliability of the camera module 10.

It can be understood that the structure of the reflective member 5 and the positional relationship between the reflective member 5 and the lenses in the lens group 3 can alternatively be implemented in other manners, which are not strictly limited in this application.

In some embodiments of this application, the position and size of the reflective layer 51 are reasonably designed, so that the reflective member 5 can reflect sufficient light rays to the image sensor 4 to ensure the shooting quality of the camera module 10.

Figure 7:
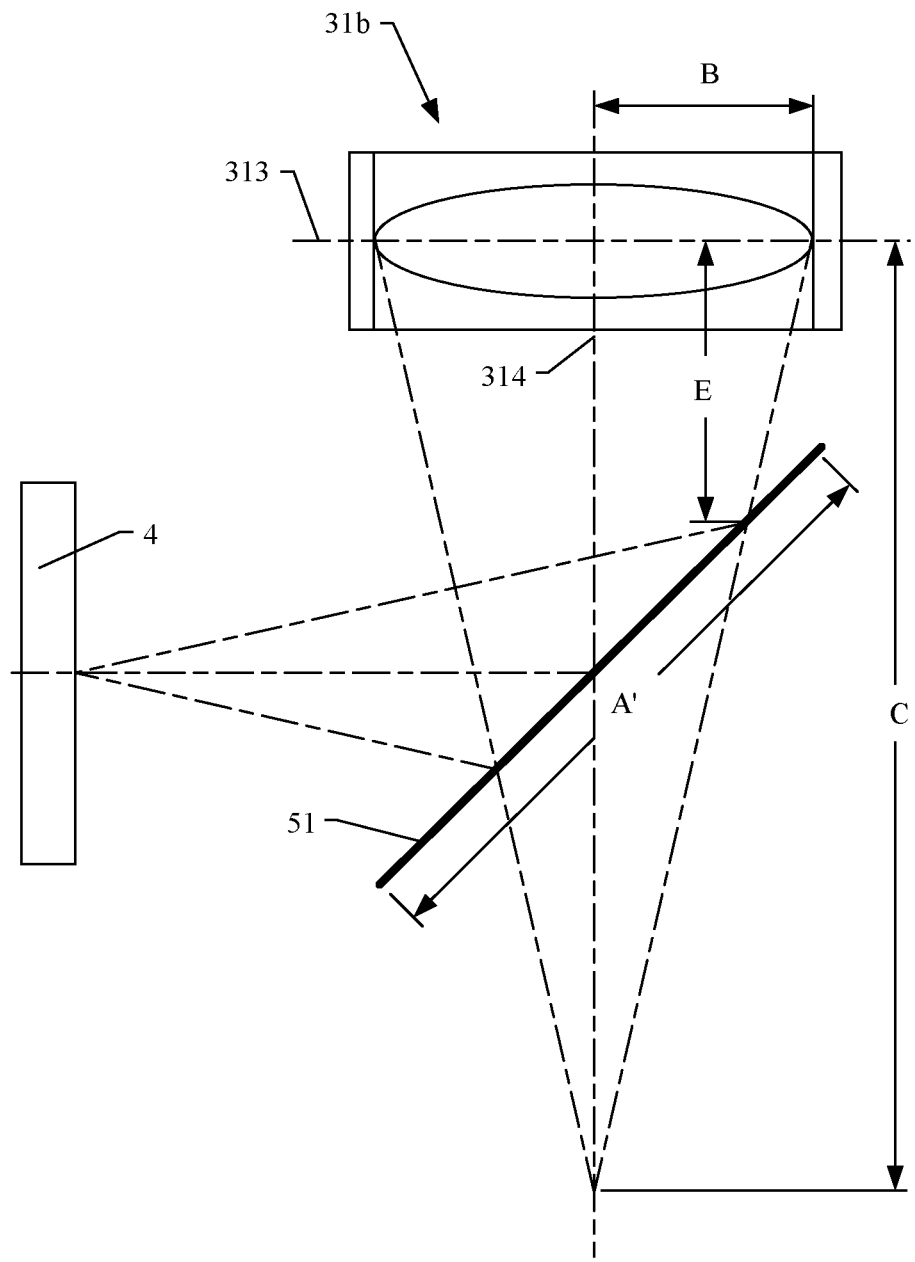
FIG. 7 is a schematic diagram of a positional relationship between a reflective layer of a reflective member of the camera module shown in FIG. 3 and a lens corresponding to the reflective member.

For example, FIG. 7 is a schematic diagram of a positional relationship between a reflective layer 51 of a reflective member 5 of the camera module 10 shown in FIG. 3 and a lens 31b corresponding to the reflective member 5. An included angle between the reflective layer 51 and the main optical axis 314 of the lens 31b corresponding to the reflective member 5 is 45°. In this case, the light passing through the lens 31b is deflected by 90° after being reflected by the reflective layer 51, thereby smoothly entering the image sensor 4.

In an example, when the reflective member 5 is located at the dwell position 61 b (refer to FIG. 3), the center of the reflective layer 51 is located on the main optical axis 314 of the lens 31b corresponding to the reflective member 5. In another example, the center of the reflective layer 51 may alternatively slightly deviate from the main optical axis 314 of the lens 31b corresponding to the reflective member 5. For example, the reflective layer 51 may deviate from the main optical axis 314 of the lens 31b corresponding to the reflective member 5 in a direction away from the image sensor 4, so as to better reflect light rays focused by the lens 31b to the image sensor 4. In some embodiments, the lens group 3 may include a reference lens. In the embodiment shown in FIG. 7, the illustrated reference lens is the lens 31b currently corresponding to the reflective member 5. A width A' of the reflective layer 51 is a radial size passing through the center point of the reflective layer 51. The reflective layer 51 may have a plurality of widths A' in different radial directions. A minimum width A of the reflective layer 51 meets the following:

$$A \geq \frac{\sqrt{2} \cdot B(B+C)(C-E)}{B^2 + C^2},$$

where B represents a radius of the reference lens, C represents an equivalent focal length of the reference lens, and E represents a minimum distance between the equivalent center plane of the reference lens and the reflective layer 51. In the embodiment shown in FIG. 7, B represents the radius of the lens 31b, C represents the equivalent focal length of the lens 31b, and E represents the minimum distance between the equivalent center plane 313 of the lens 31b and the reflective layer 51.

In this embodiment, when all the widths A of the reflective layer 51 are greater than or equal to the minimum width A, the reflective layer 51 can reflect all the light rays focused by the reference lens. That is, with the limitation on the minimum width of the reflective layer 51, all the light rays can enter the reflective layer 51 after being focused by the reference lens, and then be reflected to the image sensor 4, so that the camera module 10 can collect sufficient light rays to achieve better shooting quality.

It can be understood that all the widths A' of the reflective layer 51 are greater than or equal to the minimum width A, and therefore the width at the narrowest position of the reflective layer 51 is also greater than or equal to the minimum width A. For example, if the reflective layer 51 is rectangular, and the short-side size of the reflective layer 51 is smaller than the long-side size, the short-side size of the reflective layer 51 is greater than or equal to the minimum width A. Alternatively, if the reflective layer 51 is circular, the diameter of the reflective layer 51 is greater than or equal to the minimum width A.

In the foregoing embodiment, the reference lens may be one of the lenses in the lens group 3, and the reference lens can be selected in a plurality of manners. Examples are as follows:

In an example, the reference lens may be the lens with the largest equivalent focal length in the lens group 3. For example, the reference lens may be a telephoto lens or an ultra-telephoto lens in the lens group 3. In this case, the reflective layer 51 has a sufficiently large area and can reflect all the light rays focused by the lenses in the lens group 3 to the image sensor 4, so that the camera module 10 can collect sufficient light rays in various shooting modes to achieve better shooting quality.

In another example, the reference lens may be a standard lens in the lens group 3. In this case, light rays focused by a lens (such as a wide-angle lens) with an equivalent focal length less than or equal to that of the standard lens can be all reflected by the reflective layer 51 to the image sensor 4, so that the camera module 10 achieves better shooting quality in the corresponding shooting mode. For a lens (such as a telephoto lens) with an equivalent focal length greater than that of the standard lens, the reflective layer 51 can also reflect most of light rays focused by the lens to the image sensor 4, so that the camera module 10 achieves good shooting quality in the corresponding shooting mode. Because the size of the reflective layer 51 in this embodiment is designed according to the standard lens, the size of the reflective layer 51 is smaller than the size of the reflective layer 51 in the foregoing example, facilitating miniaturization of the camera module 10.

In this embodiment of this application, the driving assembly 6 is configured to drive the reflective member 5 to move, so that the reflective member 5 is switched between the dwell positions. The plurality of dwell positions are arranged in a one-to-one correspondence with the plurality of lenses in the lens group 3. Therefore, the arrangement manner of the driving assembly 6 is designed based on the arrangement manner of a plurality of lenses.

In some embodiments, FIG. 3 illustrates an example arrangement manner of the plurality of lenses in the lens group 3: the plurality of lenses (31a, 31b, and 31c) have the same incident light direction, and the plurality of lenses (31a, 31b, and 31c) are arranged in a straight line. The incident light direction of the lens is a direction in which external light enters the lens. The driving assembly 6 is configured to drive the reflective member 5 to move. The moving direction of the reflective member 5 is consistent with the arrangement direction of the plurality of lenses (31a, 31b, and 31c).

In this embodiment, the plurality of lenses (31a, 31b, and 31c) are arranged in a straight line, making appearance of the camera module 10 and the electronic device 100 more concise, and helping simplify a structure of the driving assembly 6, so that when the driving assembly 6 drives the reflective member 5 to move, the movement of the reflective member 5 is more stable, thereby improving the reliability of the camera module 10.

It can be understood that there may be a plurality of ways for the driving assembly 6 to drive the reflective member 5 to move. For example, mechanical driving, that is, driving by a motor, and transmission through a nut and a lead screw, a gear and a rack, or a rope; electromagnetic driving, that is, movement is implemented through attraction and repulsion between an electromagnet and an electromagnet or a permanent magnet; manual adjustment, that is, a part of the structure of the driving assembly 6 is exposed outside the module bracket and adjusted by human hands; manual-automatic integrated adjustment, that is, integration of an automatic adjustment mode and a manual adjustment mode; and intelligent material deformation adjustment.

Figure 8:
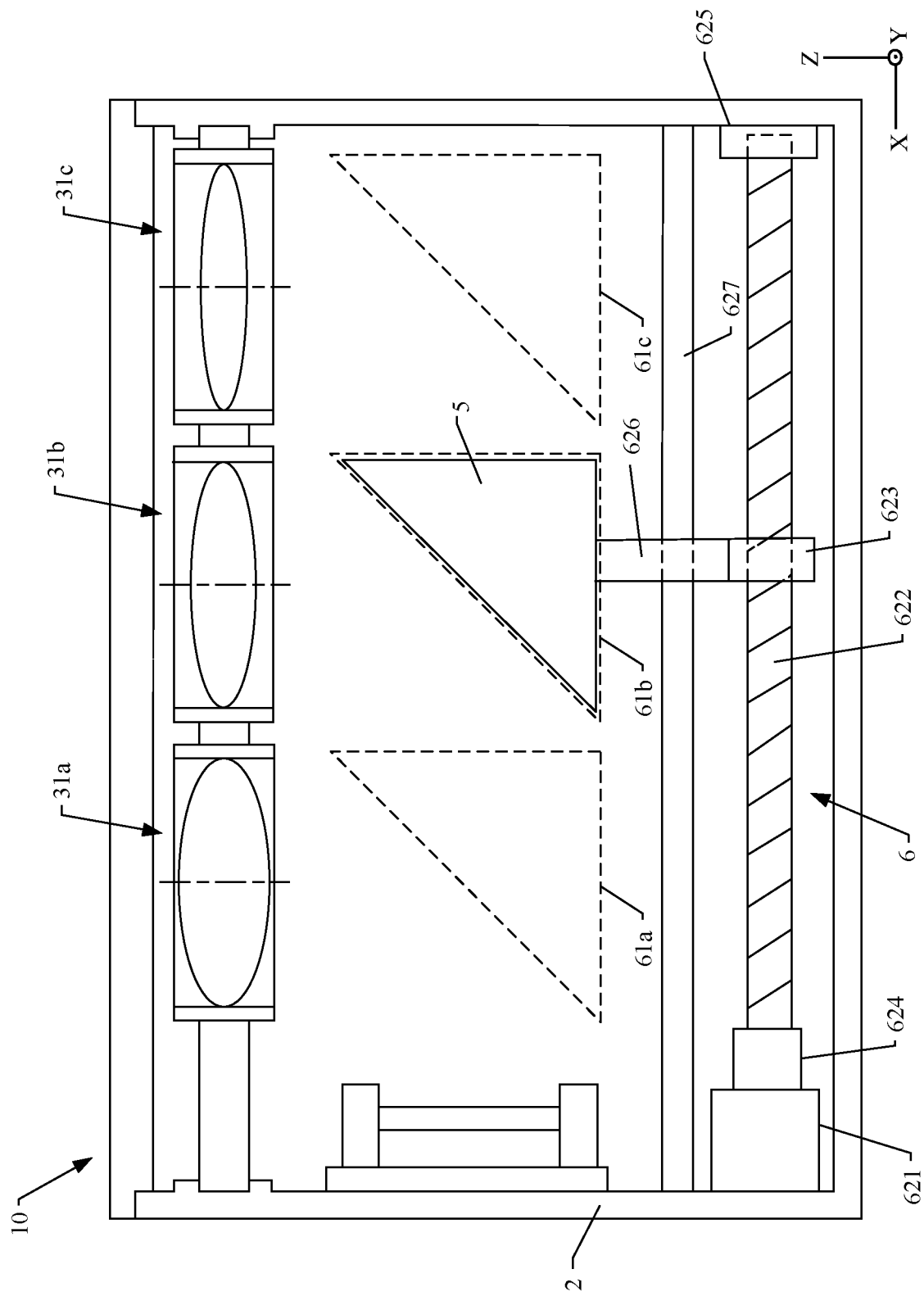
FIG. 8 is a schematic structural diagram of the camera module shown in FIG. 3 in an example.

In an example, FIG. 8 is a schematic structural diagram of the camera module 10 shown in FIG. 3 in an example. In this example, the driving mode of the driving assembly 6 is the mechanical driving mode.

In this example, the driving assembly 6 may include a motor 621, a lead screw 622, and a nut 623. The extending direction of the lead screw 622 is parallel to the arrangement direction of the plurality of lenses (31a, 31b, and 31c). In this example, the plurality of lenses (31a, 31b, and 31c) may be arranged in the width direction X of the camera module 10. The nut 623 is sleeved on the outer side of the lead screw 622 and is threadedly connected to the lead screw 622. The reflective member 5 is fixedly connected to the nut 623. In this embodiment of this application, that two components are fixedly connected means that after the two components are connected, they remain in a fixed state. The connection between the two components here is not limited to a detachable connection or a non-detachable connection, and is not limited to a direct connection or an indirect connection, either. The motor 621 is configured to drive the lead screw 622 to rotate, so as to drive the reflective member 5 to move between the plurality of dwell positions (61a, 61b, and 61c) through the nut 623. The motor 621 is coupled to the processor of the electronic device 100, and the motor 621 performs corresponding operations based on a signal sent by the processor, such as forward rotation, reverse rotation, and stopping rotation.

In this example, the driving assembly 6 uses the manner of driving by a motor 621 and transmission by a nut 623 and a lead screw 622, to enable the reflective member 5 to move between the dwell positions (61a, 61b, and 61c). The driving manner of the driving assembly 6 is stable and highly controllable, making the camera module 10 more reliable.

In some embodiments, the motor 621 may be a stepper motor. In this case, the control manner of the motor 621 may be closed-loop control, which can improve the control accuracy of the moving position of the reflective member 5, and make the driving action of the driving assembly 6 more reliable and accurate, so as to ensure the shooting quality of the camera module 10.

In some other embodiments, the driving assembly 6 may further include a speed reducer 624. The speed reducer 624 is connected between the motor 621 and the lead screw 622. The speed reducer 624 can reduce the output rotational speed of the motor 621 and increase the output torque. For example, the speed reducer 624 may be a gearbox.

In some other embodiments, the motor 621 may be fixedly connected to the module bracket 2. The driving assembly 6 may further include a bearing 625. The bearing 625 is fixedly connected to the module bracket 2 and is spaced apart from the motor 621. The end of the lead screw 622 away from the motor 621 is mounted on the bearing 625. In this case, the bearing 625 can reduce the frictional force when the lead screw 622 rotates, so that the rotation of the lead screw 622 is smoother, so as to reduce the probability of malfunction of the camera module 10.

In some embodiments, the lead screw 622 may have a right-handed external thread. When the motor 621 drives the lead screw 622 to rotate to the right, the nut 623 drives the reflective member 5 to move to the right, so that the camera module 10 implements zooming. When the motor 621 drives the lead screw 622 to rotate to the left, the nut 623 drives the reflective member 5 to move to the left, so that the camera module 10 implements zooming.

In some other embodiments, the driving assembly 6 may further include a transmission member 626. One end of the transmission member 626 is connected to the nut 623. The other end of the transmission member 626 is connected to the reflective member 5. That is, the transmission member 626 is connected between the reflective member 5 and the nut 623. In an implementation manner, the transmission member 626 and the nut 623 may be integrally formed. In another implementation manner, the transmission member 626 and the nut 623 may alternatively be assembled to form an integrated structure. It can be understood that, in another implementation manner, the driving assembly 6 may not include the transmission member 626. Instead, the structure of the reflective member 5 is designed so that the reflective member 5 has a transmission portion (equivalent to the foregoing transmission member 626). The driving assembly 6 can make the reflective member 5 move between the dwell positions by controlling the transmission portion.

In some other embodiments, the driving assembly 6 may further include a guide rod 627. The guide rod 627 is fixedly connected to the module bracket 2. The extending direction of the guide rod 627 is parallel to the extending direction of the lead screw 622. The transmission member 626 is provided with a guide hole. The guide rod 627 passes through the guide hole. The guide rod 627 is configured to guide the moving direction of the transmission member 626, so that the transmission member 626 can more smoothly drive the reflective member 5 to move. The sliding connection relationship between the guide rod 627 and the transmission member 626 can alternatively be implemented by arranging a T-shaped block in one of the guide rod 627 and the transmission member 626, and a T-shaped groove in the other one of the guide rod 627 and the transmission member 626, and making the T-shaped block and the T-shaped groove cooperate with each other. The sliding connection relationship between the guide rod 627 and the transmission member 626 can alternatively be implemented by using another cooperation structure, which is not strictly limited in this embodiment of this application.

Figure 9:
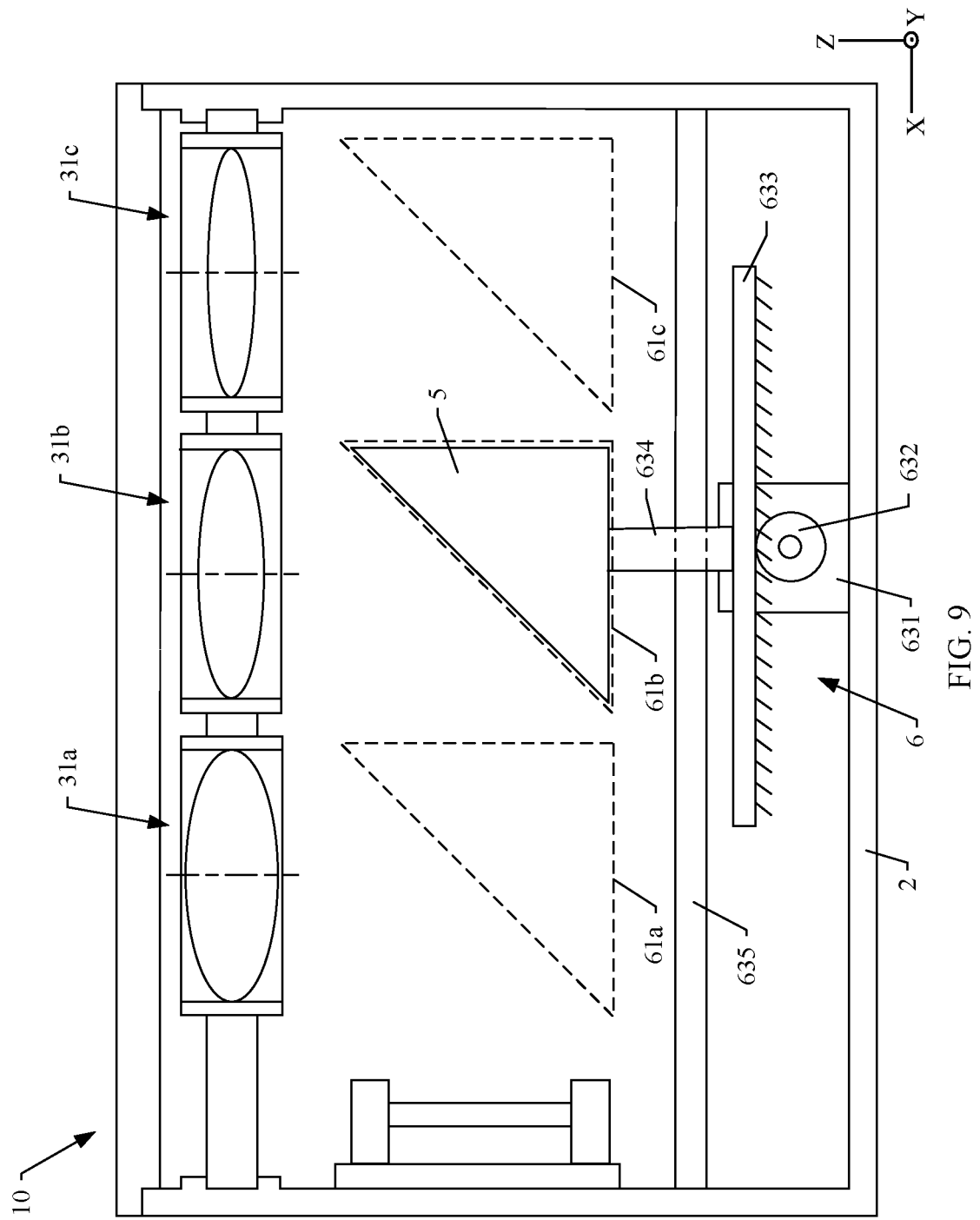
FIG. 9 is a schematic structural diagram of the camera module shown in FIG. 3 in another example.

In another example, FIG. 9 is a schematic structural diagram of the camera module 10 shown in FIG. 3 in another example. In this example, the driving mode of the driving assembly 6 is the mechanical driving mode.

In this example, the driving assembly 6 may include a motor 631, a gear assembly 632, and a rack 633. The motor 631 is fixedly connected to the module bracket 2. The gear assembly 632 includes an input gear and an output gear linked with the input gear. In an implementation manner, the output gear meshes with the input gear. In another implementation manner, one or more connecting gears are connected between the output gear and the input gear. The motor 631 is connected to the input gear to drive the input gear to rotate. The output gear meshes with the rack 633. The extending direction of the rack 633 is parallel to the arrangement direction of the plurality of lenses (31a, 31b, and 31c). The reflective member 5 is fixedly connected to the rack 633. When the motor 631 drives the input gear to rotate, the input gear drives the rack 633 to move, and the rack 633 drives the reflective member 5 to move between a plurality of dwell positions (61a, 61b, and 61c), so that the camera module 10 implements zooming. The motor 631 is coupled to the processor of the electronic device 100, and the motor 631 performs corresponding operations based on a signal sent by the processor, such as forward rotation, reverse rotation, and stopping rotation.

In some embodiments, the motor 631 may be a stepper motor. In this case, the control manner of the motor 631 is closed-loop control, which can improve the control accuracy of the moving position of the reflective member 5, and make the driving action of the driving assembly 6 more reliable and accurate, so as to ensure the shooting quality of the camera module 10.

In some other embodiments, there may be one or more output gears. When there are a plurality of output gears, the plurality of output gears mesh with different positions of the rack 633 to synchronously drive the rack 633 to move. In this case, the rack 633 moves more smoothly.

In some other embodiments, the driving assembly 6 may further include a transmission member 634. One end of the transmission member 634 is connected to the rack 633. The other end of the transmission member 634 is connected to the reflective member 5. That is, the transmission member 634 is connected between the reflective member 5 and the rack 633. In an implementation manner, the transmission member 634 and the rack 633 may be integrally formed. In another implementation manner, the transmission member 634 and the rack 633 may alternatively be assembled to form an integrated structure. It can be understood that in another implementation manner, the driving assembly 6 does not include the transmission member 634. The structure of the reflective member 5 is designed so that the reflective member 5 has a transmission portion (equivalent to the foregoing transmission member 634). The driving assembly 6 can make the reflective member 5 move between the dwell positions (61a, 61b, and 61c) by controlling the transmission portion.

In some other embodiments, the driving assembly 6 may further include a guide rod 635. The guide rod 635 is fixedly connected to the module bracket 2. The extending direction of the guide rod 635 is parallel to the extending direction of the rack 633. The transmission member 634 is provided with a guide hole. The guide rod 635 passes through the guide hole. The guide rod 635 is configured to guide the moving direction of the transmission member 634, so that the transmission member 634 can more smoothly drive the reflective member 5 to move. The sliding connection relationship between the guide rod 635 and the transmission member 634 can alternatively be implemented by arranging a T-shaped block in one of the guide rod 635 and the transmission member 634, and a T-shaped groove in the other one of the guide rod 627 and the transmission member 626, and making the T-shaped block and the T-shaped groove cooperate with each other. The sliding connection relationship between the guide rod 635 and the transmission member 634 can alternatively be implemented by using another cooperation structure, which is not strictly limited in this embodiment of this application.

Figure 10:
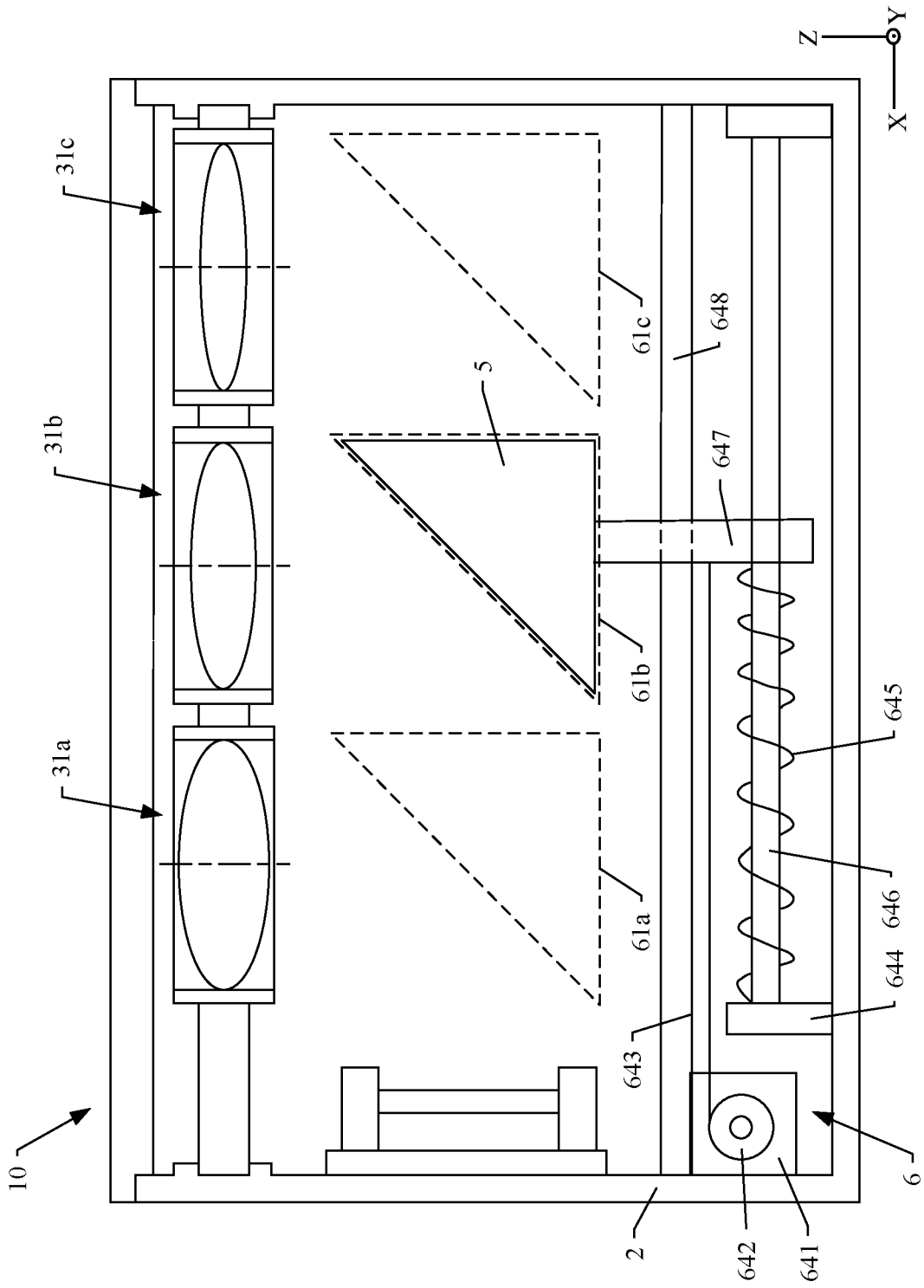
FIG. 10 is a schematic structural diagram of the camera module shown in FIG. 3 in still another example.

In still another example, FIG. 10 is a schematic structural diagram of the camera module 10 shown in FIG. 3 in still another example. In this example, the driving mode of the driving assembly 6 is the mechanical driving mode.

In this example, the driving assembly 6 may include a motor 641, a rope sheave 642, a transmission rope 643, a spring fixing seat 644, and a spring 645. The motor 641 is fixedly connected to the module bracket 2. The rope sheave 642 is connected to the motor 641, and the motor 641 is configured to drive the rope sheave 642 to rotate. One end of the transmission rope 643 is fixedly connected to the reflective member 5. The other end of the transmission rope 643 is fixedly connected to the rope sheave 642. The motor 641 is configured to drive the rope sheave 642 to rotate, so that the transmission rope 643 is wound to the rope sheave 642 or released from the rope sheave 642. The motor 641 is coupled to the processor of the electronic device 100, and the motor 641 performs corresponding operations based on a signal sent by the processor, such as forward rotation, reverse rotation, and stopping rotation. The spring fixing seat 644 is fixedly connected to the module bracket 2. One end of the spring 645 is connected to or abuts against the spring fixing seat 644. The other end of the spring 645 is connected to or abuts against the reflective member 5.

When the motor 641 drives the rope sheave 642 to rotate in the first direction, the transmission rope 643 is wound to the rope sheave 642, the transmission rope 643 drives the reflective member 5 to move to the left, and in the process of driving the reflective member 5 to move, overcomes the elastic force of the spring 645, and compresses the spring 645, so that the camera module 10 implements zooming. When the motor 641 drives the rope sheave 642 to rotate in a second direction opposite to the first direction, the rope sheave 642 releases the transmission rope 643, and the reflective member 5 moves to the right under the elastic force of the spring 645, so that the camera module 10 implements zooming.

In some embodiments, the motor 641 may be a stepper motor. In this case, the control manner of the motor 641 is closed-loop control, which can improve the control accuracy of the moving position of the reflective member 5, and make the driving action of the driving assembly 6 more reliable and accurate, so as to ensure the shooting quality of the camera module 10.

In some embodiments, the driving assembly 6 may further include a spring center shaft 646. One end of the spring center shaft 646 is fixedly connected to the spring fixing seat 644. The extending direction of the spring center shaft 646 is parallel to the arrangement direction of the plurality of lenses (31a, 31b, and 31c). The spring 645 is sleeved on the outer side of the spring center shaft 646. In this case, the spring center shaft 646 can restrict the movement of the spring 645 during the tension or compression of the spring 645, so as to avoid interference between the spring 645 and the transmission rope 643, so that the reliability of the driving assembly 6 is higher.

In some embodiments, the driving assembly 6 may further include a transmission member 647. One end of the transmission member 647 is connected to the reflective member 5. The transmission rope 643 is connected to the other end of the transmission member 647 so as to be indirectly connected to the reflective member 5. The spring 645 is connected to or abuts against the other end of the transmission member so as to be indirectly connected to or abut against the reflective member 5. It can be understood that in another implementation manner, the driving assembly 6 does not include the transmission member 647. The structure of the reflective member 5 is designed so that the reflective member 5 has a transmission portion (equivalent to the foregoing transmission member 647). The driving assembly 6 can make the reflective member 5 move between a plurality of dwell positions (61a, 61b, and 61c) by controlling the transmission portion.

In some embodiments, the end of the spring center shaft 646 away from the spring fixing seat 644 can be connected to the transmission member 647 through sliding, so as to guide and restrict the transmission member 647, so that the movement of the transmission member 647 and the reflective member 5 is smoother.

In some other embodiments, the driving assembly 6 may further include a guide rod 648. The extending direction of the guide rod 648 is parallel to the arrangement direction of the plurality of lenses (31a, 31b, and 31c). The transmission member 647 is provided with a guide hole. The guide rod 648 passes through the guide hole. The guide rod 648 is configured to guide the moving direction of the transmission member 647, so that the transmission member 647 can more smoothly drive the reflective member 5 to move. The sliding connection relationship between the guide rod 648 and the transmission member 647 can alternatively be implemented by arranging a T-shaped block in one of the guide rod 648 and the transmission member 647, and a T-shaped groove in the other one of the guide rod 648 and the transmission member 647, and making the T-shaped block and the T-shaped groove cooperate with each other. The sliding connection relationship between the guide rod 648 and the transmission member 647 can alternatively be implemented by using another cooperation structure, which is not strictly limited in this embodiment of this application.

In some other embodiments, the position at which the transmission member 647 is connected to the transmission rope 643 may be located between the position at which the transmission member 647 is connected to the guide rod 648 and the position at which the transmission member 647 is connected to the spring center shaft 646. In this case, the transmission member 647 is restricted by both the guide rod 648 and the spring center shaft 646 during movement, making the movement smoother.

In some other embodiments, the driving assembly 6 may not be provided with the guide rod 648, and instead the moving direction of the transmission member 647 is restricted by the spring center shaft 646.

In some other embodiments, the driving assembly 6 may further include a speed reducer (not shown in the figure). The speed reducer is connected between the motor 641 and the rope sheave 642. The speed reducer can reduce the output rotational speed of the motor 641 and increase the output torque. The speed reducer may be presented as a gearbox.

It can be understood that the spring 645 may alternatively be replaced with another elastic member.

Figure 11:
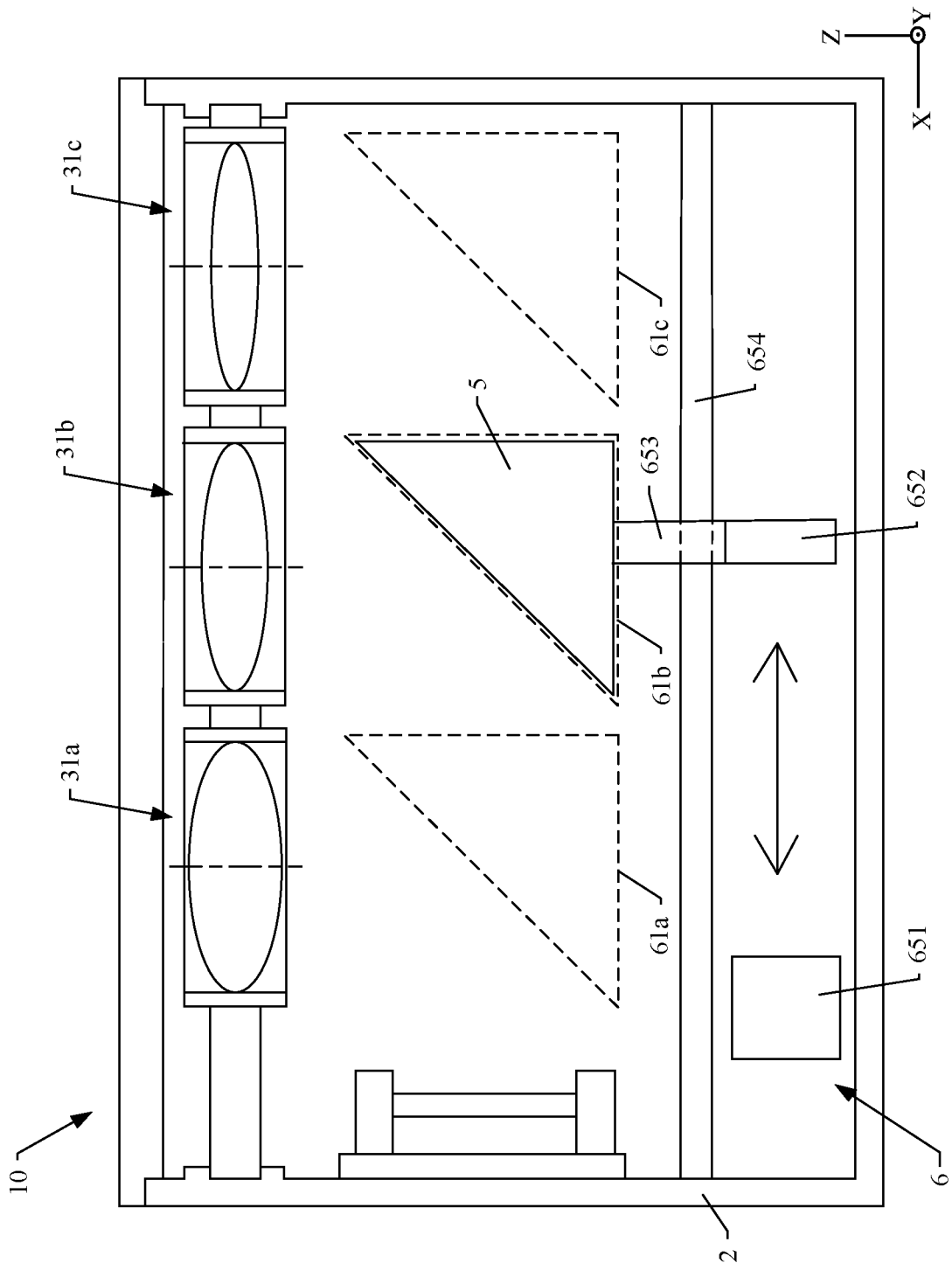
FIG. 11 is a schematic structural diagram of the camera module shown in FIG. 3 in still another example.

In still another example, FIG. 11 is a schematic structural diagram of the camera module 10 shown in FIG. 3 in still another example. In this example, the driving mode of the driving assembly 6 is the electromagnetic driving mode.

In this example, the driving assembly 6 may include an electromagnet 651 and a magnetic body 652. The magnetic body 652 is fixedly connected to the reflective member 5. The electromagnet 651 is fixedly connected to the module bracket 2. The electromagnet 651 is coupled to the processor. The electromagnet 651 performs corresponding operations based on a signal sent by the processor, such as generating an electromagnetic field repelling the magnetic body 652, generating an electromagnetic field attracting the magnetic body 652, and skipping generating an electromagnetic field.

In this example, by controlling the magnitude and direction of the energized current of the electromagnet 651, the electromagnetic field generated by the electromagnet 651 is controlled, that is, the magnitude and position of the magnetic force of the electromagnet 651 on the magnetic member are controlled, so that the magnetic body 652 is close to or away from the electromagnet 651. In this way, the magnetic body 652 can drive the reflective member 5 to move to the corresponding dwell positions (61a, 61b, and 61c), so that the camera module 10 implements zooming.

In some embodiments, the magnetic body 652 may be a structure using a magnetic material, a permanent magnet, or an electromagnet. When the magnetic body 652 is an electromagnet, the magnetic body 652 is coupled to the processor 50.

In some other embodiments, the driving assembly 6 may further include a transmission member 653. One end of the transmission member 653 is connected to the magnetic body 652. The other end of the transmission member 653 is connected to the reflective member 5. That is, the transmission member 653 is connected between the reflective member 5 and the magnetic body 652. In an implementation manner, the transmission member 653 and the magnetic body 652 may be integrally formed. In another implementation manner, the transmission member 653 and the magnetic body 652 may alternatively be assembled to form an integrated structure. It can be understood that in another implementation manner, the driving assembly 6 does not include the transmission member 653. The structure of the reflective member 5 is designed so that the reflective member 5 has a transmission portion (equivalent to the foregoing transmission member 653). The driving assembly 6 can make the reflective member 5 move between a plurality of dwell positions (61a, 61b, and 61c) by controlling the transmission portion.

In some embodiments, the driving assembly 6 may further include a guide rod 654. The guide rod 654 is fixedly connected to the module bracket 2. The extending direction of the guide rod 654 is parallel to the arrangement direction of the plurality of lenses (31a, 31b, and 31c). The transmission member 653 is provided with a guide hole. The guide rod 654 passes through the guide hole. The guide rod 654 is configured to guide the moving direction of the transmission member 653, so that the transmission member 653 can more smoothly drive the reflective member 5 to move. The sliding connection relationship between the guide rod 654 and the transmission member 653 can alternatively be implemented by arranging a T-shaped block in one of the guide rod 654 and the transmission member 653, and a T-shaped groove in the other one of the guide rod 654 and the transmission member 653, and making the T-shaped block and the T-shaped groove cooperate with each other. The sliding connection relationship between the guide rod 654 and the transmission member 653 can alternatively be implemented by using another cooperation structure, which is not strictly limited in this embodiment of this application.

Figure 12:
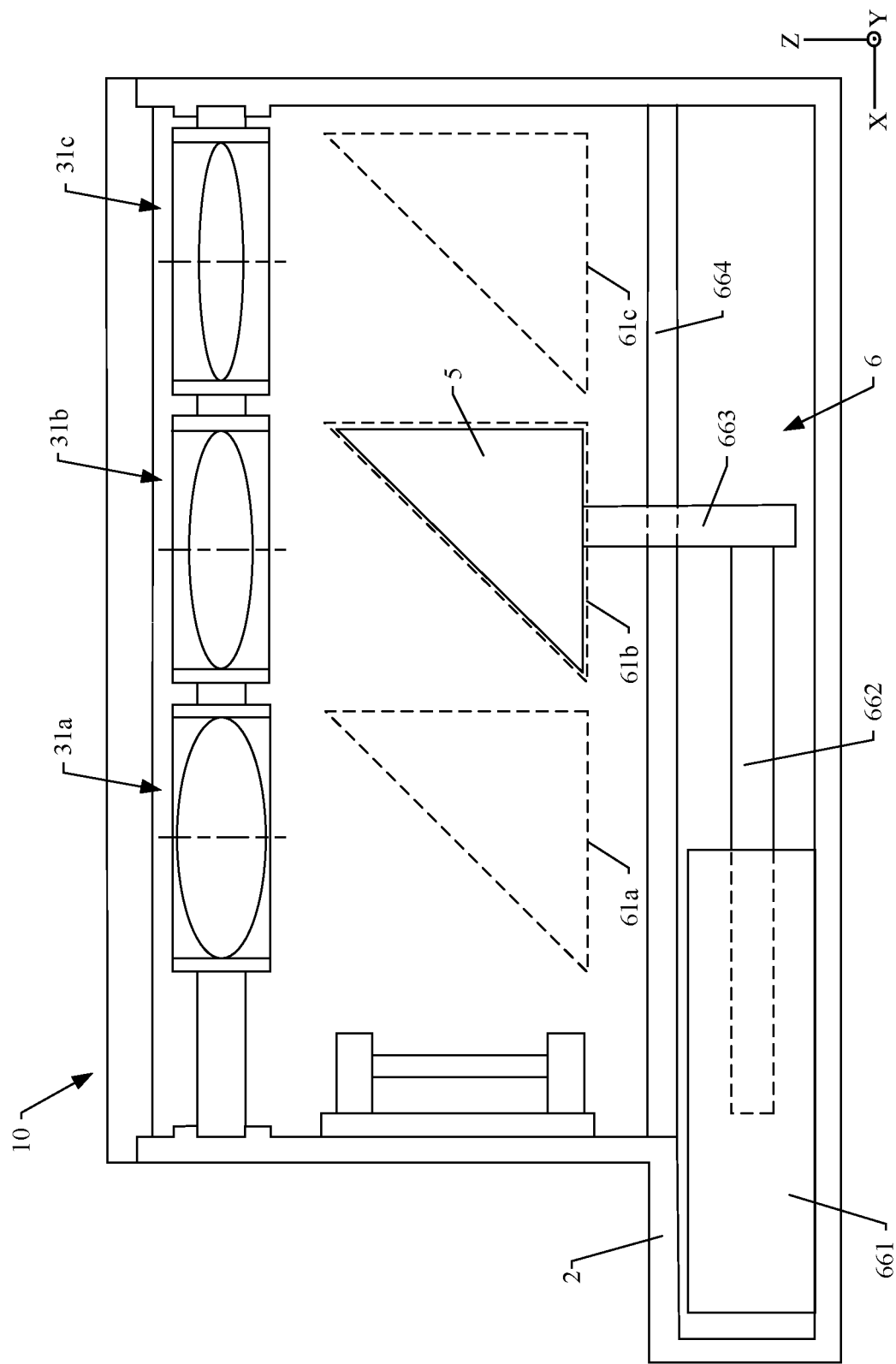
FIG. 12 is a schematic structural diagram of the camera module shown in FIG. 3 in still another example.

In still another example, FIG. 12 is a schematic structural diagram of the camera module 10 shown in FIG. 3 in still another example. In this example, the driving mode of the driving assembly 6 is the electromagnetic driving mode.

In this example, the driving assembly 6 includes a hollow electromagnet 661 and a magnetic core 662. The hollow electromagnet 661 is fixedly connected to the module bracket 2. One end of the magnetic core 662 is fixedly connected to the reflective member 5. The other end of the magnetic core 662 extends into the hollow electromagnet 661. The hollow electromagnet 661 is coupled to the processor. The hollow electromagnet 661 performs corresponding operations based on a signal sent by the processor, such as generating an electromagnetic field repelling the magnetic core 662, generating an electromagnetic field attracting the magnetic core 662, and skipping generating an electromagnetic field.

In this example, by controlling the magnitude and direction of the energized current of the hollow electromagnet 661, the electromagnetic field generated by the hollow electromagnet 661 is controlled, that is, the magnitude and position of the magnetic force of the hollow electromagnet 661 on the magnetic core 662 are controlled, so that the magnetic core 662 is close to or away from the electromagnet 651. In this way, the magnetic core 662 can drive the reflective member 5 to move to the corresponding dwell positions (61a, 61b, and 61c), so that the camera module 10 implements zooming.

In some embodiments, the magnetic core 662 may be a structure using a magnetic material, a permanent magnet, or an electromagnet. When the magnetic core 662 is an electromagnet, the magnetic core 662 is coupled to the processor.

In some other embodiments, the driving assembly 6 may further include a transmission member 663. One end of the transmission member 663 is connected to the magnetic core 662. The other end of the transmission member 663 is connected to the reflective member 5. That is, the transmission member 663 is connected between the reflective member 5 and the magnetic core 662. In an implementation manner, the transmission member 663 and the magnetic core 662 may be integrally formed. In another implementation manner, the transmission member 663 and the magnetic core 662 may alternatively be assembled to form an integrated structure. It can be understood that in another implementation manner, the driving assembly 6 does not include the transmission member 663. The structure of the reflective member 5 is designed so that the reflective member 5 has a transmission portion (equivalent to the foregoing transmission member 663). The driving assembly 6 can make the reflective member 5 move between a plurality of dwell positions (61a, 61b, and 61c) by controlling the transmission portion.

In some other embodiments, the driving assembly 6 may further include a guide rod 664. The guide rod 664 is fixedly connected to the module bracket 2. The extending direction of the guide rod 664 is parallel to the arrangement direction of the plurality of lenses (31a, 31b, and 31c). The transmission member 663 is provided with a guide hole. The guide rod 664 passes through the guide hole. The guide rod 664 is configured to guide the moving direction of the transmission member 663, so that the transmission member 663 can more smoothly drive the reflective member 5 to move. The sliding connection relationship between the guide rod 664 and the transmission member 663 can alternatively be implemented by arranging a T-shaped block in one of the guide rod 664 and the transmission member 663, and a T-shaped groove in the other one of the guide rod 664 and the transmission member 663, and making the T-shaped block and the T-shaped groove cooperate with each other. The sliding connection relationship between the guide rod 664 and the transmission member 663 can alternatively be implemented by using another cooperation structure, which is not strictly limited in this embodiment of this application.

Figure 13:
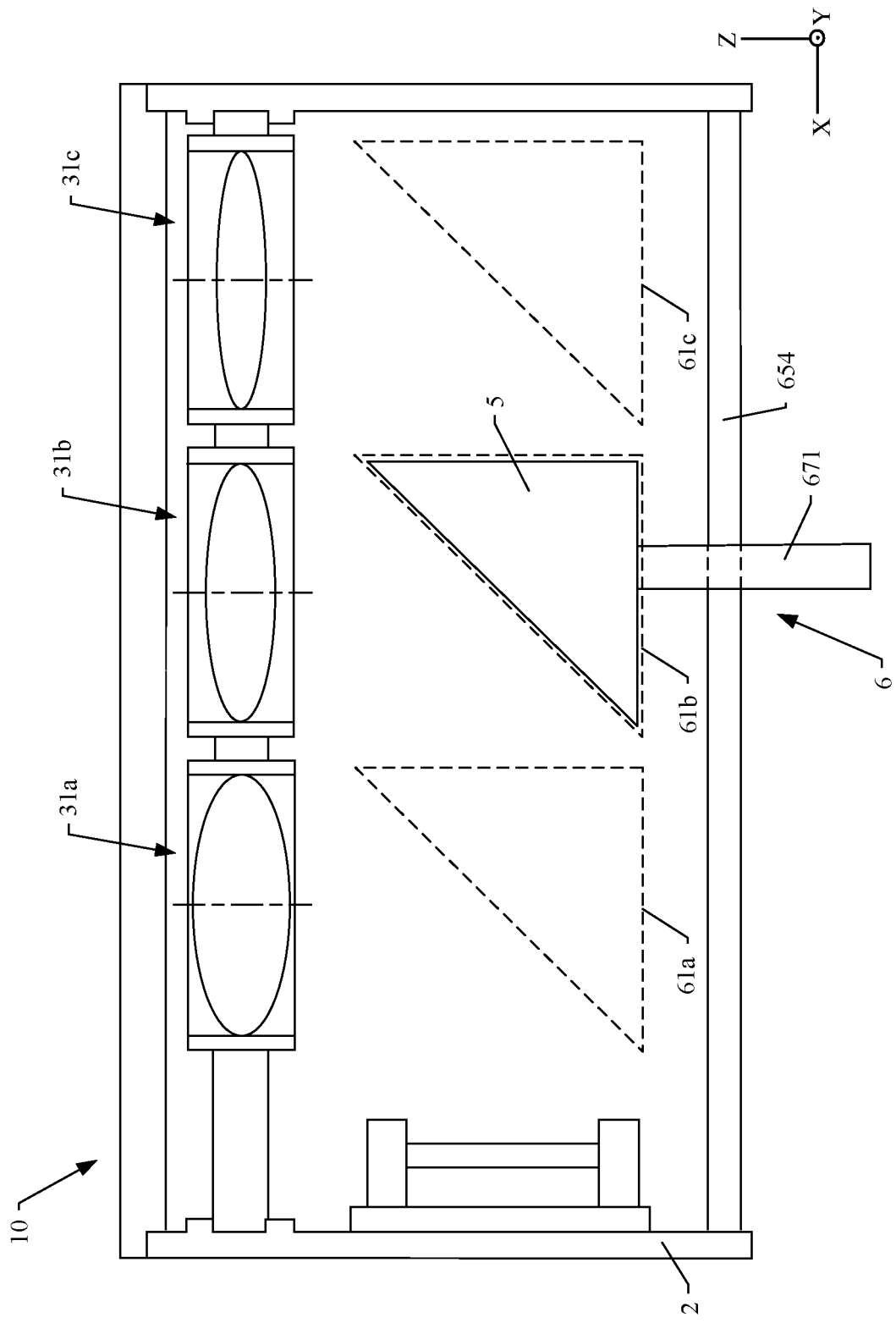
FIG. 13 is a schematic structural diagram of the camera module shown in FIG. 3 in still another example.

In still another example, FIG. 13 is a schematic structural diagram of the camera module 10 shown in FIG. 3 in still another example. In this example, the driving mode of the driving assembly 6 is the manual adjustment mode.

In this example, the driving assembly 6 may include a transmission member 671 and a guide rod 672. The transmission member 671 is fixedly connected to the reflective member 5. The guide rod 672 is fixedly connected to the module bracket 2. The extending direction of the guide rod 672 is parallel to the arrangement direction of the plurality of lenses (31a, 31b, and 31c). The transmission member 671 is provided with a guide hole. The guide rod 672 passes through the guide hole. The guide rod 672 is configured to guide the moving direction of the transmission member 671, so that the transmission member 671 can more smoothly drive the reflective member 5 to move. The sliding connection relationship between the guide rod 672 and the transmission member 671 can alternatively be implemented by arranging a T-shaped block in one of the guide rod 672 and the transmission member 671, and a T-shaped groove in the other one of the guide rod 672 and the transmission member 671, and making the T-shaped block and the T-shaped groove cooperate with each other. The sliding connection relationship between the guide rod 672 and the transmission member 671 can alternatively be implemented by using another cooperation structure, which is not strictly limited in this application.

The end of the transmission member 671 away from the reflective member 5 stretches out of the module bracket 2. In an implementation manner, the end of the transmission member 671 away from the reflective member 5 is directly exposed to the outside of the electronic device 100, and the user can toggle the transmission member 671 to drive the reflective member 5 to move between the plurality of dwell positions (61a, 61b, and 61c), so as to reflect light rays focused by the lenses (31a, 31b, and 31c) with different equivalent focal lengths, so that the camera module 10 implements zooming. In another implementation manner, the driving assembly 6 may further include a toggle member (not shown) partially exposed to the outside of the electronic device 100. The end of the transmission member 671 away from the reflective member 5 is connected to the toggle member. The user can move the toggle member to drive the transmission member 671 and the reflective member 5 to move between the plurality of dwell positions (61a, 61b, and 61c), so that the camera module 10 implements zooming. In this embodiment, the user can manually adjust the position of the reflective member 5 to meet the shooting needs, making the shooting process more interesting and improving user experience.

In some embodiments, the transmission member 671 (or the toggle member) may stretch out of the camera module 10 from the light entrance side (that is, the side on which the lens group 3 is arranged) of the camera module 10, or may stretch out of the camera module 10 from the non-light entrance side of the camera module 10. It can be understood that the position at which the transmission member 671 (or the toggle member) stretches out of the camera module 10 may be flexibly set, which is not strictly limited in this application.

Figure 14:
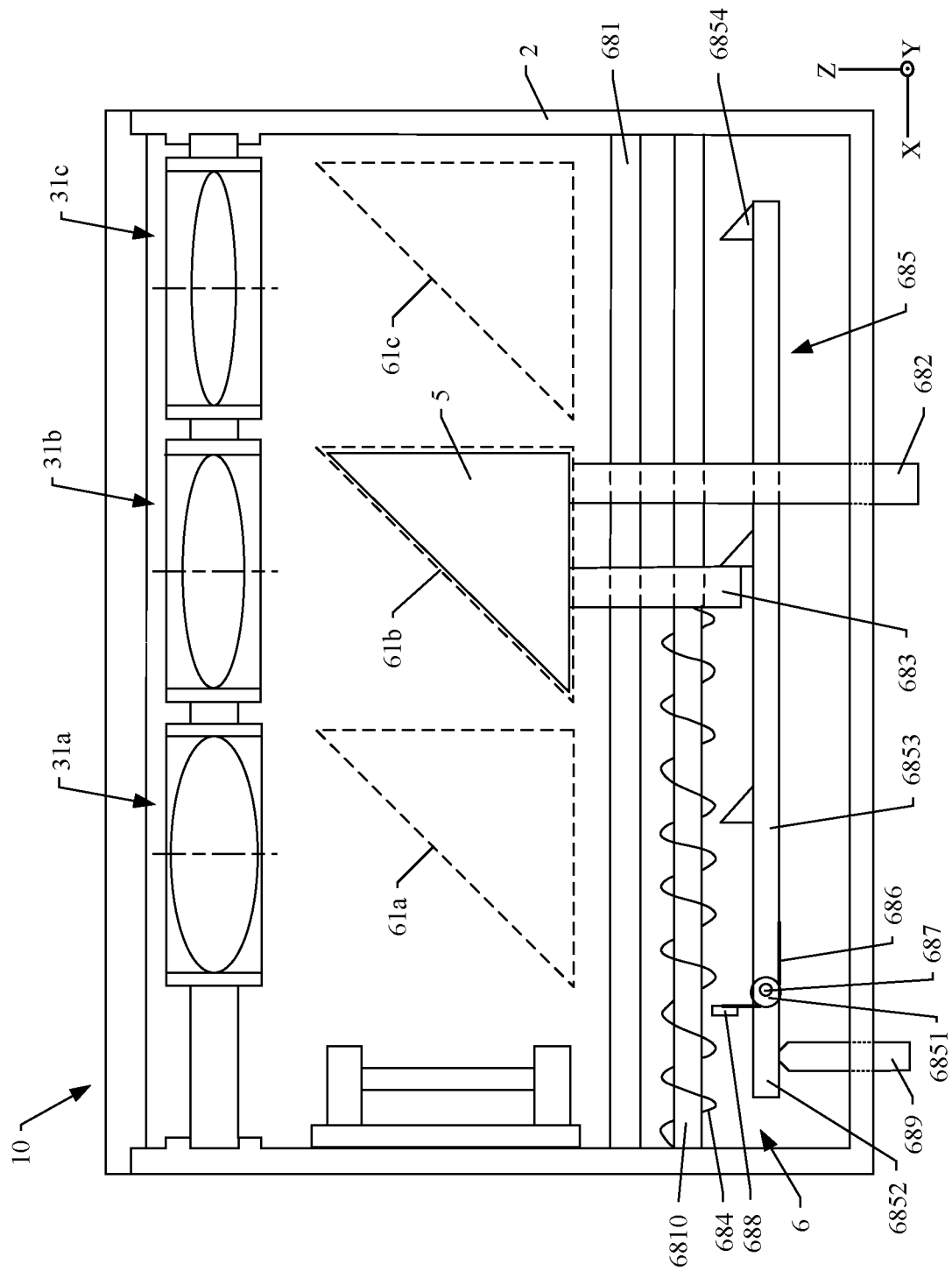
FIG. 14 is a schematic structural diagram of the camera module shown in FIG. 3 in still another example.

In still another example, FIG. 14 is a schematic structural diagram of the camera module 10 shown in FIG. 3 in still another example. In this example, the driving mode of the driving assembly 6 is the manual adjustment mode.

In this example, the driving assembly 6 may include a guide rod 681, a transmission member 682, a stopping member 683, a spring 684, a hook swing lever 685, a torsion spring 686, a hook swing lever hinge 687, a torsion spring stopping member 688, and a pressing rod 689.

The guide rod 681 is fixedly connected to the module bracket 2. The extending direction of the guide rod 681 is parallel to the arrangement direction of the plurality of lenses (31*a*, 31*b*, and 31*c*). One end of the transmission member 682 is fixedly connected to the reflective member 5, and the other end of the transmission member 682 stretches out of the module bracket 2. One end of the stopping member 683 is fixedly connected to the reflective member 5. In this case, the transmission member 682, the reflective member 5, and the stopping member 683 move or stop synchronously. One or both of the transmission member 682 and the stopping member 683 are provided with a guide hole, so as to be sleeved on the outer side of the guide rod 681 through the guide hole, and be connected to the guide rod 681 through sliding. In this case, the guide rod 681 can guide and restrict the movement of the reflective member 5 through one or both of the transmission member 682 and the stopping member 683, so as to make the movement of the reflective member 5 smoother. The sliding connection between one or both of the transmission member 682 and the stopping member 683 and the guide rod 681 may alternatively be in another manner, such as the cooperation of a T-shaped groove and a T-shaped block.

One end of the spring 684 abuts against or connects to the stopping member 683, and the other end of the spring 684 abuts against or connects to the module bracket 2. The hook swing lever 685 includes a rotating section 6851, and a pressing section 6852 and a stopping section 6853 that are respectively connected to both ends of the rotating section 6851. The rotating section 6851 of the hook swing lever 685 is rotatably connected to the module bracket 2 through the hook swing lever hinge 687. The torsion spring stopping member 688 is fixedly connected to the module bracket 2. The torsion spring 686 is sleeved on the outer side of the hook swing lever hinge 687, and one end of the torsion spring 686 abuts against or connects to the torsion spring stopping member 688, and the other end of the torsion spring 686 abuts against or connects to the stopping section 6853 of the hook swing lever 685. The stopping section 6853 of the hook swing lever 685 includes a plurality of stopping hooks 6854 arranged at intervals. The plurality of stopping hooks 6854 correspond to the plurality of dwell positions (61*a*, 61*b*, and 61*c*), that is, the plurality of stopping hooks 6854 and the plurality of lenses (31*a*, 31*b*, and 31*c*) are arranged in a one-to-one correspondence, the plurality of stopping hooks 6854 are configured to hook the end of the stopping member 683 away from the reflective member 5 under the elastic force of the torsion spring 686, so as to restrict the positions of the stopping member 683 and the reflective member 5. The pressing rod 689 is connected to the module bracket 2 through sliding. One end of the pressing rod 689 stretches out of the module bracket 2, and the other end of the pressing rod 689 is arranged directly facing the pressing section 6852 of the hook swing lever 685.

When the reflective member 5 is in a still state, the spring 684 abuts against the stopping member 683 upward, and the torsion spring 686 exerts a counterclockwise elastic force on the stopping section 6853 of the hook swing lever 685, so that the stopping section 6853 of the hook swing lever 685 abuts against one end of the stopping member 683, and one of the hooks of the hook swing lever 685 hooks the stopping member 683 to keep the stopping member 683 and the reflective member 5 stable.

When the reflective member 5 needs to move to the left, the user toggles the transmission member 682 to the left, the stopping member 683 moves to the left in the extending direction of the guide rod 681, and the stopping member 683 overcomes the elastic force of the spring 684 and compresses the spring 684. When the stopping member 683 is in contact with a right inclined surface of a hook of the hook swing lever 685, the hook swing lever 685 is forced to overcome the elastic force of the torsion spring 686 and rotate clockwise to bypass the left movement action of the stopping member 683. When the stopping member 683 moves into place, the elastic force of the torsion spring 686 resets the hook swing lever 685, and another hook on the hook swing lever 685 hooks the stopping member 683, so that the stopping member 683 and the reflective member 5 stay at a specific dwell position (61*a*/61*b*/61*c*).

When the reflective member 5 needs to move to the right, the user pushes the pressing rod 689 and the pressing rod 689 moves relative to the module bracket 2; the pressing rod 689 abuts against the pressing section 6852 of the hook swing lever 685 and pushes the pressing section 6852 of the hook swing lever 685; the hook swing lever 685 overcomes the elastic force of the torsion spring 686 and rotates clockwise; the hook of the hook swing lever 685 releases the stopping member 683; the elastic force of the spring 684 pushes the stopping member 683 to move to the right, and the stopping member 683 drives the reflective member 5 to move to the right. When the user releases the pressing rod 689 and the reflective member 5 moves into place, the elastic force of the torsion spring 686 resets the hook swing lever 685, and another hook on the hook swing lever 685 hooks the stopping member 683, so that the stopping member 683 and the reflective member 5 stay at a specific dwell position (61*a*/61*b*/61*c*).

In this example, the user can manually control the reflective member 5 to move between the plurality of dwell positions (61*a*, 61*b*, and 61*c*) by controlling the transmission member 682 and the pressing rod 689, so that the camera module 10 implements zooming.

In some embodiments, the transmission member 682 and the stopping member 683 may be two independent components, and are fixedly connected to the reflective member 5 separately. Alternatively, the transmission member 682 and the stopping member 683 may be integrally formed, or may be assembled to form an integrated structure, and then are fixedly connected to the reflective member 5. In this case, the force applied to the transmission member 682 or the stopping member 683 can be directly transmitted to each other without passing through the reflective member 5, thereby avoiding the risk of damage to the reflective member 5 due to a large force.

In some embodiments, the spring 684 may be a damping spring, making the movement of the stopping member 683 and the reflective member 5 smoother. It can be understood that in another example, the spring 684 may alternatively be replaced with another elastic member.

In some other embodiments, the driving assembly 6 may further include a spring positioning rod 6810. The spring positioning rod 6810 is fixedly connected to the module bracket 2. The extending direction of the spring positioning rod 6810 is parallel to the extending direction of the guide rod 681. The spring 684 is sleeved on the outer side of the spring positioning rod 6810. In this case, the spring positioning rod 6810 can restrict the movement of the spring 684 during the tension or compression of the spring 684, so as to avoid interference between the spring 684 and the hook swing lever 685, so that the reliability of the driving assembly 6 is higher. One or both of the reflective member 5 and the stopping member 683 may alternatively be connected to the spring positioning rod 6810 through sliding. Both the spring positioning rod 6810 and the guide rod 681 guide and restrict the movement of the reflective member 5, making the movement of the reflective member 5 smoother. In some other embodiments, the driving assembly 6 may not be provided with the spring positioning rod 6810, and the spring 684 may be sleeved on the outer side of the guide rod 681.

Figure 15:
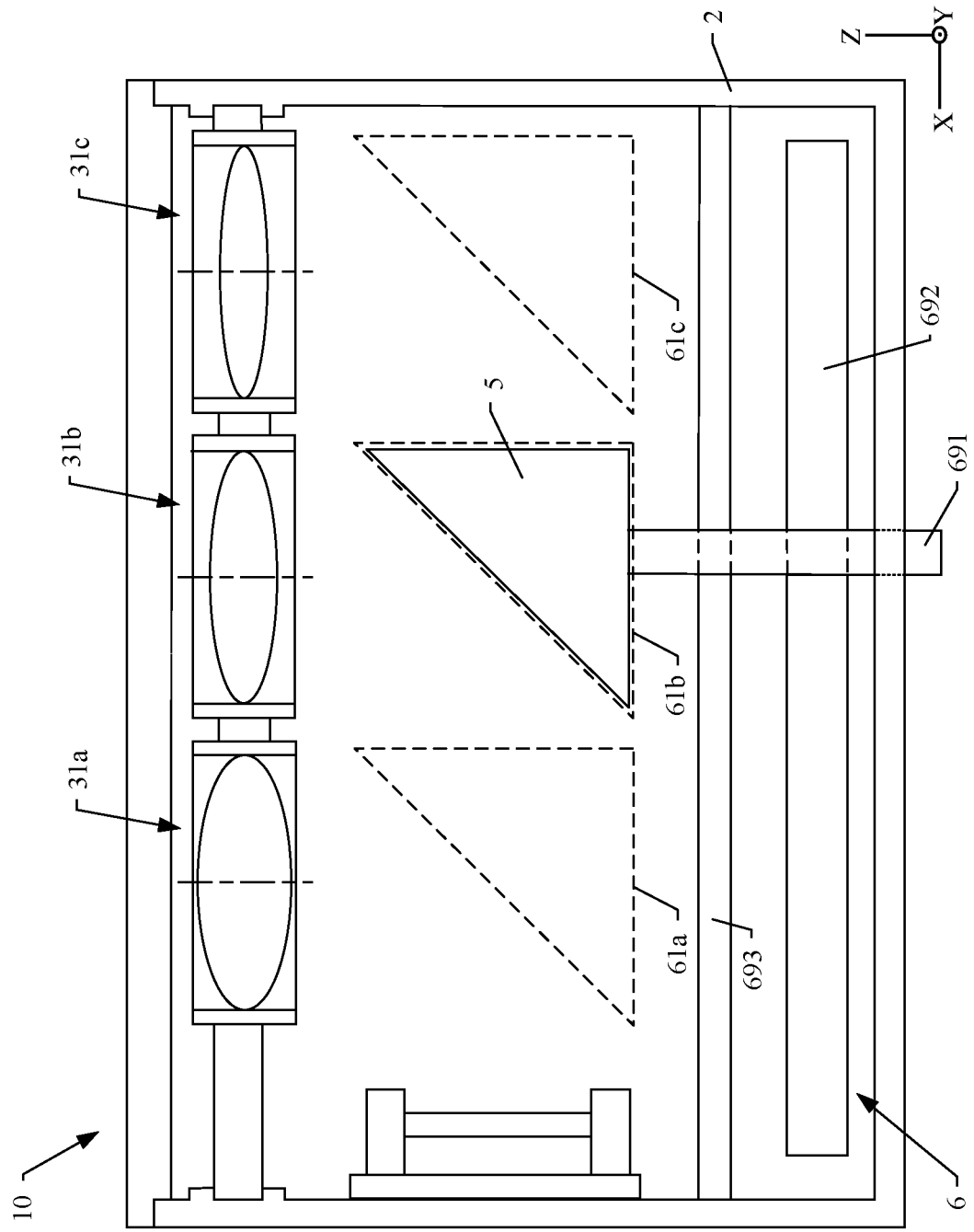
FIG. 15 is a schematic structural diagram of the camera module shown in FIG. 3 in still another example.

In still another example, FIG. 15 is a schematic structural diagram of the camera module 10 shown in FIG. 3 in still another example. In this example, the driving mode of the driving assembly 6 is the manual-automatic integrated adjustment mode.

In this example, the driving assembly 6 includes a transmission member 691 and an automatic driving part 692. One end of the transmission member 691 is fixedly connected to the reflective member 5, and the other end of the transmission member 691 stretches out of the module bracket 2. The automatic driving part 692 is a motion mechanism without a self-locking function. The automatic driving part 692 is mounted on the module bracket 2. The automatic driving part 692 is connected to the transmission member 691. The automatic driving part 692 is coupled to the processor, and is configured to perform corresponding operations based on a signal sent by the processor, such as driving the transmission member 691 to move to the left or to the right.

In this example, the driving assembly 6 integrates an automatic adjustment mode and a manual adjustment mode. The user can send a signal to the automatic driving part 692 through the processor, so that the automatic driving part 692 drives the transmission member 691 and the reflective member 5 to move, and the reflective member 5 is switched between different dwell positions (61a, 61b, and 61c) to reflect the light rays focused by the lenses (31a, 31b, and 31c) with different equivalent focal lengths, thereby implementing zooming. Alternatively, the user can manually move the transmission member 691 to drive the reflective member 5 to move, thereby implementing zooming.

In some embodiments, the automatic driving part 692 may be a mechanical driving structure, an electromagnetic driving structure, or the like. The form of the automatic driving part 692 is not strictly limited in this application.

In some other embodiments, the driving assembly 6 may further include a guide rod 693. The guide rod 693 is fixedly connected to the module bracket 2. The extending direction of the guide rod 693 is parallel to the arrangement direction of the plurality of lenses (31a, 31b, and 31c). The transmission member 691 is provided with a guide hole. The guide rod 693 passes through the guide hole. The guide rod 693 is configured to guide the moving direction of the transmission member 691, so that the transmission member 691 can more smoothly drive the reflective member 5 to move. The sliding connection relationship between the guide rod 693 and the transmission member 691 can alternatively be implemented by arranging a T-shaped block in one of the guide rod 693 and the transmission member 691, and a T-shaped groove in the other one of the guide rod 693 and the transmission member 691, and making the T-shaped block and the T-shaped groove cooperate with each other. The sliding connection relationship between the guide rod 693 and the transmission member 691 can alternatively be implemented by using another cooperation structure, which is not strictly limited in this application.

Figure 16:
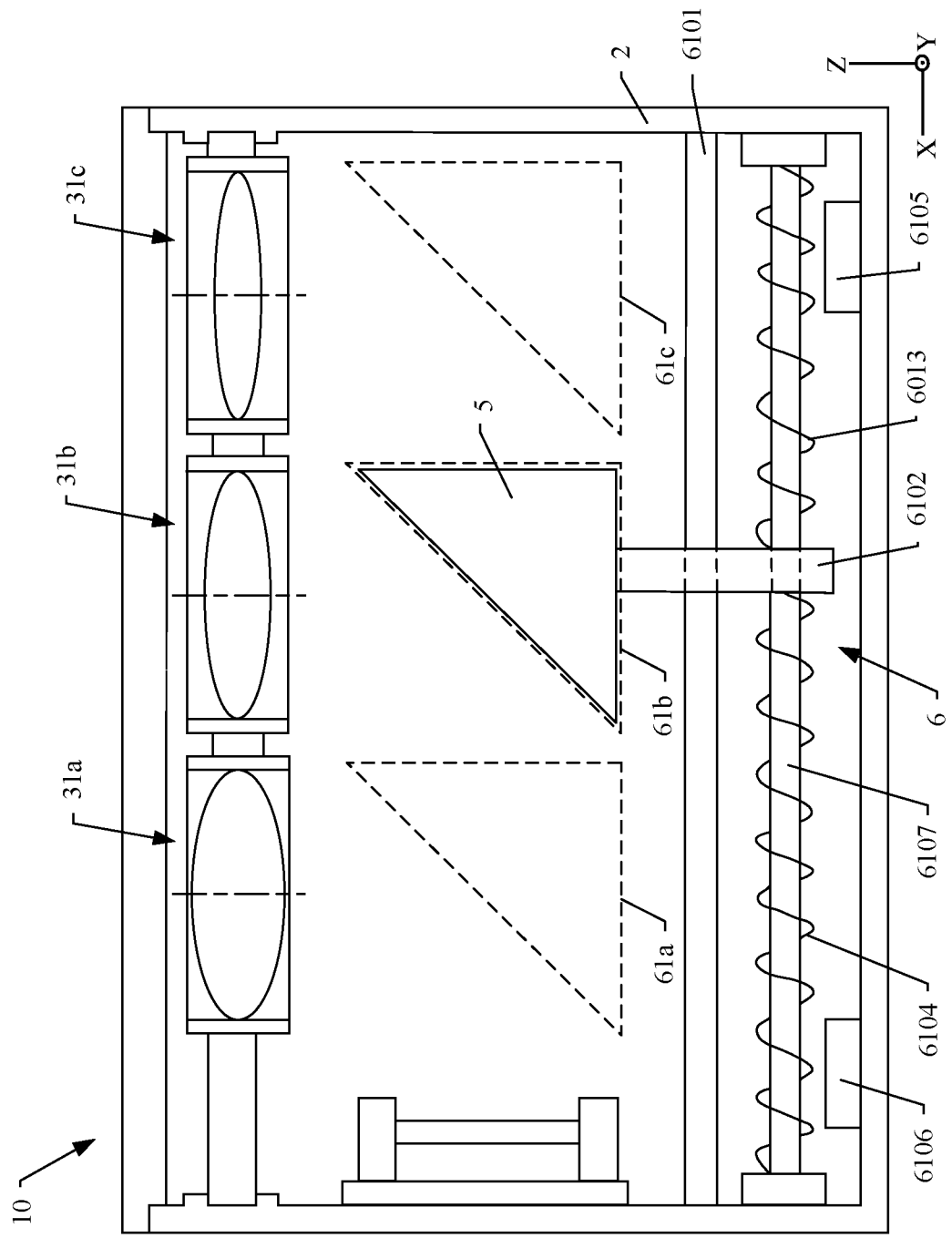
FIG. 16 is a schematic structural diagram of the camera module shown in FIG. 3 in still another example.

In still another example, FIG. 16 is a schematic structural diagram of the camera module 10 shown in FIG. 3 in still another example. In this example, the driving mode of the driving assembly 6 is the intelligent material deformation adjustment mode.

In this example, the driving assembly 6 includes a guide rod 6101, a transmission member 6102, a first memory alloy spring 6103, a second memory alloy spring 6104, a first excitation element 6105, and a second excitation element 6106.

The guide rod 6101 is fixedly connected to the module bracket 2. The extending direction of the guide rod 6101 is parallel to the arrangement direction of the plurality of lenses (31a, 31b, and 31c). One end of the transmission member 6102 is fixedly connected to the reflective member 5. The other end of the transmission member 6102 is connected to the guide rod 6101 through sliding. The transmission member 6102 is provided with a guide hole. The guide rod 6101 passes through the guide hole. The guide rod 6101 is configured to guide the moving direction of the transmission member 6102, so that the transmission member 6102 can more smoothly drive the reflective member 5 to move.

The first memory alloy spring 6103 and the second memory alloy spring 6104 are arranged in a direction parallel to the guide rod 6101, and are respectively located on both sides of the transmission member 6102. One end of the first memory alloy spring 6103 abuts against or connects to the module bracket 2, and the other end of the first memory alloy spring 6103 abuts against or connects to the transmission member 6102. One end of the second memory alloy spring 6104 abuts against or connects to the module bracket 2, and the other end of the second memory alloy spring 6104 abuts against or connects to the transmission member 6102. The first excitation element 6105 and the second excitation element 6106 are respectively located on both sides of the transmission member 6102. The first excitation element 6105 is arranged corresponding to the first memory alloy spring 6103, and the second excitation element 6106 is arranged corresponding to the second memory alloy spring 6104. After the first memory alloy spring 6103 is excited by the first excitation element 6105, the temperature and length of the first memory alloy spring 6103 increase. When the temperature of the first memory alloy spring 6103 decreases, the length of the first memory alloy spring 6103 decreases and the first memory alloy spring 6103 is restored to its original shape. After the second memory alloy spring 6104 is excited by the second excitation element 6106, the temperature and length of the second memory alloy spring 6104 increase. When the temperature of the second memory alloy spring 6104 decreases, the length of the second memory alloy spring 6104 decreases and the second memory alloy spring 6104 is restored to its original shape.

In the example in FIG. 16, the first memory alloy spring 6103 and the first excitation element 6105 are located on the right side of the transmission member 6102, and the second memory alloy spring 6104 and the second excitation element 6106 are located on the left side of the transmission member 6102. When the reflective member 5 needs to move to the left, the first excitation element 6105 excites the first memory alloy spring 6103, and the temperature and length of the first memory alloy spring 6103 increase, thereby driving the transmission member 6102 and the reflective member 5 to move to the left, so that the camera module 10 implements zooming. When the first excitation element 6105 stops exciting the first memory alloy spring 6103, the temperature and length of the first memory alloy spring 6103 decrease, and the transmission member 6102 and the reflective member 5 move to the right to the initial position. When the reflective member 5 needs to move to the right, the second excitation element 6106 excites the second memory alloy spring 6104, and the temperature and length of the second memory alloy spring 6104 increase, thereby driving the transmission member 6102 and the reflective member 5 to move to the right, so that the camera module 10 implements zooming. When the second excitation element 6106 stops exciting the second memory alloy spring 6104, the temperature and length of the second memory alloy spring 6104 decrease, and the transmission member 6102 and the reflective member 5 move to the left to the initial position.

In this example, the camera module 10 uses the first excitation element 6105 to control the first memory alloy spring 6103 and uses the second excitation element 6106 to control the second memory alloy spring 6104, so as drive the transmission member 6102 and the reflective member 5 to move. In this way, the reflective member 5 is switched between different dwell positions (61a, 61b, and 61c) to reflect light rays focused by the lenses (31a, 31b, and 31c) with different equivalent focal lengths, thereby implementing zooming.

In some embodiments, the first excitation element 6105 may be electrically driven or magnetically driven. When the first excitation element 6105 is electrically driven, the temperature of the first memory alloy spring 6103 is controlled by controlling the magnitude of the current, so as to achieve deformation. When the first excitation element 6105 is magnetically driven, the first memory alloy spring 6103 is a memory alloy with a magnetic nanoparticle shape. When the first excitation element 6105 increases the magnitude of the magnetic field, the collision between the magnetic nanoparticles in the first memory alloy spring 6103 increases, so that the generated heat increases to achieve deformation. For the design of the second excitation element 6106 and the second memory alloy spring 6104, refer to the first excitation element 6105 and the first memory alloy spring 6103.

In some embodiments, the driving assembly 6 may further include a spring center rod 6107. The extending direction of the spring center rod 6107 is parallel to the extending direction of the guide rod 6101. The transmission member 6102 may be connected to the spring center rod 6107 through sliding. In this case, both the spring center rod 6107 and the guide rod 6101 guide the moving direction of the transmission member 6102, making the movement of the transmission member 6102 smoother.

The first memory alloy spring 6103 is sleeved on the spring center rod 6107. The second memory alloy spring 6104 is sleeved on the spring center rod 6107. In this case, the spring center rod 6107 can play a restricting and guiding role in the deformation process of the first memory alloy spring 6103 and the second memory alloy spring 6104, so that the first memory alloy spring 6103 and the second memory alloy spring 6104 are deformed in the preset direction, and the reliability of the driving assembly 6 is higher.

In some other embodiments, the driving assembly 6 may not be provided with the spring center rod 6107, and the first memory alloy spring 6103 and the second memory alloy spring 6104 may be sleeved on the outer side of the guide rod 6101.

It can be understood that the examples shown in FIG. 8 to FIG. 16 are intended to illustrate several possible implementation manners of the driving assembly 6 of the camera module 10, but the driving assembly 6 of the camera module 10 may alternatively be implemented in other manners. This is not strictly limited in this application.

In this application, the position of the driving assembly 6 in the camera module 10 can have a plurality of embodiments, and the mounting space inside the camera module 10 and the mounting space outside the camera module 10 can be comprehensively considered during the design.

In some embodiments, as shown in FIG. 3, the driving assembly 6 is arranged on the side of the reflective member 5 away from the lens group 3. The lens group 3, the reflective member 5, and the driving assembly 6 are roughly arranged in the incident light direction of the lens group 3. The transmission member for transmitting the driving force may be connected to the surface of the reflective member 5 facing away from the lens group 3. In this embodiment, because the lens group 3, the reflective member 5, and the driving assembly 6 are roughly arranged in one direction, the overall shape of the camera module 10 is relatively flat, facilitating the thinning of the electronic device 100 that uses the camera module 10.

Figure 17:
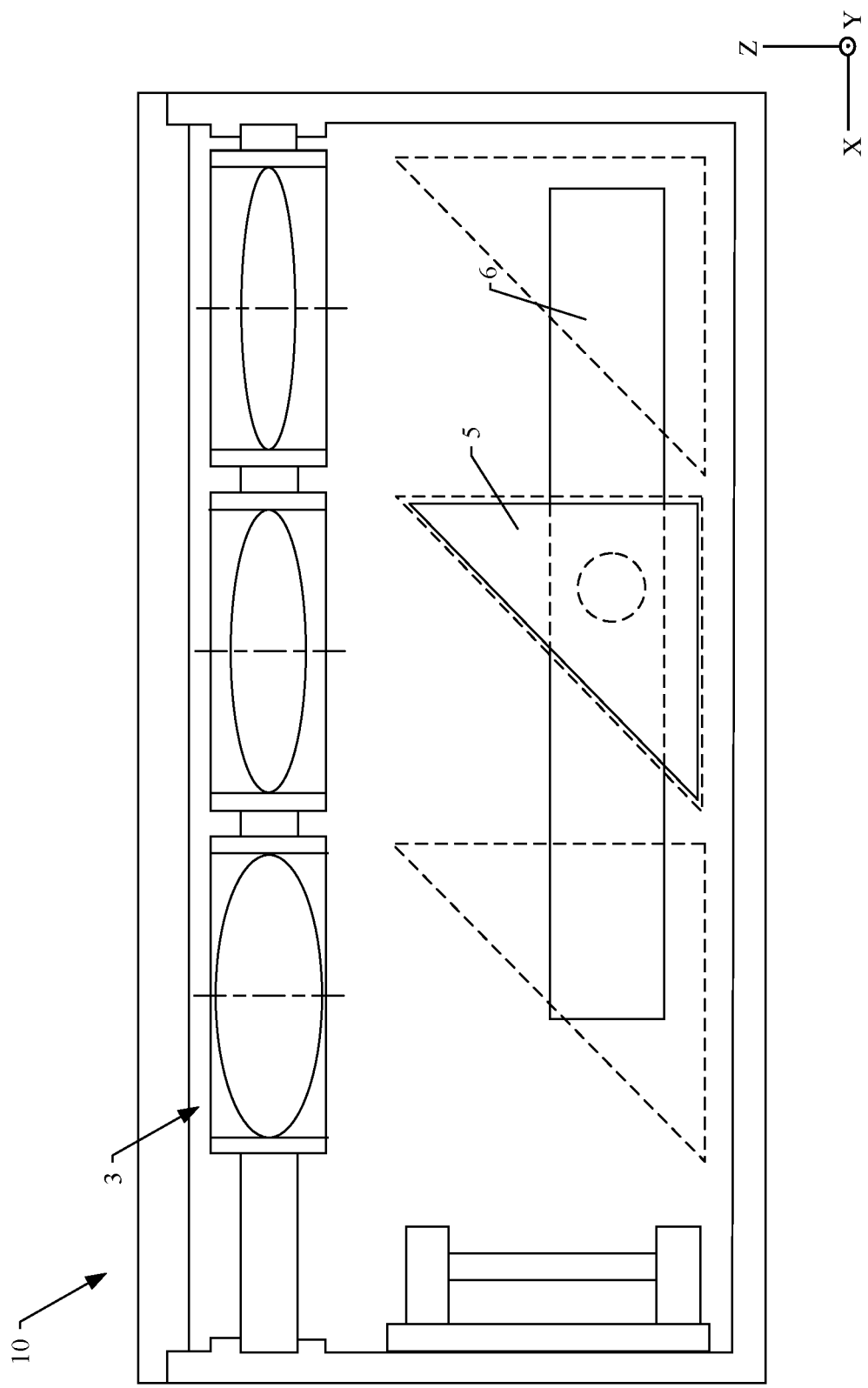
FIG. 17 is a schematic diagram of a partial structure of a camera module of the electronic device shown in FIG. 2 in some other embodiments.
Figure 18:
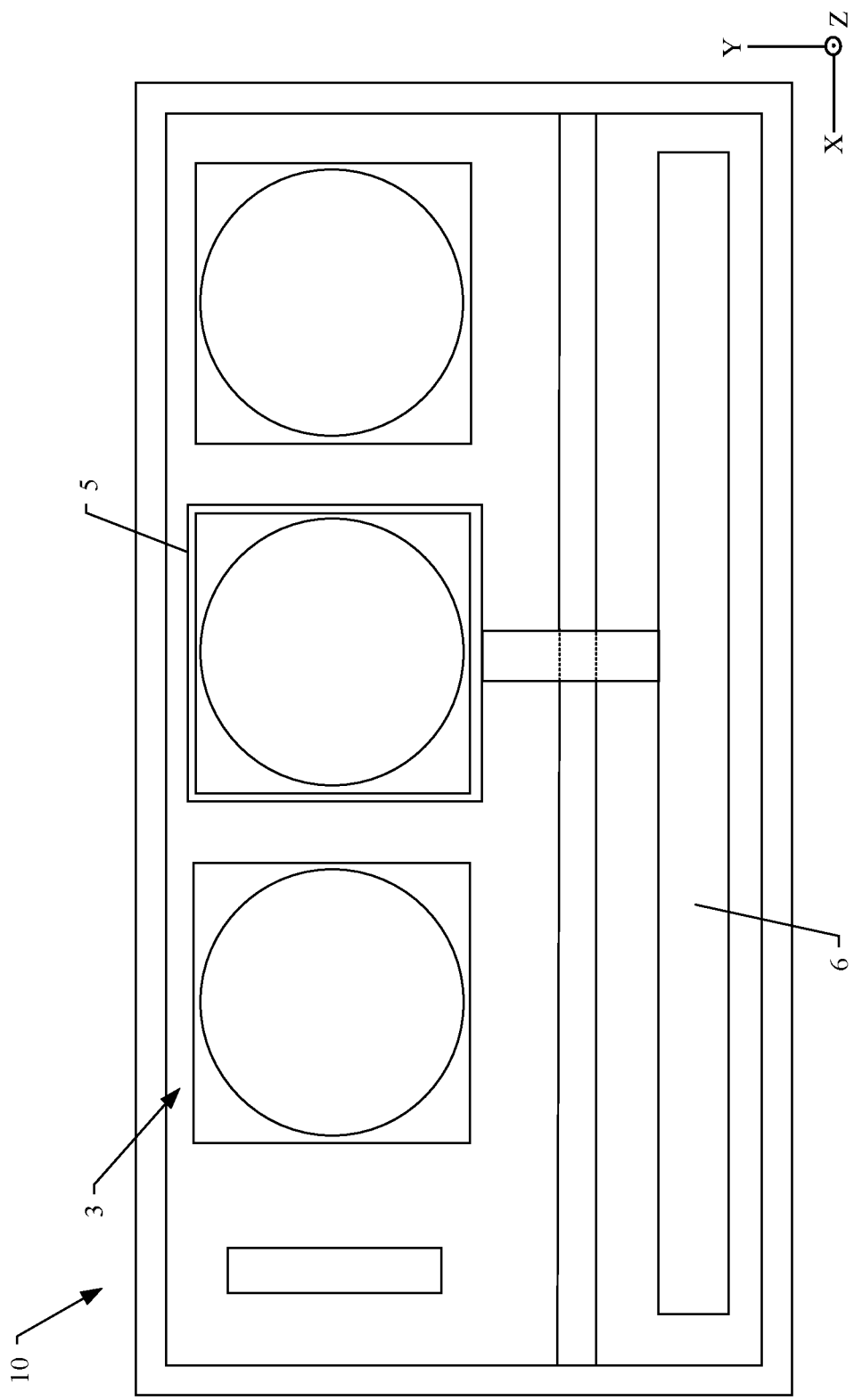
FIG. 18 is a schematic structural diagram of the camera module shown in FIG. 17 from another perspective.

In some other embodiments, refer to FIG. 17 and FIG. 18 together. FIG. 17 is a schematic diagram of a partial structure of a camera module 10 of the electronic device 100 shown in FIG. 2 in some other embodiments. FIG. 18 is a schematic structural diagram of the camera module 10 shown in FIG. 17 from another perspective. A plane on which the diagram of FIG. 17 is located corresponds to a position of the A-A line of the electronic device 100 shown in FIG. 2.

The following mainly describes the difference between this embodiment and the foregoing embodiment, and most of the technical content of this embodiment that is the same as the foregoing embodiment is not repeated hereinafter.

The arrangement direction of the lens group 3 and the reflective member 5 (for example, the thickness direction Z of the camera module 10) is substantially perpendicular to the arrangement direction of the reflective member 5 and the driving assembly 6 (for example, the length direction Y of the camera module 10). The reflective member 5 has a plane substantially parallel to the incident light direction of the lens group 3, and a transmission member for transmitting driving force can be connected to the plane. In this embodiment, the arrangement of the lens group 3, the reflective member 5, and the driving assembly 6 of the camera module 10 is relatively compact, the overall appearance of the camera module 10 is relatively stereoscopic, and the camera module 10 and other components of the electronic device 100 can be arranged more compactly, helping optimize the solution of arranging the components inside the electronic device 100.

It can be understood that the examples shown in FIG. 3 and FIG. 17 are two arrangement relationships of the structure of the camera module 10. The lens group 3, the reflective member 5, and the driving assembly 6 may alternatively have other arrangement relationships. This is not strictly limited in this application.

It can be understood that the vertical or parallel positional relationship between two components in this embodiment of this application is an ideal state, and a slight deviation is allowed.

In this embodiment of this application, the camera module 10 is provided with an anti-shake assembly for driving the rotation of the reflective member 5 to implement optical anti-shake through the rotation compensation of the reflective member 5, thereby avoiding a failure of light focusing due to the shaking of the hand during the shooting. This ensures that the image captured by the camera module 10 is clear, and user experience is better. The anti-shake assembly can be implemented by a variety of driving methods, such as multi-point electromagnetic driving of the reflective member 5 to rotate, mechanical driving (gear driving and connecting rod transmission) of the reflective member 5 to rotate, and intelligent material deformation driving of the reflective member 5 to rotate.

Figure 19:
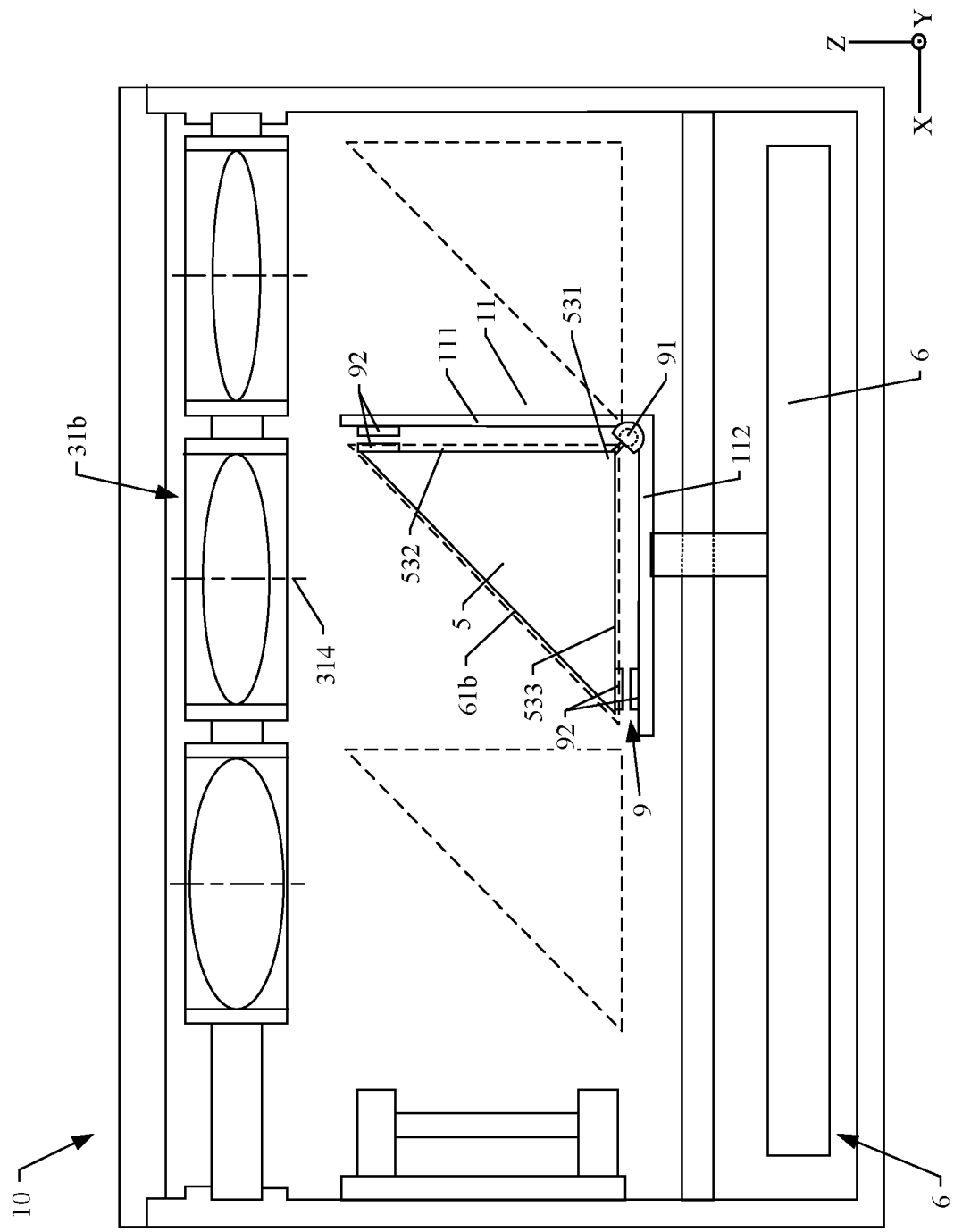
FIG. 19 is a schematic diagram of a partial structure of a camera module of the electronic device shown in FIG. 2 in some other embodiments.
Figure 20:
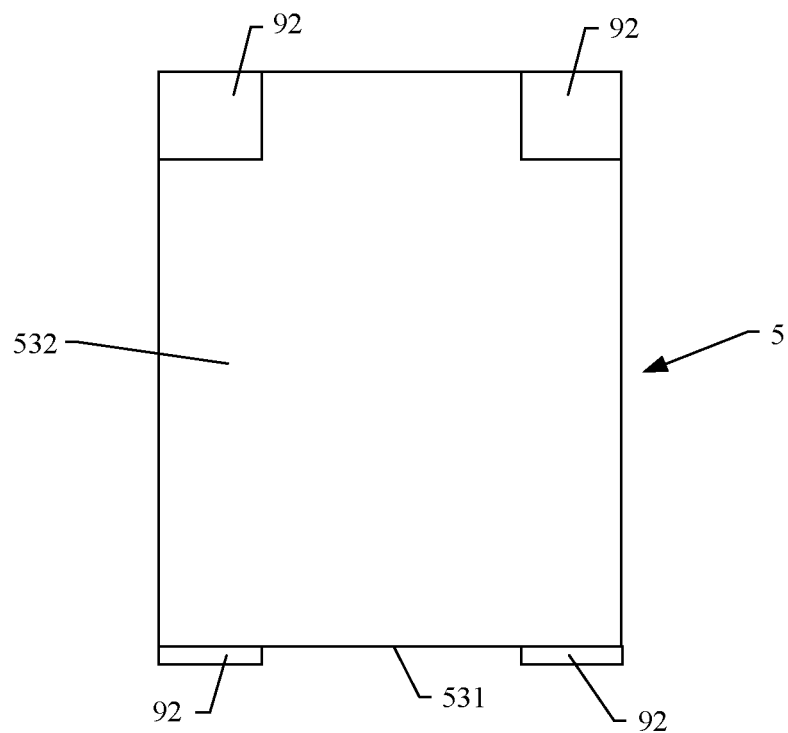
FIG. 20 is a schematic structural diagram of the camera module shown in FIG. 19 from another perspective.
Figure 21:
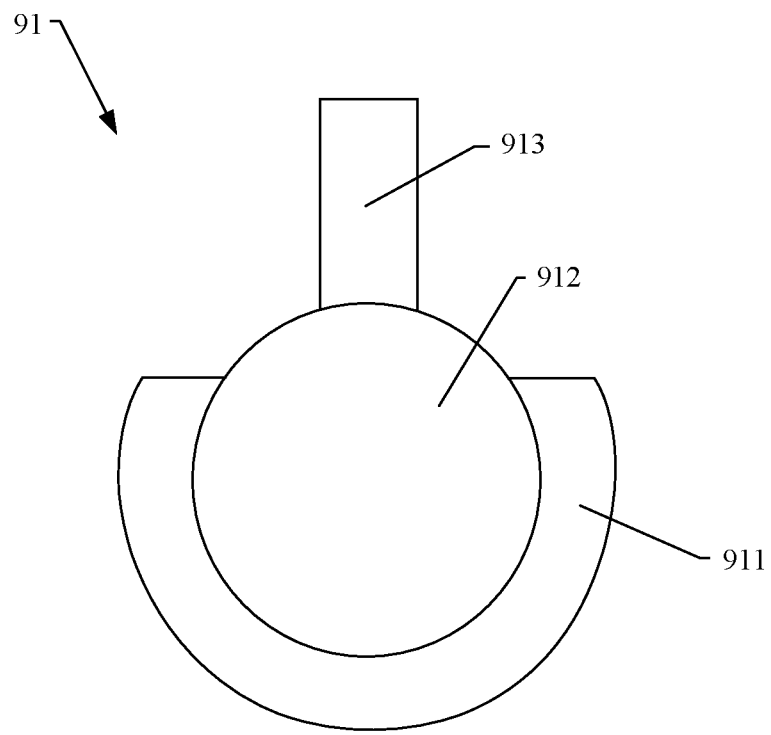
FIG. 21 is a schematic structural diagram of a spherical hinge of the camera module shown in FIG. 19.

Refer to FIG. 19 to FIG. 21 together. FIG. 19 is a schematic diagram of a partial structure of a camera module 10 of the electronic device 100 shown in FIG. 2 in some other embodiments. FIG. 20 is a schematic structural diagram of a reflective member 5 of the camera module 10 shown in FIG. 19 from another perspective. FIG. 21 is a schematic diagram of an internal structure of a spherical hinge of the camera module 10 shown in FIG. 19. A plane on which the diagram of FIG. 19 is located corresponds to a position of the A-A line of the electronic device 100 shown in FIG. 2. The following mainly describes the difference between this embodiment and the foregoing embodiment, and most of the technical content of this embodiment that is the same as the foregoing embodiment is not repeated hereinafter.

In some embodiments, the camera module 10 may further include a fixing frame 11 and an anti-shake assembly 9. The fixing frame 11 is fixedly connected to the driving assembly 6. The anti-shake assembly 9 is connected to the fixing frame 11 and the reflective member 5, and is configured to enable the reflective member 5 to rotate relative to the fixing frame 11. When the driving assembly 6 drives the fixing frame 11 to move, the reflective member 5 moves with the fixing frame 11. When the anti-shake assembly 9 drives the reflective member 5 to rotate, the reflective member 5 rotates relative to the fixing frame 11.

The fixing frame 11 may include a first arm 111 and a second arm 112, and an included angle is formed between the first arm 111 and the second arm 112. In this case, the fixing frame 11 is substantially L-shaped. In an example, the first arm 111 may be parallel to the main optical axis of the lens, and the second arm 112 may be perpendicular to the main optical axis of the lens. For example, when the reflective member 5 is located at the dwell position 61*b*, the reflective member 5 corresponds to the lens 31*b*. The first arm 111 is parallel to the main optical axis 314 of the lens 31*b*, and the second arm 112 is perpendicular to the main optical axis 314 of the lens 31*b*. The driving assembly 6 is fixedly connected to the second arm 112. The reflective member 5 is a triangular prism body. The reflective member 5 includes a first side edge 531, and a first surface 532 and a second surface 533 that are connected to the first side edge 531. The first surface 532 faces the first arm 111. The second surface 533 faces the second arm 112. The first side edge 531 is arranged corresponding to a joint between the first arm 111 and the second arm 112.

The anti-shake assembly 9 may include a spherical hinge 91 and two sets of magnetic attracting parts 92. The spherical hinge 91 is connected between the first side edge 531 and the fixing frame 11. The reflective member 5 can rotate relative to the fixing frame 11 through the spherical hinge 91. The two sets of magnetic attracting parts 92 are respectively connected between the first surface 532 and the first arm 111, and between the second surface 533 and the second arm 112.

One set of magnetic attracting parts 92 may be arranged corresponding to the end of the first surface 532 away from the first side edge 531, and the other set of magnetic attracting parts 92 may be arranged corresponding to the end of the second surface 533 away from the first side edge 531. Each set of magnetic attracting parts 92 includes at least two pairs of magnetic attracting parts 92. The two pairs of magnetic attracting parts 92 are spaced apart from each other. The arrangement direction of the two pairs of magnetic attracting parts 92 is substantially parallel to the extending direction of the first side edge 531. One of the two pairs of magnetic attracting parts 92 is fixed to the fixing frame 11, and the other one is fixed to the reflective member 5. Each pair of magnetic attracting parts 92 can repel or attract each other when energized. In an example, each pair of magnetic attracting parts 92 includes one electromagnet and one magnetic body. In another example, each pair of magnetic attracting parts 92 may include two electromagnets.

In this implementation manner, by controlling the charging and discharging actions of the two sets of magnetic attracting parts 92 and the magnitude of the charging current, the reflective member 5 can be controlled to implement the rotation of three degrees of freedom. The reflective member 5 can separately rotate around the width direction X of the camera module 10, the length direction Y of the camera module 10, and the thickness direction Z of the camera module 10. In addition, the driving assembly 6 can drive the reflective member 5 to move in the width direction X of the camera module 10. Therefore, the reflective member 5 of the camera module 10 can implement the anti-shake of four degrees of freedom, and the shooting quality of the camera module 10 is better.

The structures of the fixing frame 11 and the reflective member 5 may be correspondingly arranged to form movement space between the first arm 111 and the first surface 532, and movement space between the second arm 112 and the second surface 533.

The spherical hinge 91 may include a fixing portion 911, a rotating portion 912, and a connecting portion 913. The fixing portion 911 is fixed to the fixing frame 11. For example, the fixing portion 911 may be fixed at the joint between the first arm 111 and the second arm 112. The rotating portion 912 is rotatably mounted inside the fixing portion 911. One end of the connecting portion 913 is connected to the rotating portion 912, and the other end of the connecting portion 913 is connected to the reflective member 5.

It can be understood that the anti-shake assembly 9 shown in FIG. 19 to FIG. 21 may alternatively be applied to the camera module 10 in other embodiments of this application, such as the camera module 10 shown in FIG. 3, and the camera module 10 shown in FIG. 19.

In the foregoing embodiment, there may be a plurality of positional relationships between the photosensitive surface of the image sensor 4 and the equivalent center plane of each lens in the lens group 3. Examples are as follows:

In some embodiments, as shown in FIG. 3, the photosensitive surface 41 of the image sensor 4 is perpendicular to the equivalent center plane of each lens (31a, 31b, and 31c) in the lens group 3. In an example, an included angle of 45° is formed between the reflective layer 51 of the reflective member 5 and the main optical axis of the lens (31a, 31b, and 31c). The reflective layer 51 of the reflective member 5 is configured to reflect light.

In this embodiment, the light rays focused by each lens (31a, 31b, and 31c) are reflected by the reflective member 5 and then enter the image sensor 4 after being deflected by 90°. The light can fully use space in the two perpendicular directions of the camera module 10 in the propagation process, that is, space in the direction of the main optical axis of the lens (31a, 31b, and 31c) and the vertical direction of the photosensitive surface 41 of the image sensor 4, making the arrangement positions of the components in the camera module 10 more optimized.

Figure 22:
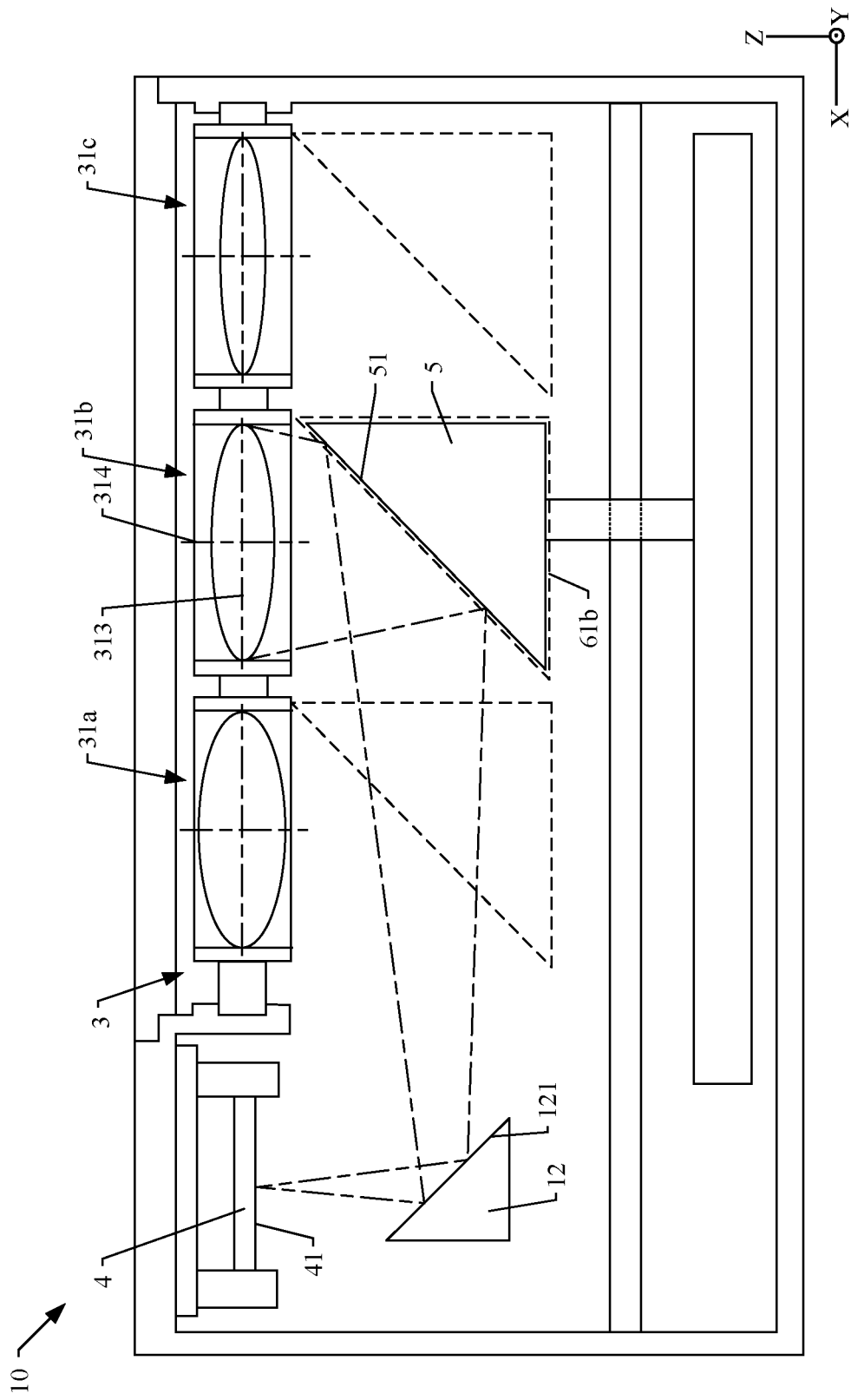
FIG. 22 is a schematic diagram of a partial structure of a camera module of the electronic device shown in FIG. 2 in some other embodiments.

In some other embodiments, FIG. 22 is a schematic diagram of a partial structure of a camera module 10 of the electronic device 100 shown in FIG. 2 in some other embodiments. The following mainly describes the difference between this embodiment and the foregoing embodiment, and most of the technical content of this embodiment that is the same as the foregoing embodiment is not repeated hereinafter.

The photosensitive surface 41 of the image sensor 4 is parallel to the equivalent center plane of each lens (31a, 31b, and 31c) in the lens group 3. The equivalent center plane of the lens is a plane on which a diameter of an equivalent optical center passing through the lens is located. The camera module 10 further includes a reflecting member 12, and the reflecting member 12 is configured to reflect, to the image sensor 4, the light reflected by the reflective member 5. In an example, the reflective member 5 is located at the dwell position 61b, an included angle of 45° is formed between the reflective layer 51 of the reflective member 5 and the main optical axis 314 of the lens 31b, and a reflecting layer 121 of the reflecting member 12 is perpendicular to the reflective layer 51 of the reflective member 5. The reflective layer 51 of the reflective member 5 is configured to reflect light. The reflecting layer 121 of the reflecting member 12 is configured to reflect light.

In this embodiment, the light passing through the lens is sequentially reflected by the reflective member 5 and the reflecting member 12, and then enters the image sensor 4 after being deflected by 180°. Unlike the previous embodiments, in this embodiment, the quantity of reflector components (including the reflective member 5 and the reflecting member 12) is increased so that the light is deflected a plurality of times. This not only makes the arrangement position of the image sensor 4 more flexible and helps improve the flexibility of arranging the components of the camera module 10, but also ensures that the light propagation path is longer and the camera module 10 can set a lens with a larger focal length to implement telephoto shooting or ultra-telephoto shooting.

It can be understood that, in another embodiment, the quantity of reflector components such as reflective members 5 or reflecting members 12 may alternatively be two or more than three, which is not strictly limited in this application. In this application, "more than" includes the given number. There may alternatively be another relationship between the position of the reflector component such as the reflective member 5 or the reflecting member 12 and the position of the equivalent center plane of the lens, which is not strictly limited in this application. Because the quantity and the position of the reflector components are set in cooperation with the position of the photosensitive surface 41 of the image sensor 4, the position of the photosensitive surface 41 of the image sensor 4 can be changed by adjusting the quantity and the position of the reflector components, that is, the positional relationship between the photosensitive surface 41 of the image sensor 4 and the equivalent center plane of the lens of the lens group 3 is changed, so that the camera module 10 can implement a greater variety of structural solutions and forms, and a wider application range.

Figure 23:
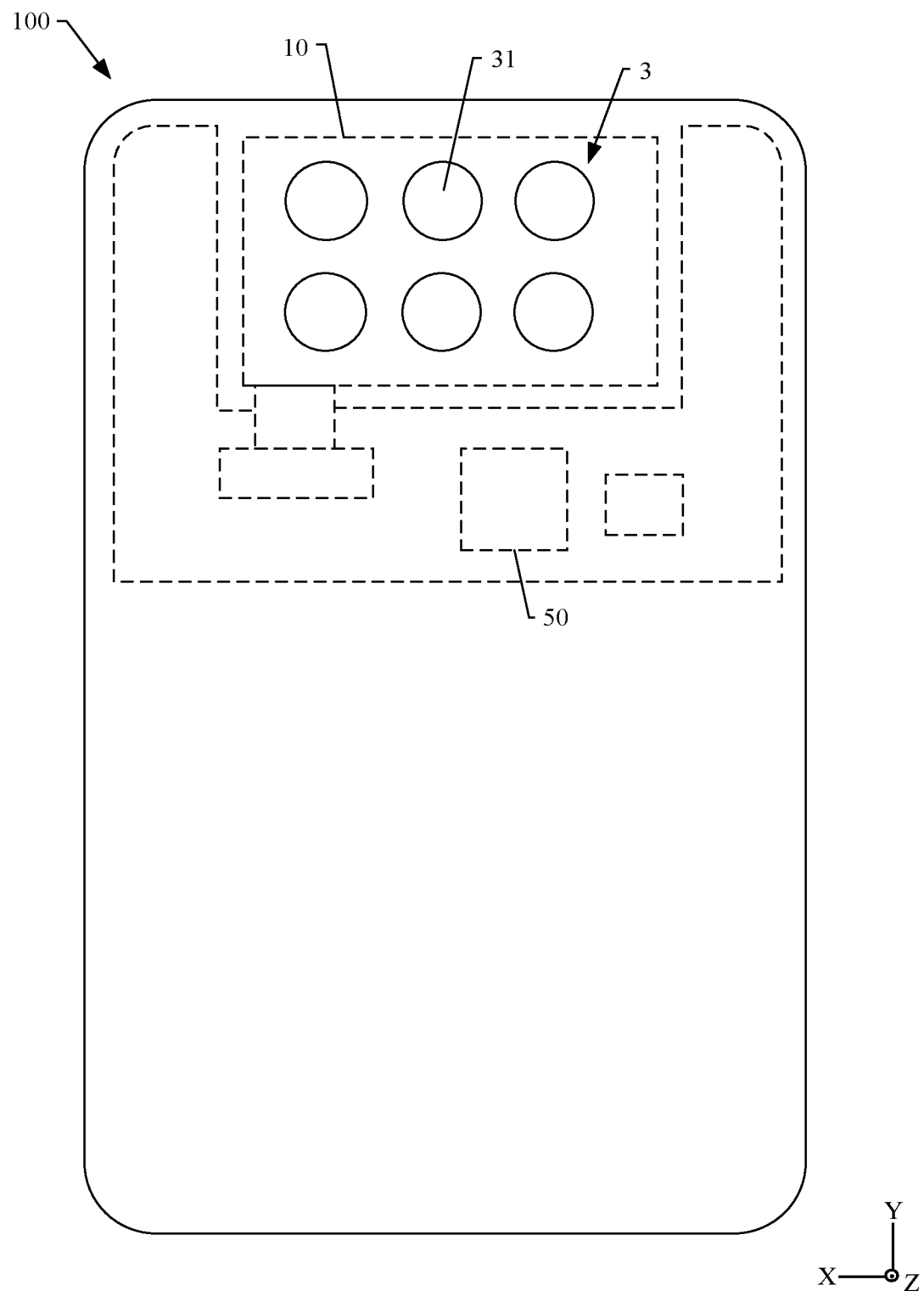
FIG. 23 is a rear view of an electronic device according to another embodiment of this application.

FIG. 23 is a rear view of an electronic device 100 according to another embodiment of this application. The following mainly describes the difference between this embodiment and the foregoing embodiment, and most of the technical content of this embodiment that is the same as the foregoing embodiment is not repeated hereinafter.

FIG. 23 illustrates another example arrangement manner of the plurality of lenses 31 in the lens group 3: the plurality of lenses 31 have the same incident light direction, and the plurality of lenses 31 are arranged in an array. The plurality of lenses 31 include at least two lenses with different equivalent focal lengths. For the structure of the lens 31, refer to the lenses (31a, 31b, and 31c) in the embodiment of FIG. 3 described above. The plurality of lenses 31 are arranged in rows in the width direction X of the camera module 10 and arranged in rows in the length direction Y of the camera module 10.

Figure 24:
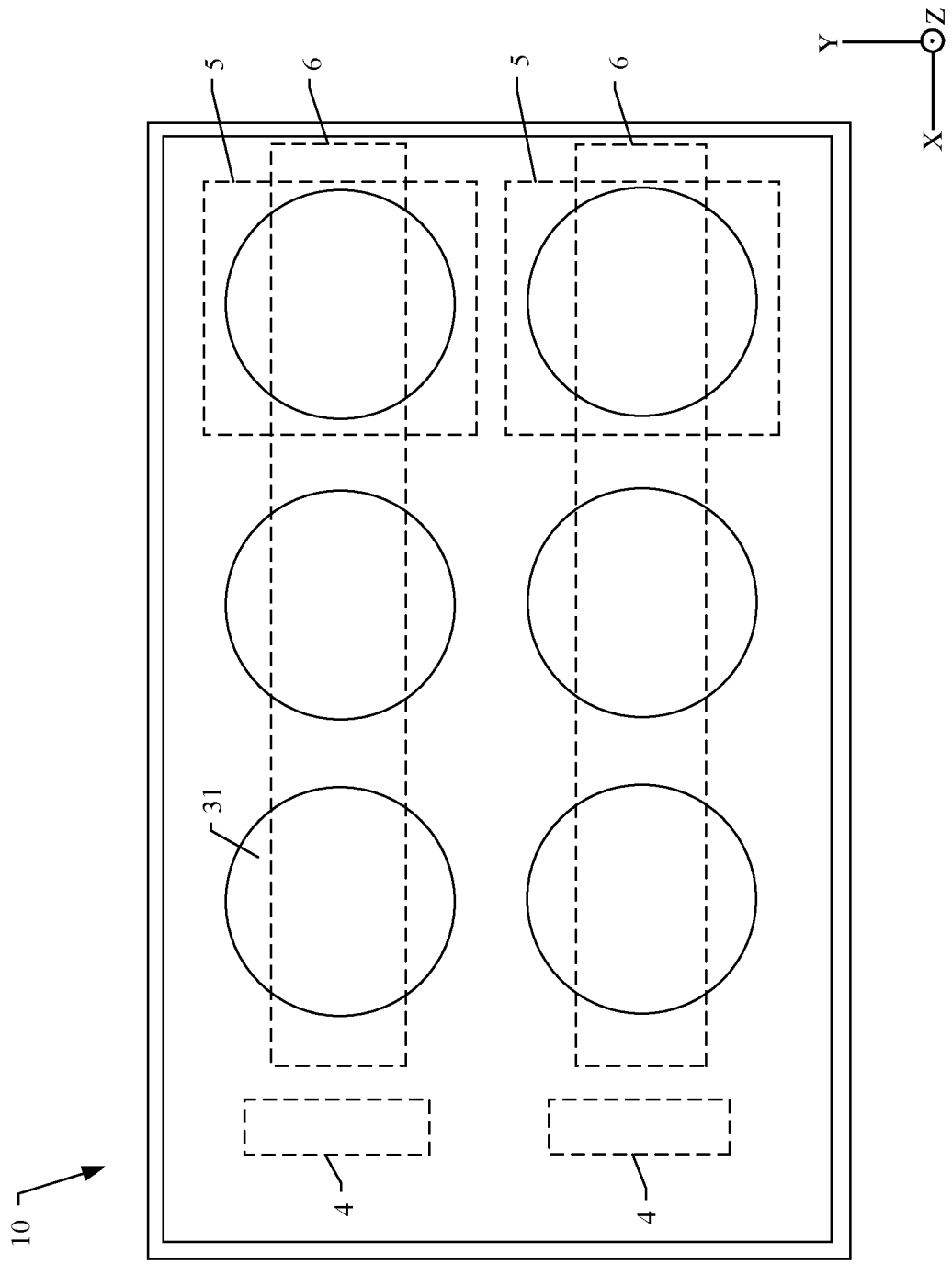
FIG. 24 is a schematic diagram of a partial structure of a camera module of the electronic device shown in FIG. 23 in some embodiments.
Figure 25:
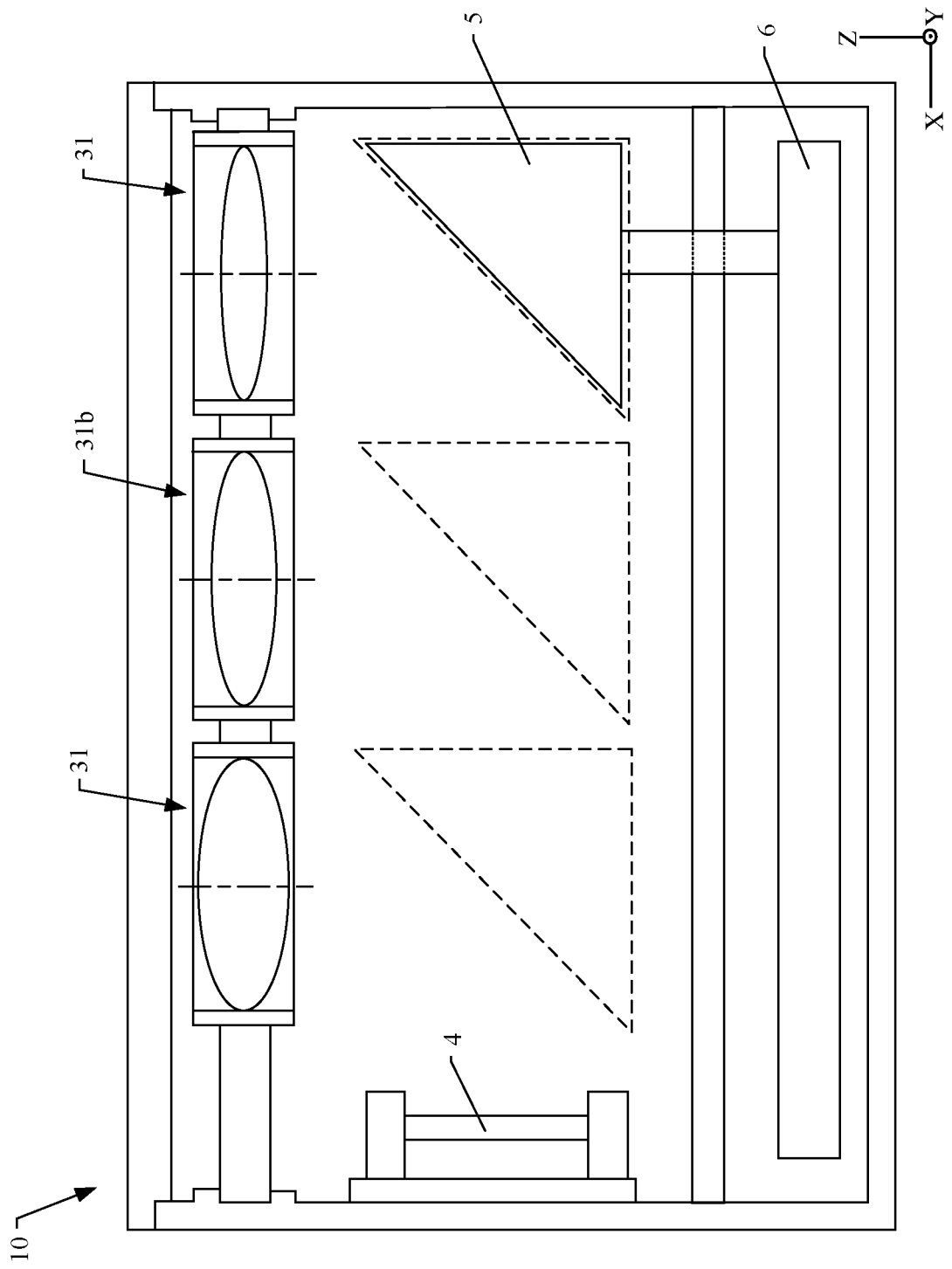
FIG. 25 is a schematic diagram of an internal structure of the camera module shown in FIG. 24.

Refer to FIG. 24 and FIG. 25 together. FIG. 24 is a schematic diagram of a partial structure of a camera module 10 of the electronic device 100 shown in FIG. 23 in some embodiments. FIG. 25 is a schematic diagram of an internal structure of the camera module 10 shown in FIG. 24.

In this embodiment, the camera module 10 includes a plurality of image sensors 4, a plurality of reflective members 5, and a plurality of groups of driving assemblies 6. Each row of lenses 31 arranged in the width direction X of the camera module 10 corresponds to one image sensor 4, one reflective member 5, and one group of driving assemblies 6. The driving assembly 6 drives the corresponding reflective member 5 to move in the width direction X of the camera module 10. The lenses 31 of the same row arranged in the width direction X of the camera module 10 have different equivalent focal lengths.

A plurality of driving assemblies 6 are coupled to the processor 50 (refer to FIG. 23), and a plurality of image sensors 4 are coupled to the processor 50. Because different driving assemblies 6 can drive different reflective members 5 independently of each other, and a plurality of image sensors 4 can work independently of each other, the camera module 10 can enable a specific group of driving assemblies 6 and image sensors 4 to work independently to capture one image, or can alternatively enable a plurality of groups of driving assemblies 6 and image sensors 4 to work at the same time to capture a plurality of images, so that the shooting modes of the camera module 10 are more diversified.

In some embodiments, the lenses 31 in the same column arranged in the length direction Y of the camera module 10 may have the same equivalent focal length. The camera module 10 can combine a plurality of images captured by the same column of lenses 31 to obtain one target image, thereby improving the image quality of the target image.

In some other embodiments, a plurality of rows of module structures (including the equivalent focal length, the aperture, the brightness, and the like) arranged in parallel in the length direction Y of the camera module 10 may be the same. The module structure includes a lens 31, a reflective member 5, an image sensor 4, and the like. In this case, the camera module 10 can implement 3D shooting. For example, when a plurality of reflective members 5 are aligned with each other in the length direction Y of the camera module 10, the plurality of image sensors 4 of the camera module 10 simultaneously capture images in the same scene through the corresponding lenses 31, and edit and combine a plurality of images to form a 3D image. When a plurality of reflective members 5 move synchronously in the width direction X of the camera module 10 to switch the dwell position, the camera module 10 can further implement optical zooming of 3D images.

In some other embodiments, one column of lenses 31 arranged in the length direction Y of the camera module 10 corresponds to one image sensor 4, one reflective member 5, and one group of driving assemblies 6, and the driving assembly 6 drives the reflective member 5 to move in the length direction Y of the camera module 10. The lenses 31 of the same row arranged in the length direction Y of the camera module 10 have different equivalent focal lengths.

Figure 26:
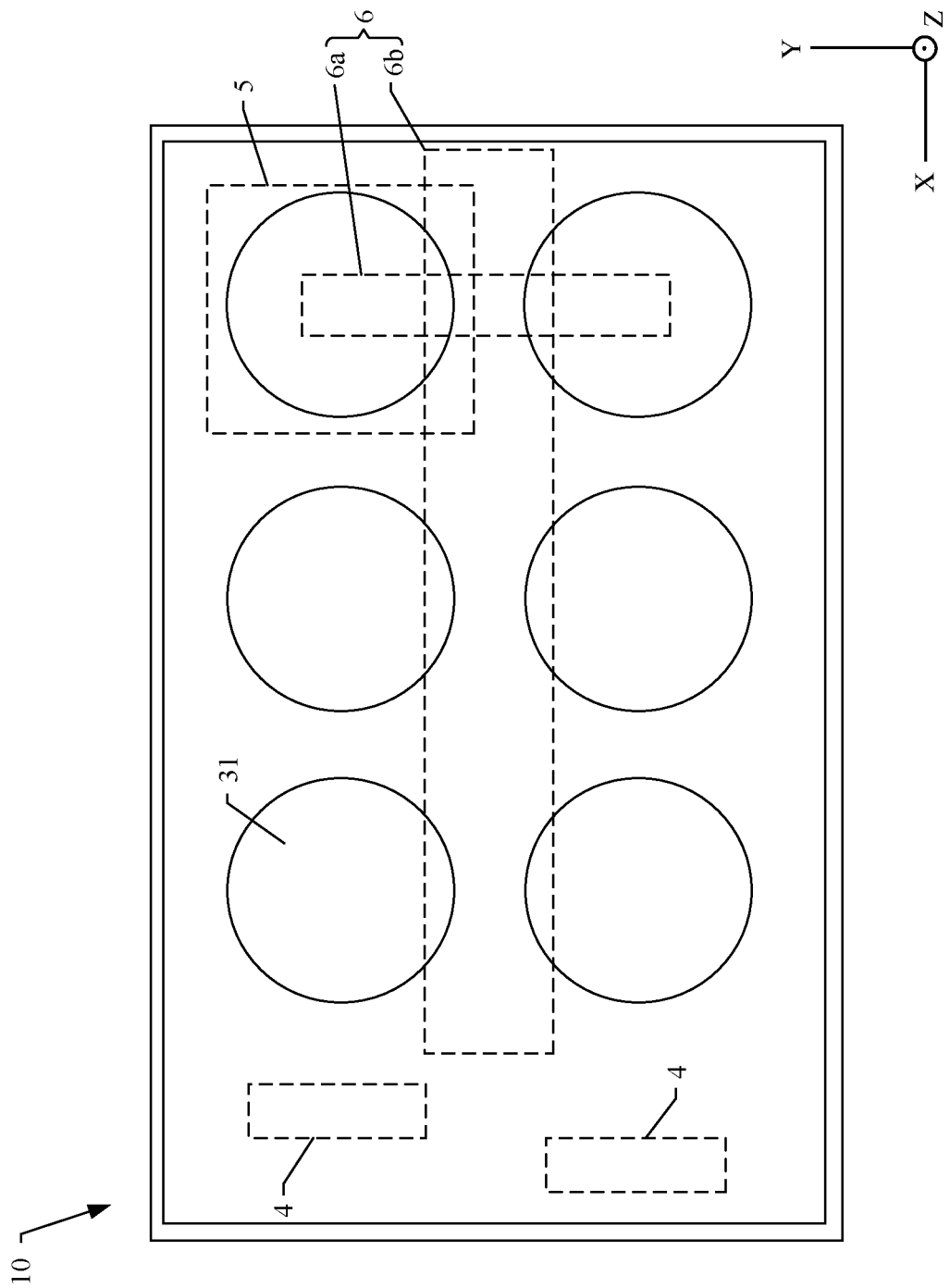
FIG. 26 is a schematic diagram of a partial structure of a camera module of the electronic device shown in FIG. 23 in some other embodiments.
Figure 27:
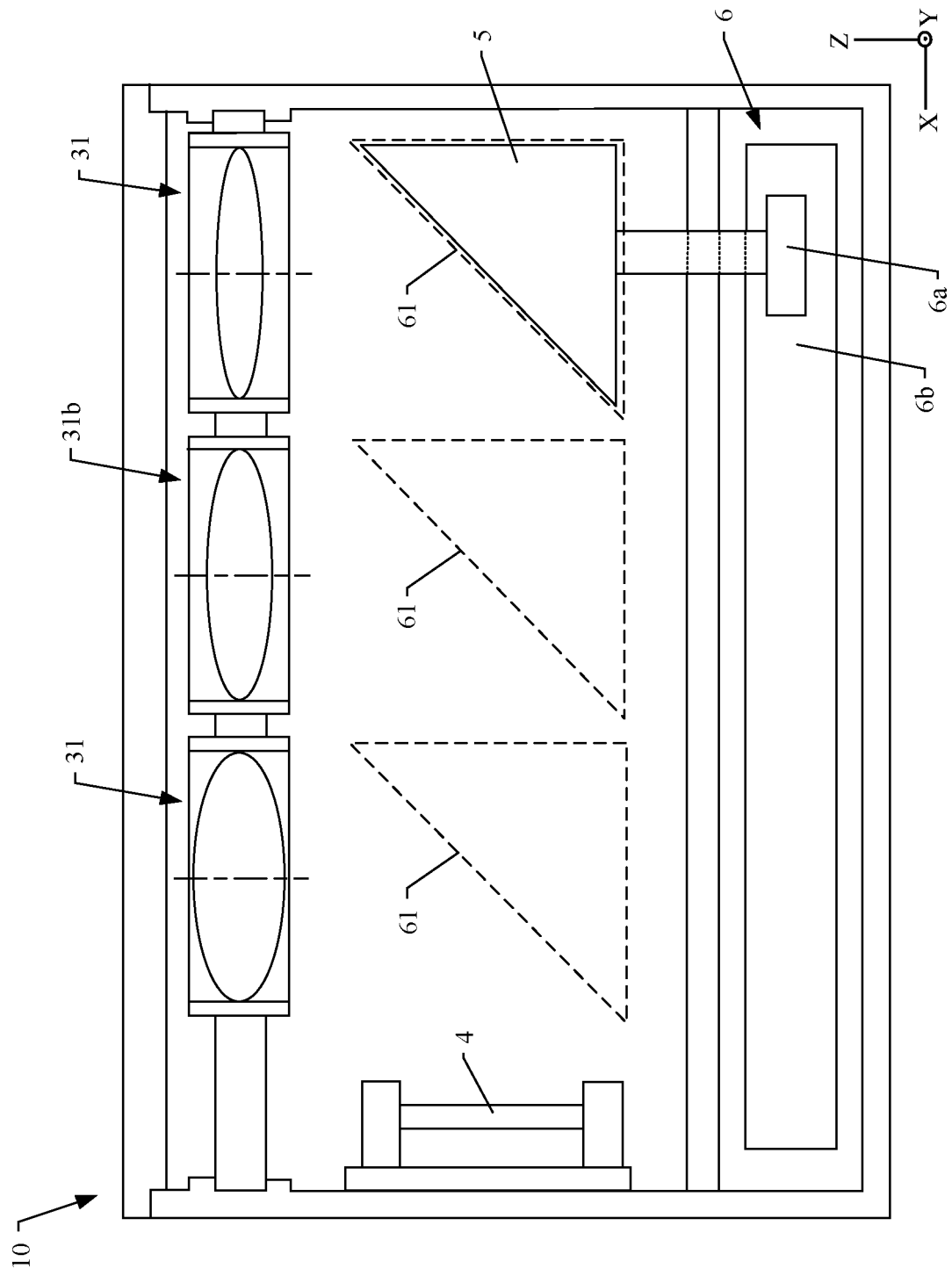
FIG. 27 is a schematic diagram of an internal structure of the camera module shown in FIG. 26.

Refer to FIG. 26 and FIG. 27 together. FIG. 26 is a schematic diagram of a partial structure of a camera module 10 of the electronic device 100 shown in FIG. 23 in some other embodiments. FIG. 27 is a schematic diagram of an internal structure of the camera module 10 shown in FIG. 26. The following mainly describes the difference between this embodiment and the foregoing embodiment, and most of the technical content of this embodiment that is the same as the foregoing embodiment is not repeated hereinafter.

In this embodiment, the camera module 10 may include a plurality of image sensors 4, one reflective member 5, and one group of driving assemblies 6. Each row of lenses 31 arranged in the width direction X of the camera module 10 corresponds to one image sensor 4. The driving assembly 6 is configured to drive the reflective member 5 to move. The driving assembly 6 includes a first driving part 6a and a second driving part 6b. The first driving part 6a is configured to drive the reflective member 5 to move in the length direction Y of the camera module 10, and the second driving part 6b is configured to drive the reflective member 5 to move in the width direction X of the camera module 10. Through the cooperation of the first driving part 6a and the second driving part 6b, the reflective member 5 can move between the plurality of dwell positions 61 corresponding to the plurality of lenses 31, so that the camera module 10 implements zooming. For the description of the dwell position 61, refer to the related description of the dwell position (61a, 61b, and 61c) in the embodiment of FIG. 3 described above.

The distances between the lenses 31 of different rows and the image sensor 4 may be different, and the equivalent focal lengths of the plurality of lenses in the lens group 3 may be different from each other. In addition, the plurality of image sensors 4 are staggered in the length direction Y of the camera module 10. When the quantity of lenses is equal, the camera module 10 shown in this embodiment has more diversified shooting modes than the camera module 10 shown in the foregoing embodiments, thereby improving user experience. In another embodiment, among the plurality of lenses in the lens group 3, the lenses 31 of the same column arranged in the length direction Y of the camera module 10 may have the same equivalent focal length. In this case, the plurality of image sensors 4 are arranged in a direction parallel to the length direction Y of the camera module 10.

Figure 28:
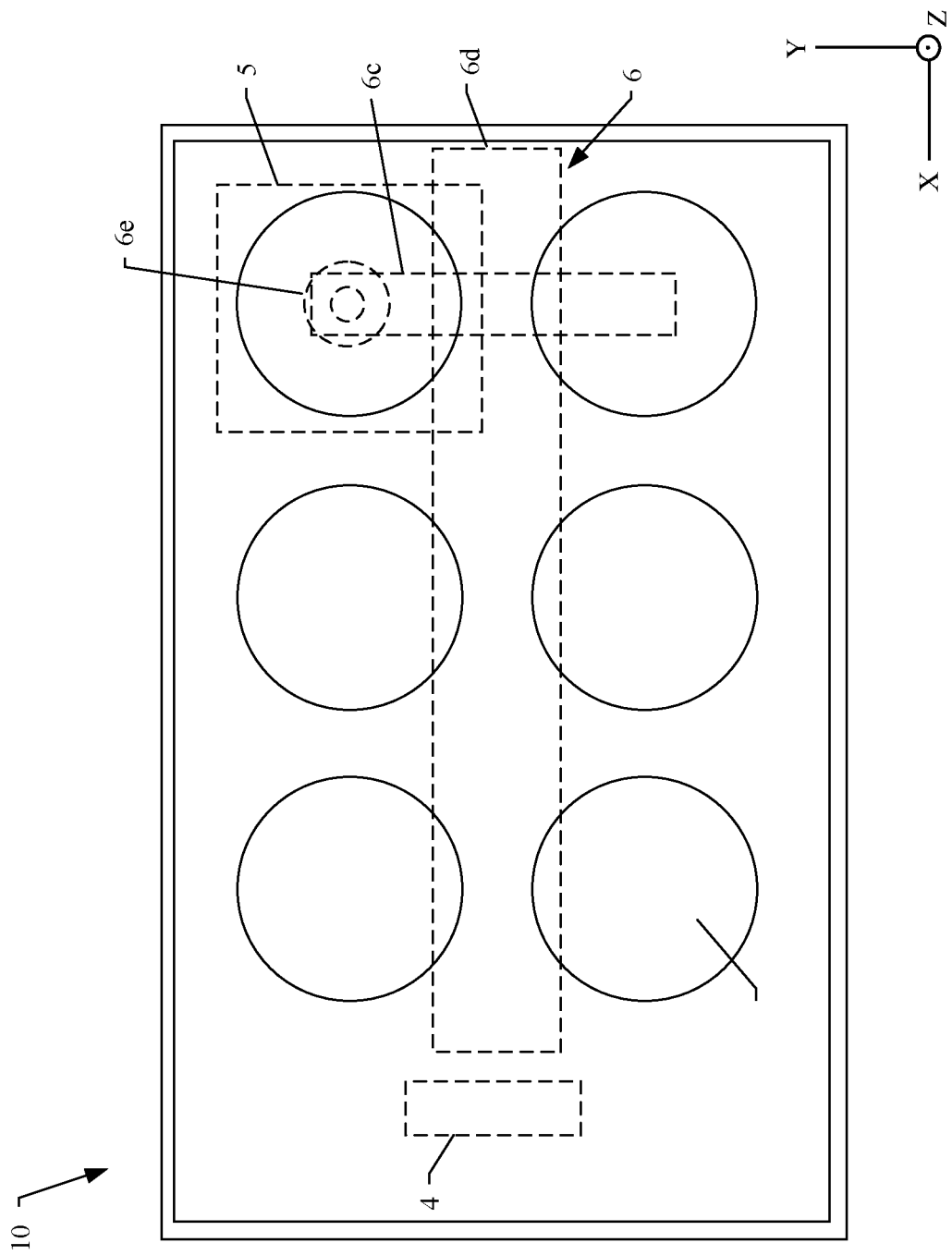
FIG. 28 is a schematic diagram of a partial structure of a camera module of the electronic device shown in FIG. 23 in some other embodiments.
Figure 29:
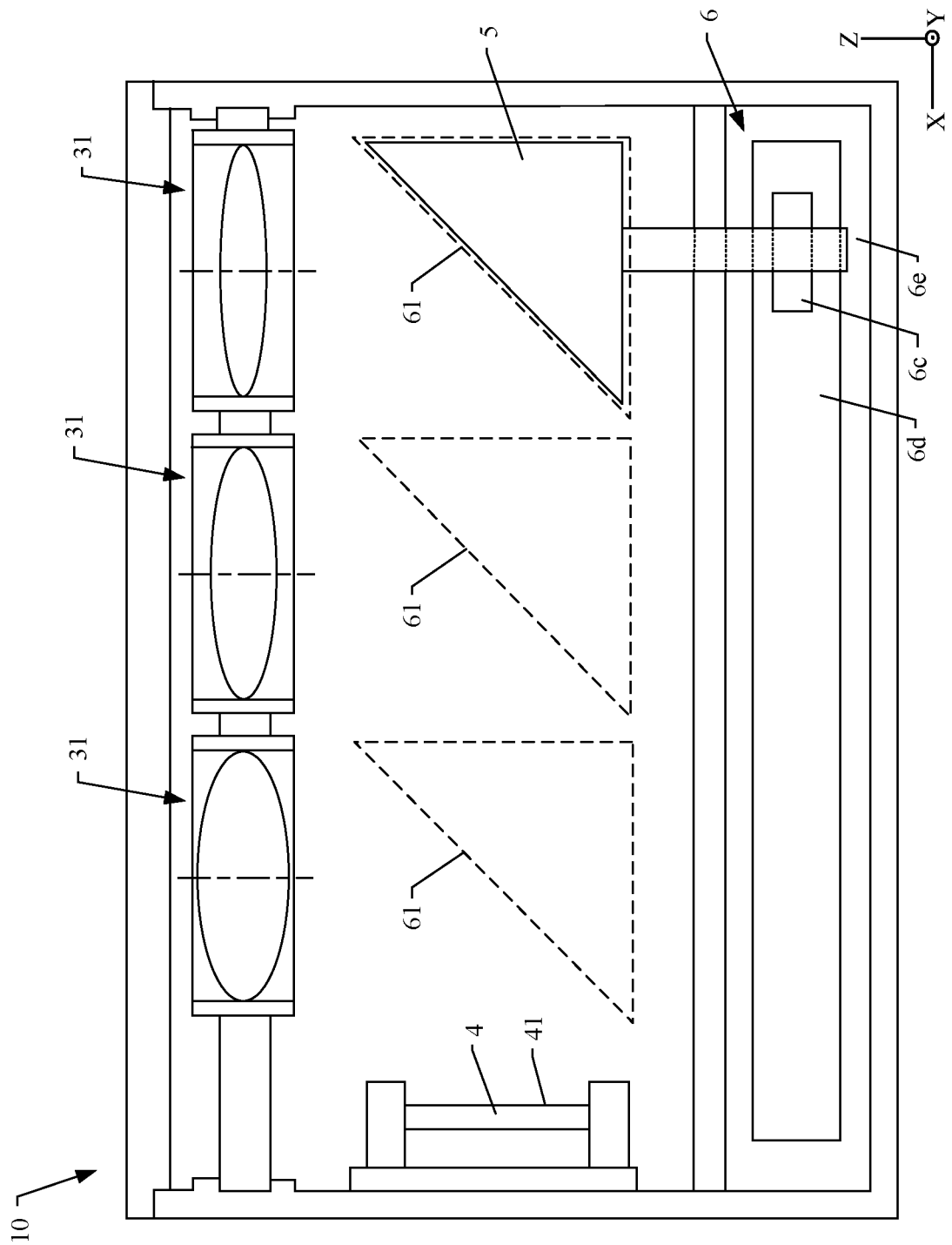
FIG. 29 is a schematic diagram of an internal structure of the camera module shown in FIG. 28.

FIG. 28 is a schematic diagram of a partial structure of a camera module 10 of the electronic device 100 shown in FIG. 23 in some other embodiments. FIG. 29 is a schematic diagram of an internal structure of the camera module 10 shown in FIG. 28. The following mainly describes the difference between this embodiment and the foregoing embodiment, and most of the technical content of this embodiment that is the same as the foregoing embodiment is not repeated hereinafter.

In this embodiment, the camera module 10 may include an image sensor 4, a reflective member 5, and a group of driving assemblies 6. The image sensor 4 is located on one side of the lens group 3 and close to the middle. The driving assembly 6 is configured to drive the reflective member 5 to move and rotate. The driving assembly 6 includes a first driving part 6c, a second driving part 6d, and a third driving part 6e. The first driving part 6c is configured to drive the reflective member 5 to move in a first direction. The second driving part 6d is configured to drive the reflective member 5 to move in a second direction. The second direction is perpendicular to the first direction. The third driving part 6e is configured to drive the reflective member 5 to rotate in a third direction. The third direction is perpendicular to the first direction and the second direction.

In an example, the first driving part 6c is configured to drive the reflective member 5 to move in the length direction Y of the camera module 10, the second driving part 6d is configured to drive the reflective member 5 to move in the width direction X of the camera module 10, and the third driving part 6e is configured to drive the reflective member 5 to rotate in the thickness direction Z of the camera module 10.

In this embodiment, the first driving part 6c cooperates with the second driving part 6d to move the reflective member 5 to a position directly facing the target lens 31, and the third driving part 6e drives the reflective member 5 to rotate, so that the reflective member 5 can rotate to the target dwell position 61. Because the reflective member 5 can rotate, light rays focused by different lenses 31 may be reflected in different directions, so the camera module 10 can reflect the light rays focused by the lenses 31 at different positions to the same image sensor 4 through the rotatable reflective member 5. Therefore, through the cooperation of the first driving part 6c, the second driving part 6d, and the third driving part 6e, the reflective member 5 can switch between the plurality of dwell positions 61 corresponding to the plurality of lenses 31, and reflect the light rays passing through the lenses 31 to the same image sensor 4, so that the camera module 10 implements zooming. The area of the photosensitive surface 41 of the image sensor 4 may be the same as, similar to, or slightly larger than that in the foregoing embodiments.

In some embodiments, the processor may be provided with an image distortion correction unit. The image distortion correction unit is configured to correct the image received by the image sensor 4 to resolve the problem of distortion of the image received by the image sensor 4 due to the fact that the lens 31, the reflective member 5, and the image sensor 4 are not on the same plane, thereby ensuring the shooting quality of the electronic device 100. In some other embodiments, the camera module 10 may be provided with an internal processor, the internal processor of the camera module 10 is coupled to the processor of the electronic device 100, and the image distortion correction unit may be arranged in the internal processor of the camera module 10.

In some other embodiments, among the plurality of lenses 31 in the lens group 3, the lenses 31 of the same column arranged in the length direction Y of the camera module 10 may have the same equivalent focal length. In some other embodiments, the position of the image sensor 4 is set to ensure that the equivalent focal lengths of the plurality of lenses 31 are different from each other. In this case, the camera module 10 has more diversified shooting modes, thereby improving user experience.

Figure 30:
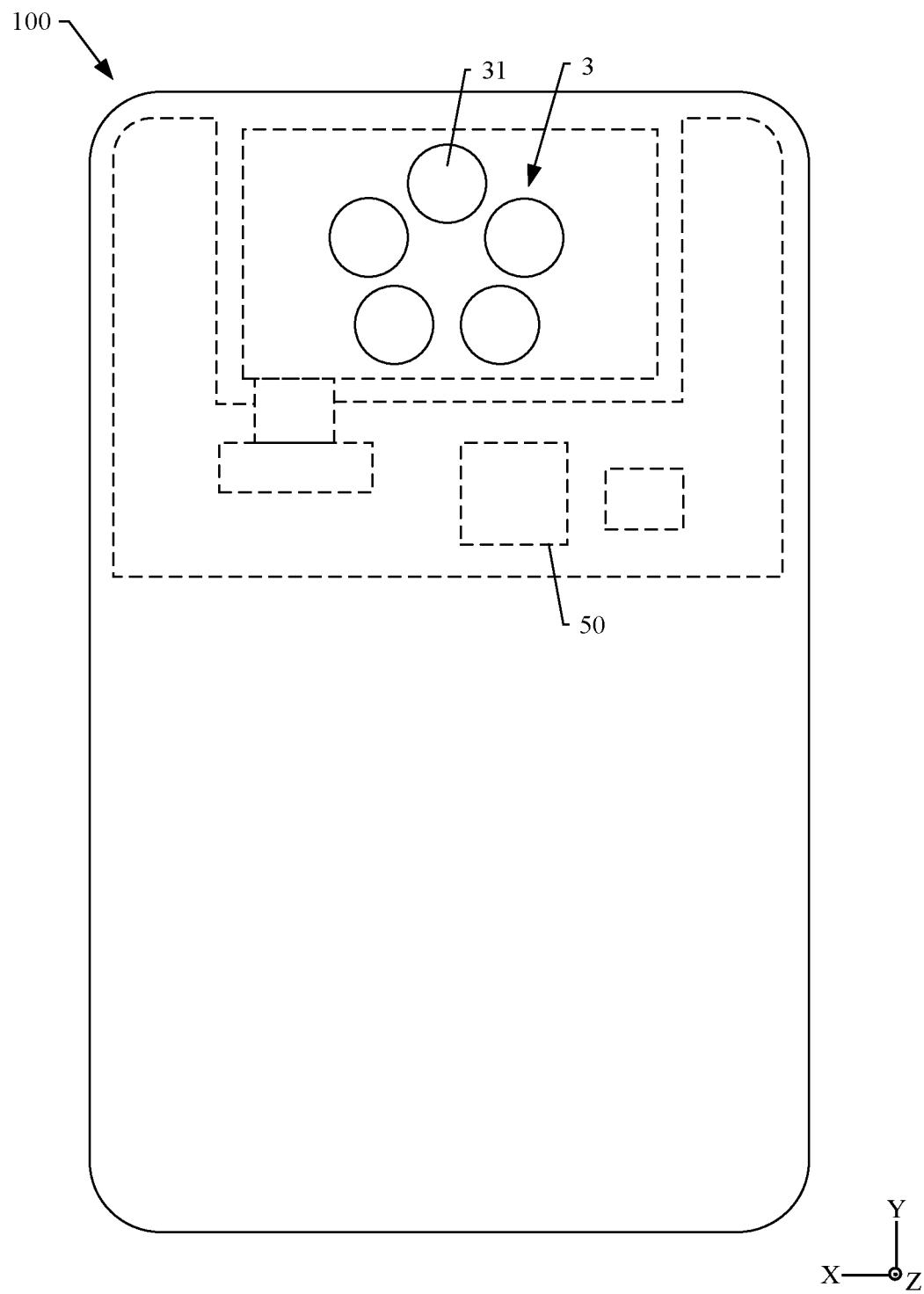
FIG. 30 is a rear view of an electronic device according to still another embodiment of this application.

FIG. 30 is a rear view of an electronic device 100 according to another embodiment of this application. The following mainly describes the difference between this embodiment and the foregoing embodiment, and most of the technical content of this embodiment that is the same as the foregoing embodiment is not repeated hereinafter.

FIG. 30 illustrates still another example arrangement manner of the plurality of lenses 31 in the lens group 3: the plurality of lenses 31 have the same incident light direction, and the plurality of lenses 31 are arranged in an annular shape. The plurality of lenses 31 include at least two lenses with different equivalent focal lengths. For the structure of the lens 31, refer to the lenses (31a, 31b, and 31c) in the embodiment of FIG. 3 described above. The annular shape may be the circular annular shape shown in FIG. 30, or may be an elliptical annular shape or another annular shape.

Figure 31:
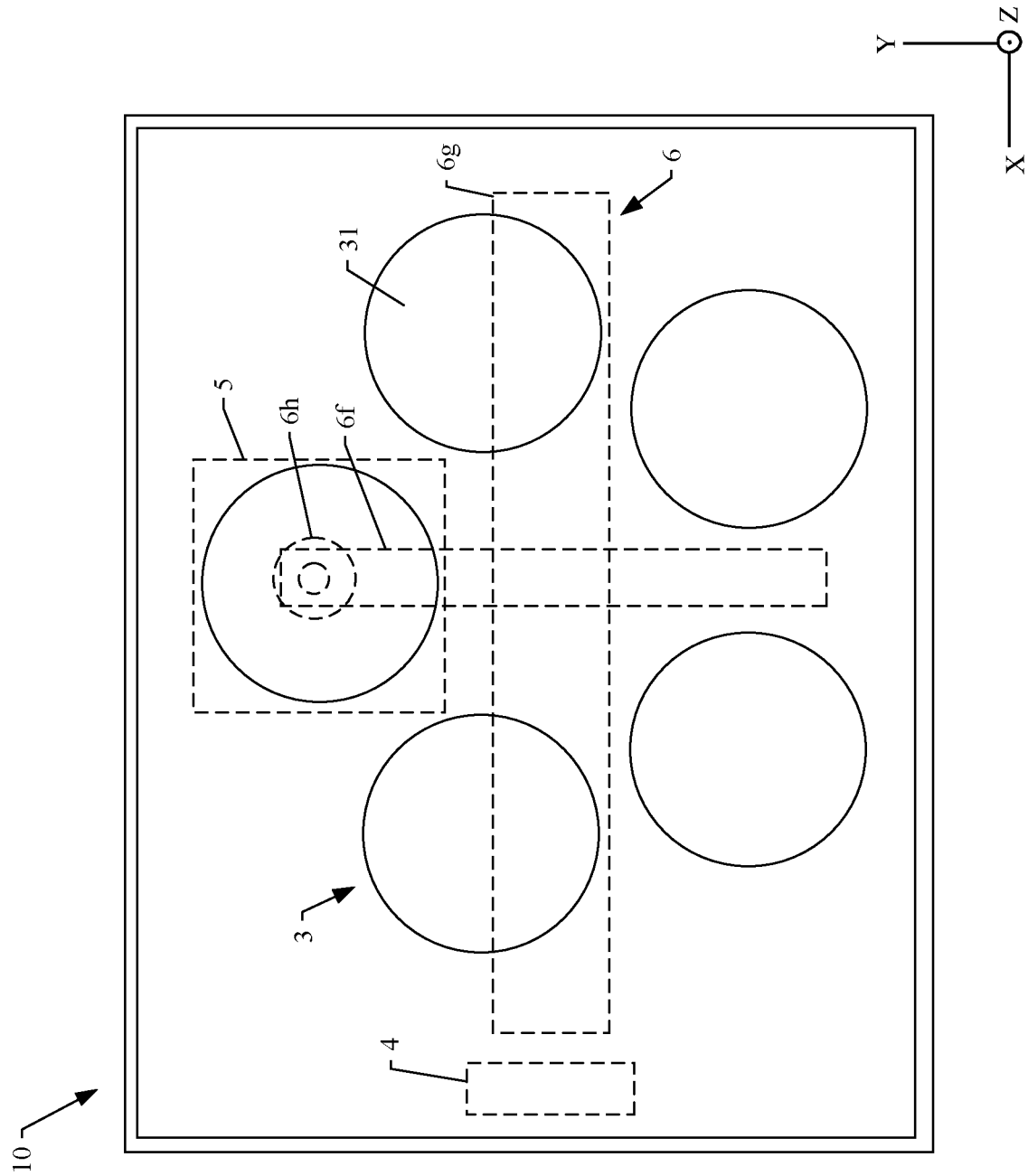
FIG. 31 is a schematic diagram of a partial structure of a camera module of the electronic device shown in FIG. 30 in some embodiments.
Figure 32:
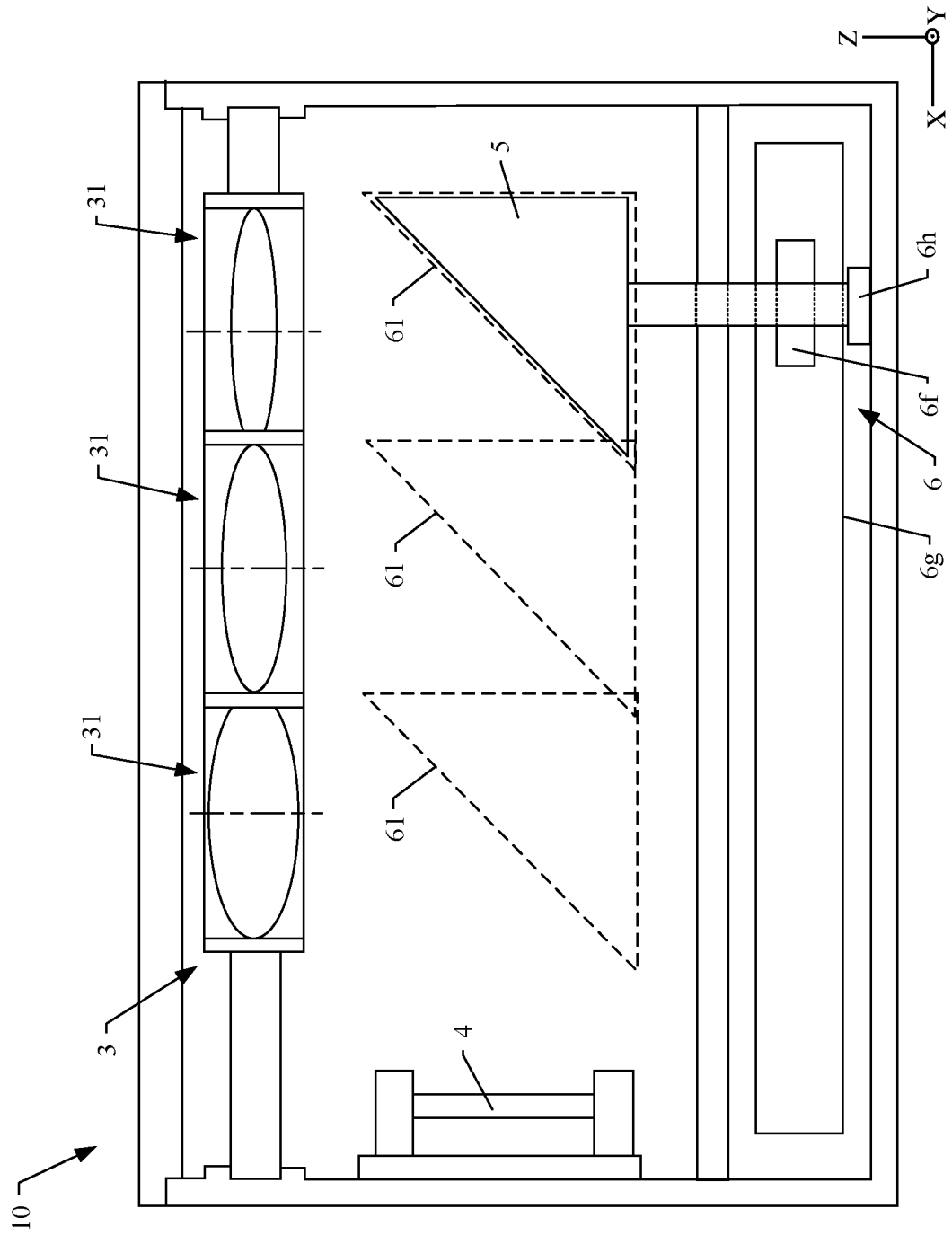
FIG. 32 is a schematic diagram of an internal structure of the camera module shown in FIG. 31.

Refer to FIG. 31 and FIG. 32 together. FIG. 31 is a schematic diagram of a partial structure of a camera module 10 of the electronic device 100 shown in FIG. 30 in some embodiments. FIG. 32 is a schematic diagram of an internal structure of the camera module 10 shown in FIG. 31.

In this embodiment, the camera module 10 includes one image sensor 4, one reflective member 5, and one group of driving assemblies 6. The image sensor 4 is located on one side of the lens group 3. The driving assembly 6 is configured to drive the reflective member 5 to move and rotate. The driving assembly 6 includes a first driving part 6f, a second driving part 6g, and a third driving part 6h. The first driving part 6f is configured to drive the reflective member 5 to move in a first direction. The second driving part 6g is configured to drive the reflective member 5 to move in a second direction. The second direction is perpendicular to the first direction. The third driving part 6h is configured to drive the reflective member 5 to rotate in a third direction. The third direction is perpendicular to the first direction and the second direction. Through the cooperation of the first driving part 6f, the second driving part 6g, and the third driving part 6h, the reflective member 5 can move between the plurality of dwell positions 61 corresponding to the plurality of lenses 31, and reflect the light rays passing through the lenses 31 to the image sensor 4, so that the camera module 10 implements zooming. For the description of the dwell position 61, refer to the related description of the dwell position (61a, 61b, and 61c) in the embodiment of FIG. 3 described above.

In an example, the first driving part 6f is configured to drive the reflective member 5 to move in the length direction Y of the camera module 10, the second driving part 6g is configured to drive the reflective member 5 to move in the width direction X of the camera module 10, and the third driving part 6h is configured to drive the reflective member 5 to rotate in the thickness direction Z of the camera module 10.

In some embodiments, the processor 50 (refer to FIG. 30) of the electronic device 100 is provided with an image distortion correction unit. The image distortion correction unit is configured to correct the image received by the image sensor 4 to resolve the problem of distortion of the image received by the image sensor 4 due to the fact that the lens 31, the reflective member 5, and the image sensor 4 are not on the same plane, thereby ensuring the shooting quality of the electronic device 100. In another embodiment, the camera module 10 may be provided with an internal processor, the internal processor of the camera module 10 is coupled to the processor 50 of the electronic device 100, and the image distortion correction unit may be arranged in the internal processor of the camera module 10.

In some other embodiments, the arrangement manner of the plurality of lenses may alternatively be as follows: the incident light directions of the plurality of lenses are the same, and the plurality of lenses are arranged in a triangular shape. The driving assembly 6 is configured to drive the reflective member 5 to move and rotate. In this embodiment, the image sensor 4, the reflective member 5, and the driving assembly 6 of the camera module 10 may be set with reference to the foregoing embodiments.

Figure 33:
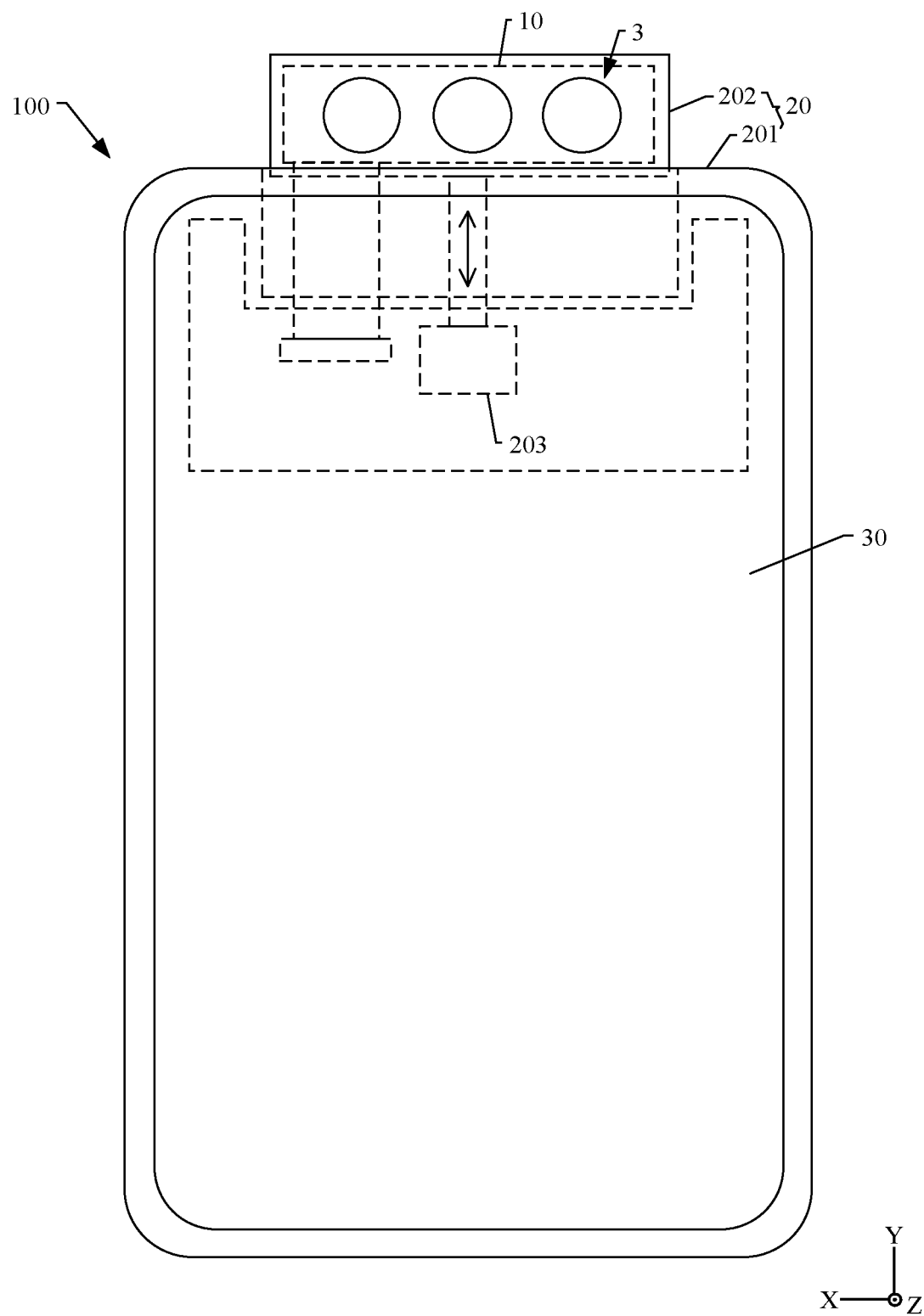
FIG. 33 is a front view of an electronic device according to still another embodiment of this application.

FIG. 33 is a front view of an electronic device 100 according to still another embodiment of this application. The following mainly describes the difference between this embodiment and the foregoing embodiment, and most of the technical content of this embodiment that is the same as the foregoing embodiment is not repeated hereinafter.

The housing 20 of the electronic device 100 includes a main housing portion 201 and a movable housing portion 202. The movable housing portion 202 is telescopically mounted on the main housing portion 201. The electronic device 100 further includes a housing driving assembly 203. The housing driving assembly 203 is mounted on the main housing portion 201, and is configured to drive the movable housing portion 202 to stretch out or retract relative to the main housing portion 201. In an example, the movable housing portion 202 may be connected to the main housing portion 201 through sliding, so as to slide out of the main housing portion 201 or slide into the main housing portion 201. In another example, the movable housing portion 202 may be rotatably connected to the main housing portion 201, so as to rotate out of the main housing portion 201 or rotate into the main housing portion 201. The camera module 10 is mounted on the movable housing portion 202. The camera module 10 moves with the movable housing portion 202.

In this embodiment, because the camera module 10 can stretch out or retract with the movable housing portion 202 relative to the main housing portion 201, the camera module 10 can stretch out to expose the lens group 3 to the outside of the electronic device 100 when shooting is required, so as to capture an image. When no shooting is required, the camera module 10 retracts so that the lens group 3 is located inside the electronic device 100. Therefore, the main housing portion 201 of the electronic device 100 may not reserve a camera hole or a camera area corresponding to the camera module 10, and full-panel design is performed, for example, full-screen design or full-back cover design.

The camera module 10 can capture an image in front of the electronic device 100. In this case, the camera module 10 is used as a front camera of the electronic device 100. Alternatively, the camera module 10 can capture an image behind the electronic device 100. In this case, the camera module 10 is used as a rear camera of the electronic device 100.

Figure 34:
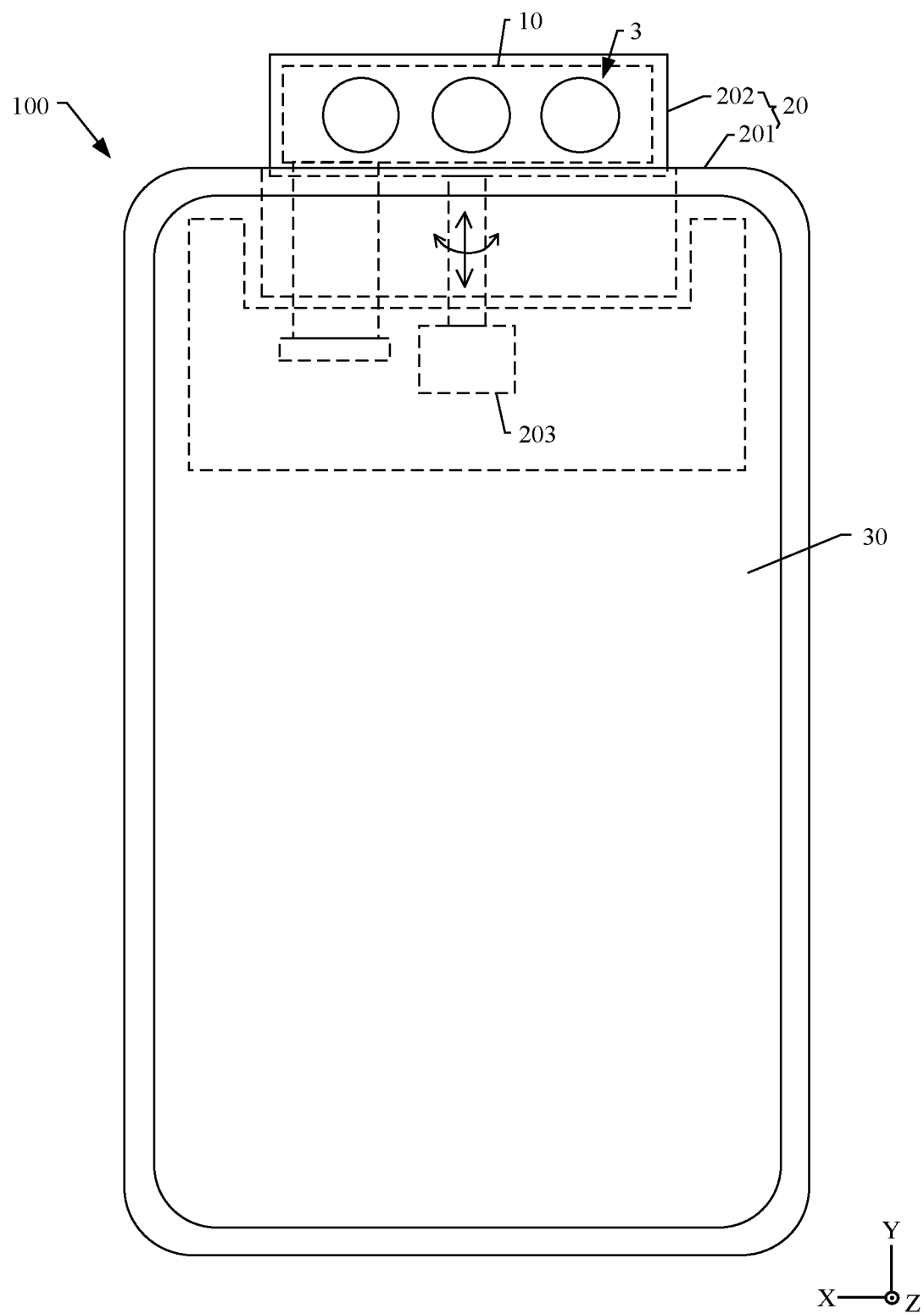
FIG. 34 is a front view of an electronic device according to still another embodiment of this application.

FIG. 34 is a front view of an electronic device 100 according to still another embodiment of this application. The following mainly describes the difference between this embodiment and the foregoing embodiment, and most of the technical content of this embodiment that is the same as the foregoing embodiment is not repeated hereinafter.

The housing 20 of the electronic device 100 includes a main housing portion 201 and a movable housing portion 202. The movable housing portion 202 is telescopically mounted on the main housing portion 201. After the movable housing portion 202 stretches out relative to the main housing portion 201, the movable housing portion 202 can rotate relative to the main housing portion 201. The electronic device 100 further includes a housing driving assembly 203. The housing driving assembly 203 is mounted on the main housing portion 201, and is configured to drive the movable housing portion 202 to stretch out or retract relative to the main housing portion 201, and to drive the movable housing portion 202 to rotate after stretching out relative to the main housing portion 201. In an example, the movable housing portion 202 may be connected to the main housing portion 201 through sliding, so as to slide out of the main housing portion 201 or slide into the main housing portion 201, and can rotate relative to the main housing portion 201 after sliding out of the main housing portion 201. In another example, the movable housing portion 202 may be rotatably connected to the main housing portion 201, so as to rotate out of the main housing portion 201 or rotate into the main housing portion 201, and can rotate relative to the main housing portion 201 after rotating out of the main housing portion 201. The camera module 10 is mounted on the movable housing portion 202. The camera module 10 moves with the movable housing portion 202.

In this embodiment, because the camera module 10 can stretch out or retract with the movable housing portion 202 relative to the main housing portion 201, the camera module 10 can stretch out to expose the lens group 3 to the outside of the electronic device 100 when shooting is required, so as to capture an image. When no shooting is required, the camera module 10 retracts so that the lens group 3 is located inside the electronic device 100. Therefore, the main housing portion 201 of the electronic device 100 may not reserve a camera hole or a camera area corresponding to the camera module 10, and full-panel design is performed, for example, full-screen design or full-back cover design. Because the movable housing portion 202 can rotate relative to the main housing portion 201 after stretching out relative to the main housing portion 201, the camera module 10 can be used as a front camera of the electronic device 100 or as a rear camera of the electronic device 100.

It can be understood that in some other embodiments, the housing 20 of the electronic device 100 may alternatively be a foldable housing. The foldable housing includes two flat plate parts and a curved part connected between the two flat plate parts. The camera module 10 may be mounted on one of the flat plate parts.

Figure 35:
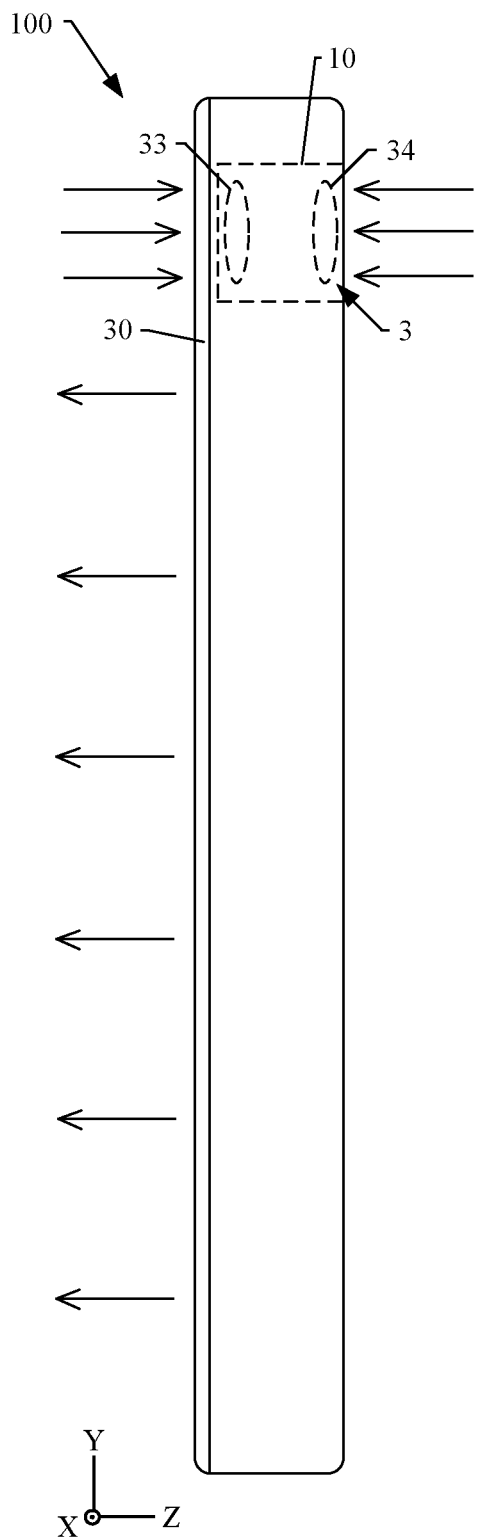
FIG. 35 is a side view of an electronic device according to still another embodiment of this application.

FIG. 35 is a side view of an electronic device 100 according to still another embodiment of this application. The following mainly describes the difference between this embodiment and the foregoing embodiment, and most of the technical content of this embodiment that is the same as the foregoing embodiment is not repeated hereinafter.

FIG. 35 illustrates still another example arrangement manner of the plurality of lenses in the lens group 3: the plurality of lenses have different incident light directions. In an example, the plurality of lenses include a first lens 33 and a second lens 34. For the structures of the first lens 33 and the second lens 34, refer to the lenses (31a, 31b, and 31c) in the embodiment of FIG. 3 described above. The first lens 33 and the second lens 34 are arranged back to back and have opposite incident light directions. For example, the first lens 33 can capture an image in front of the electronic device 100, and the second lens 34 can capture an image behind the electronic device 100. In this case, the camera module 10 can be used as a front camera of the electronic device 100, or can be used as a rear camera of the electronic device 100.

In some embodiments, the equivalent focal length of the first lens 33 is different from the equivalent focal length of the second lens 34. In this case, by switching the dwell position of the reflective member, the camera module 10 not only can switch the shooting orientation, but also can implement zooming. In some other embodiments, the equivalent focal length of the first lens 33 is the same as the equivalent focal length of the second lens 34.

In another example, there may alternatively be more than three lenses with different incident light directions in the lens group 3, and there may be other design solutions for the incident light directions of the lenses in the lens group 3.

Figure 36:
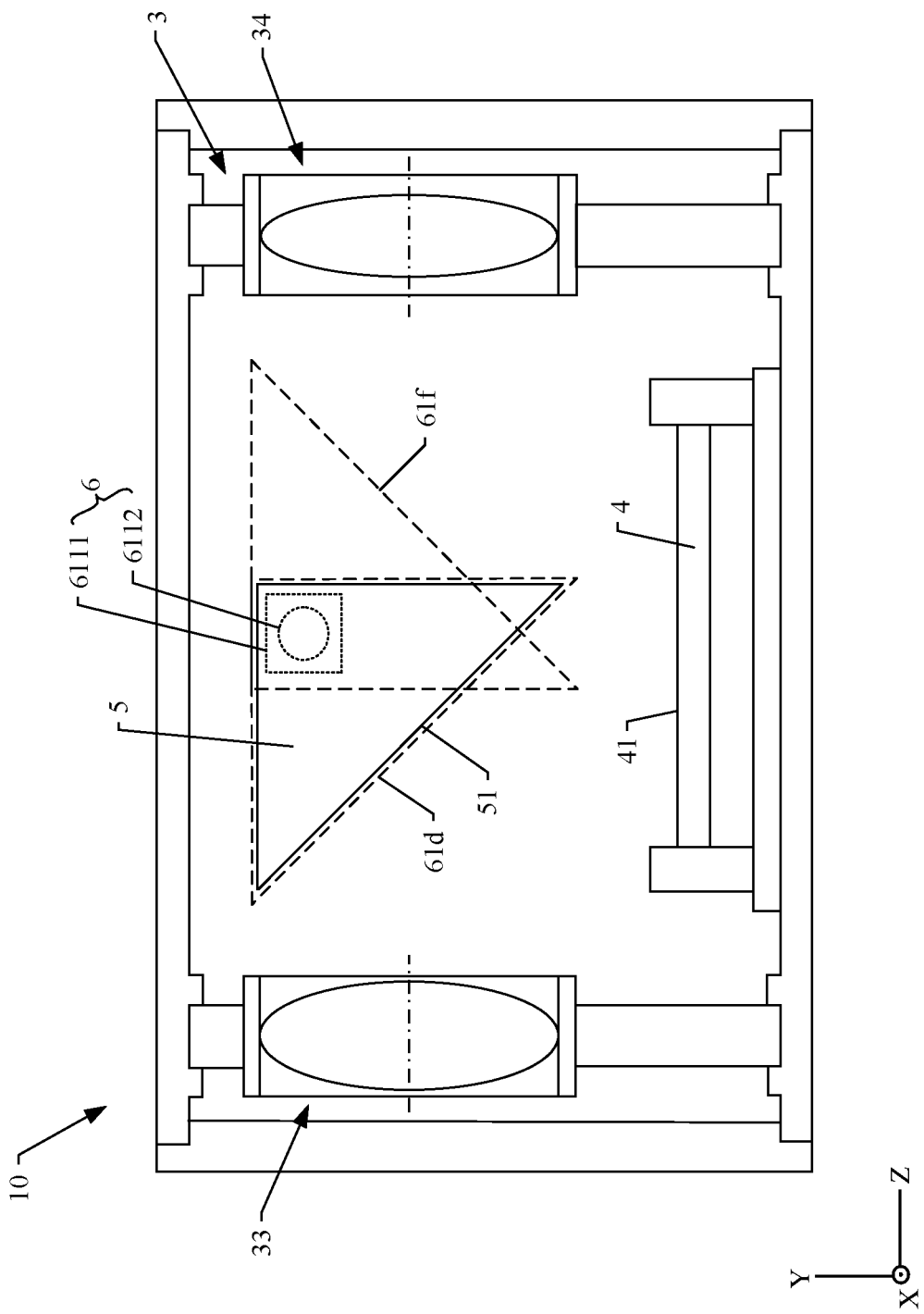
FIG. 36 is a schematic diagram of an internal structure of a camera module of the electronic device shown in FIG. 35.
Figure 37:
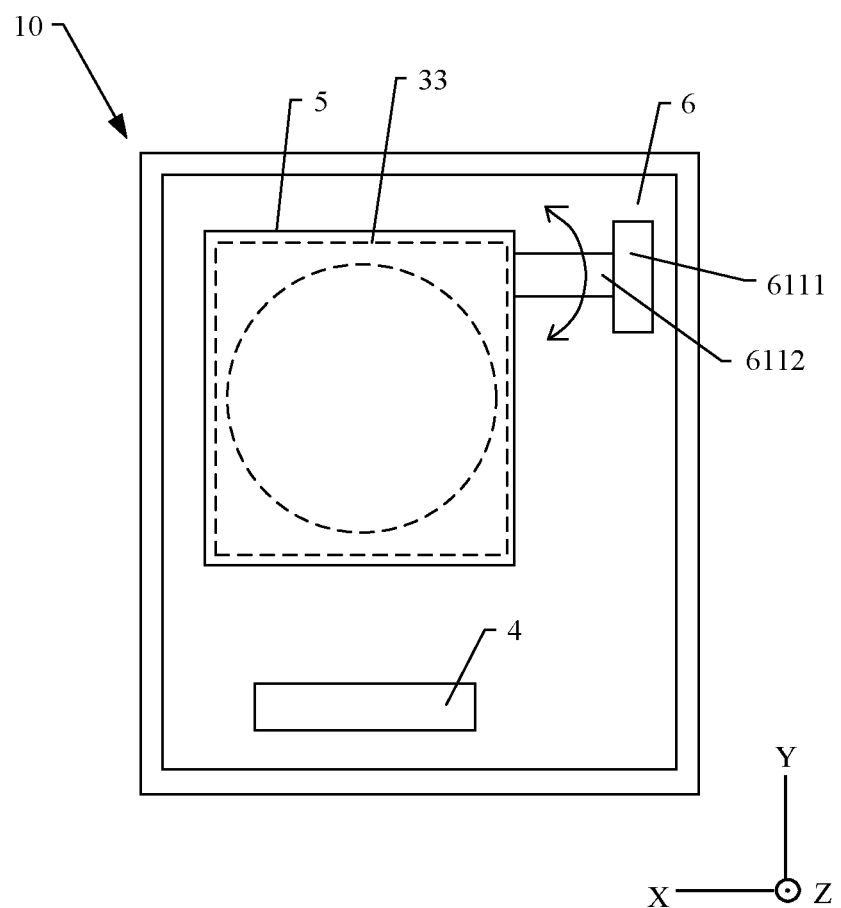
FIG. 37 is a schematic structural diagram of the structure shown in FIG. 36 from another perspective.

Refer to FIG. 36 and FIG. 37 together. FIG. 36 is a schematic diagram of an internal structure of a camera module 10 of the electronic device 100 shown in FIG. 35. FIG. 37 is a schematic structural diagram of the structure shown in FIG. 36 from another perspective.

The plurality of lenses are arranged around a periphery of the reflective member 5. The driving assembly 6 is configured to drive the reflective member 5 to rotate. In an example, the first lens 33 and the second lens 34 are respectively located on two opposite sides of the reflective member 5. The driving assembly 6 can drive the reflective member 5 to rotate between two dwell positions (61d and 610 facing the two lenses (33 and 34) respectively. The dwell position 61d corresponds to the lens 33, and when the reflective member 5 is located at the dwell position 61d, the light rays focused by the lens 33 can be reflected to the image sensor 4. The dwell position 61f corresponds to the lens 34, and when the reflective member 5 is located at the dwell position 61f, the light rays focused by the lens 34 can be reflected to the image sensor 4. A direction of a rotating shaft of the reflective member 5 is perpendicular to a direction of a connection line between the first lens 33 and the second lens 34. The driving assembly 6 drives the reflective member 5 to rotate around its rotating shaft.

In this embodiment, because the incident light directions of the plurality of lenses in the lens group 3 are different, and the reflective member 5 can rotate to collect the light rays focused by different lenses, the camera module 10 can implement multi-directional shooting with more diversified shooting functions.

The driving assembly 6 includes a motor 6111 and a rotating shaft 6112. One end of the rotating shaft 6112 is connected to the motor 6111, and the other end of the rotating shaft 6112 is fixedly connected to the reflective member 5. The motor 6111 is configured to drive the rotating shaft 6112 to rotate, so as to drive the reflective member 5 to rotate. The motor 6111 is fixedly mounted on the module bracket 2.

In some embodiments, the module bracket 2 may further include a stopping plate (not shown in the figure). The rotating shaft 6112 passes through the stopping plate and is rotatably connected to the stopping plate. The rotating shaft 6112 may be connected to the stopping plate through a bearing. In this case, the stopping plate can support and restrict the rotating shaft 6112, so that the reliability of the driving assembly 6 is higher.

In some embodiments, the driving assembly 6 may further include a gear assembly (not shown in the figure). The gear assembly includes a plurality of gears that are connected to each other through meshing. One of the gears of the gear assembly is an input gear, and the input gear is fixedly connected to the motor 6111. One of the gears in the gear assembly is an output gear, and the output gear is fixedly connected to the rotating shaft 6112. The gear assembly can transmit the power of the motor 6111 to the rotating shaft

6112. By designing the quantity of teeth of the gears in the gear assembly, a ratio of an output rotational speed of the motor 6111 to a rotational speed of the rotating shaft 6112 can be adjusted, thereby reducing the output rotational speed of the motor 6111 and increasing the output torque.

It can be understood that, in this embodiment, the orientation of the reflective layer 51 of the reflective member 5 may be changed to ensure that the position of the image sensor 4 can be implemented in a plurality of manners. For example, in FIG. 36, light rays focused by the lenses (33 and 34) are reflected by the reflective layer 51 of the reflective member 5 and then transmitted on the YZ plane. The YZ plane is a plane on which the length direction Y and the thickness direction Z of the camera module 10 are located. The photosensitive surface 41 of the image sensor 4 is parallel to the XZ plane, and the XZ plane is a plane on which the width direction X and the thickness direction Z of the camera module 10 are located. In some other embodiments, light rays focused by the lenses are reflected by the reflective layer 51 of the reflective member 5 and then transmitted on the XZ plane, and the photosensitive surface 41 of the image sensor 4 is parallel to the YZ plane.

Figure 38:
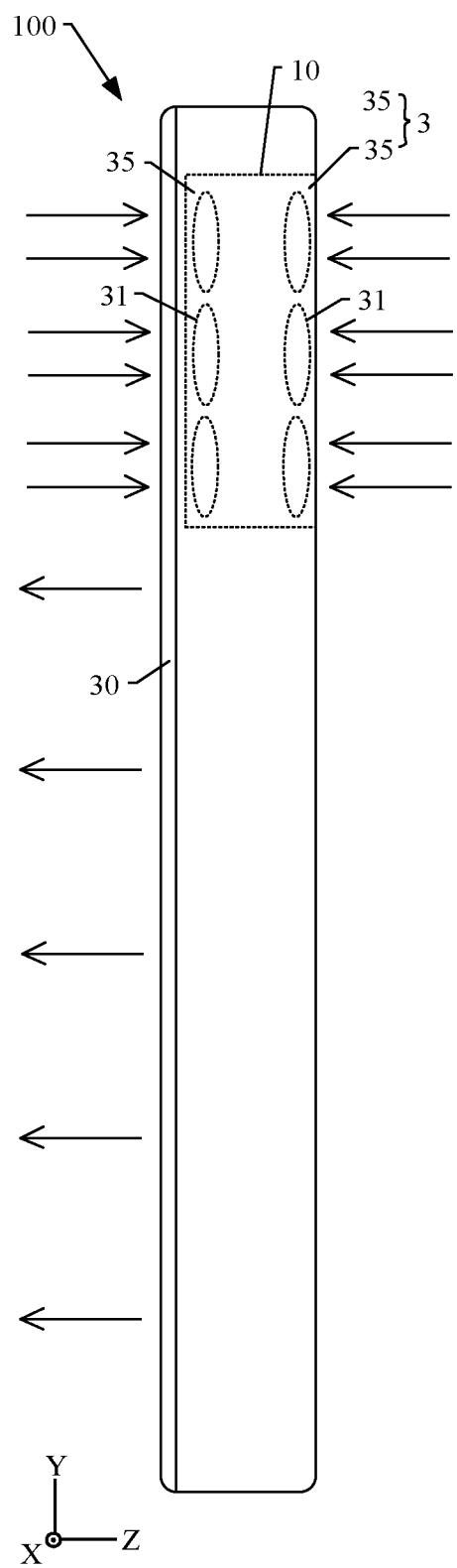
FIG. 38 is a side view of an electronic device according to still another embodiment of this application.

FIG. 38 is a side view of an electronic device 100 according to still another embodiment of this application. The following mainly describes the difference between this embodiment and the foregoing embodiment, and most of the technical content of this embodiment that is the same as the foregoing embodiment is not repeated hereinafter.

FIG. 38 illustrates still another example arrangement manner of the plurality of lenses in the lens group 3: the lens group 3 includes at least two lens subgroups 35 with different incident light directions. Each lens subgroup 35 includes a plurality of lenses 31 with the same incident light direction and different equivalent focal lengths. For the structure of the lens 31, refer to the lenses (31a, 31b, and 31c) in the embodiment of FIG. 3 described above. For the arrangement manner of the plurality of lenses 31 in each lens subgroup 35, refer to the foregoing embodiment. In this embodiment, an example in which the arrangement manner of the plurality of lenses 31 in the lens subgroup 35 is the same as that in the foregoing embodiment is used for description.

In this embodiment, one of the two lens subgroups 35 can capture an image in front of the electronic device 100, and the other lens subgroup 35 can capture an image behind the electronic device 100. That is, the lens group 3 has two shooting orientations with opposite directions. In this case, the camera module 10 can be used as a front camera of the electronic device 100, or can be used as a rear camera of the electronic device 100. In some other embodiments, there may alternatively be other design solutions for the incident light directions of the two lens subgroups 35.

In an example, the display screen 30 is provided with a light-transmitting hole or a light-transmitting part, and the camera module 10 is located below the display screen 30. One lens subgroup 35 performs shooting through the light-transmitting hole or the light-transmitting part to implement under-screen shooting. In another example, the camera module 10 takes a photo through a non-display area of the display screen 30. The display screen 30 may be a notch screen or a water drop screen. In this case, the non-display area of the display screen 30 includes a notch area or a water drop area. The display screen 30 may alternatively be a relatively regular rectangular screen. In this case, the top space or the bottom space of the display screen 30 forms a non-display area.

In an example, the back cover of the electronic device 100 is provided with a camera hole, and the other lens subgroup 35 performs shooting through the camera hole. In another example, the back cover of the electronic device 100 is provided with a light-transmitting area, the other lens subgroup 35 performs shooting through the light-transmitting area, and the back cover of the electronic device 100 can implement full-panel design.

The equivalent focal lengths of the lenses 31 in the two lens subgroups 35 may be the same or different. For example, the two lens subgroups 35 are respectively a first lens subgroup and a second lens subgroup. In an example, the quantity of lenses in the first lens subgroup is the same as the quantity of lenses in the second lens subgroup. The equivalent focal lengths of the plurality of lenses in the first lens subgroup are the same as the equivalent focal lengths of the plurality of lenses in the second lens subgroup in a one-to-one correspondence. Alternatively, the equivalent focal lengths of some of the lenses in the first lens subgroup are the same as the equivalent focal lengths of some of the lenses in the second lens subgroup in a one-to-one correspondence, and the equivalent focal lengths of the remaining lenses in the first lens subgroup are different from the equivalent focal lengths of the remaining lenses in the second lens subgroup. Alternatively, the equivalent focal lengths of the plurality of lenses in the first lens subgroup are different from the equivalent focal lengths of the plurality of lenses in the second lens subgroup. In another example, the quantity of lenses in the first lens subgroup is different from the quantity of lenses in the second lens subgroup. There are lenses with the same equivalent focal length in the first lens subgroup and the second lens subgroup, or there are lenses 31 with different equivalent focal lengths. Alternatively, all lenses in one of the first lens subgroup and the second lens subgroup and some lenses 31 in the other one of the first lens subgroup and the second lens subgroup have the same equivalent focal length, or have different equivalent focal lengths.

Figure 39:
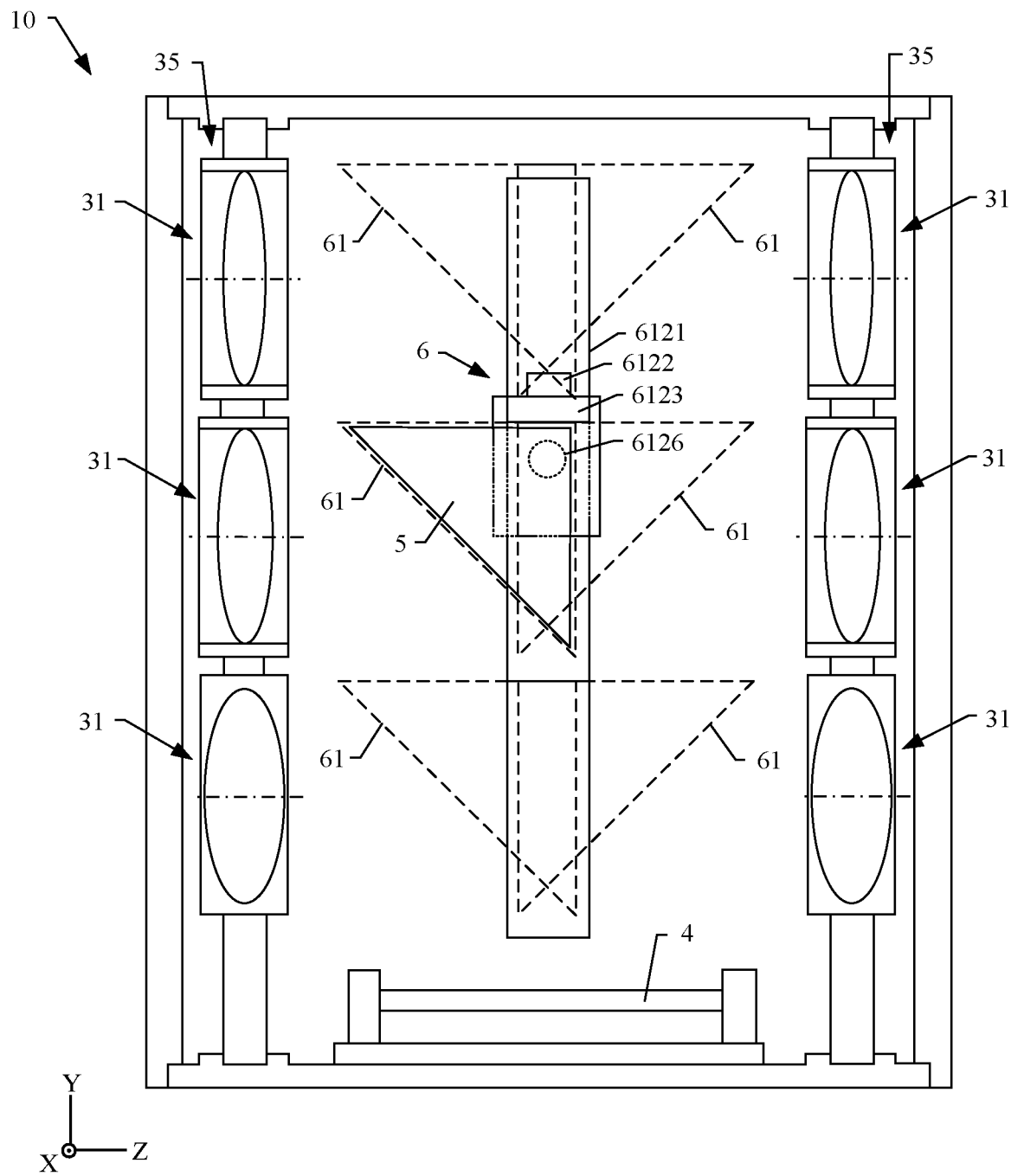
FIG. 39 is a schematic diagram of an internal structure of a camera module of the electronic device shown in FIG. 38.
Figure 40:
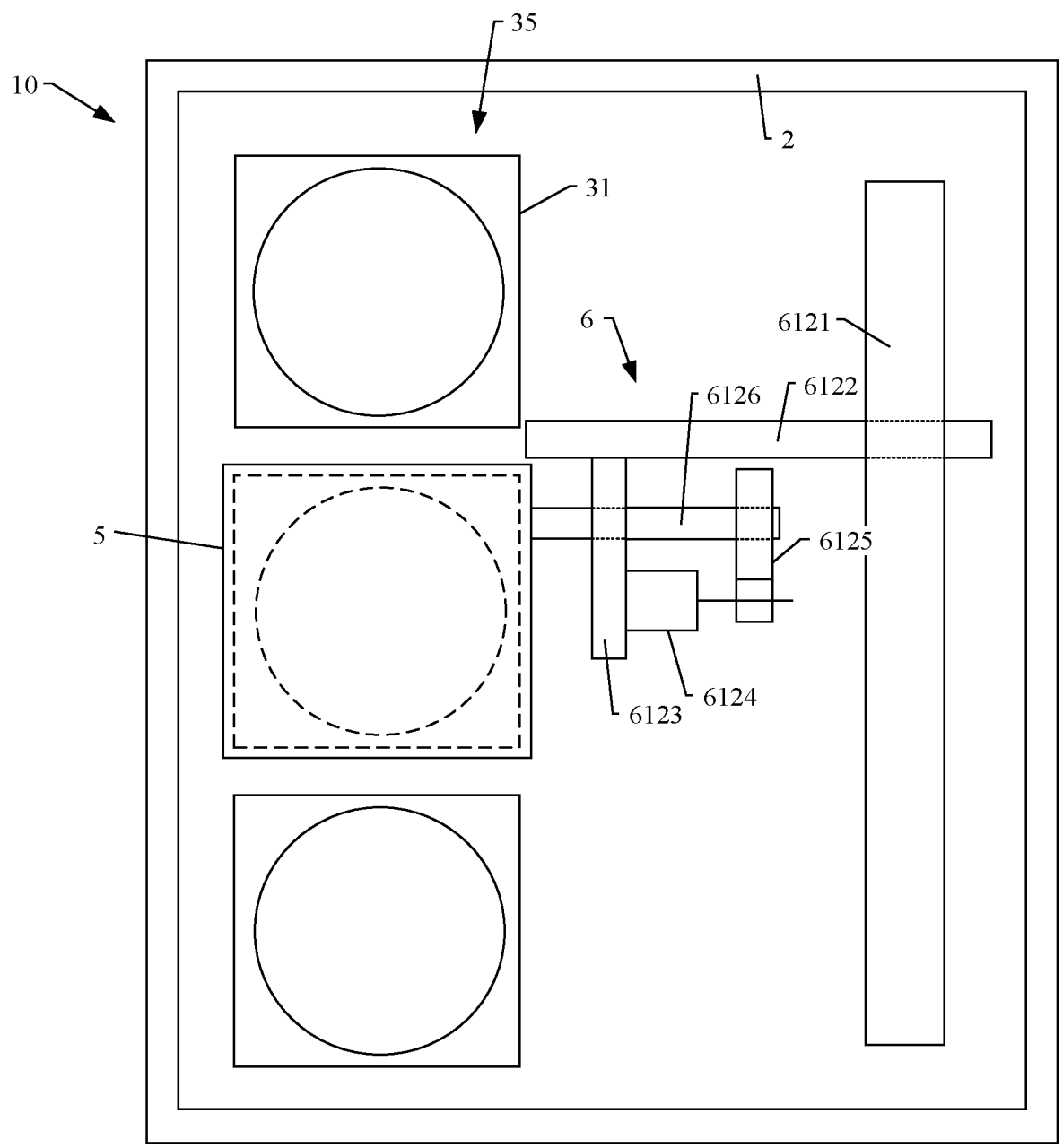
FIG. 40 is a schematic structural diagram of the structure shown in FIG. 39 from another perspective.

Refer to FIG. 39 and FIG. 40 together. FIG. 39 is a schematic diagram of an internal structure of a camera module 10 of the electronic device 100 shown in FIG. 38. FIG. 40 is a schematic structural diagram of the structure shown in FIG. 39 from another perspective.

The reflective member 5 is located between the two lens subgroups 35. The two lens subgroups 35 are arranged back to back. The driving assembly 6 is configured to drive the reflective member 5 to move and rotate. The dwell positions of the camera module 10 include two groups of dwell positions 61 corresponding to the two lens subgroups 35. The driving assembly 6 is configured to drive the reflective member 5 to rotate, so as to switch between the two groups of dwell positions 61. The driving assembly 6 is configured to drive the reflective member 5 to move, so as to switch between a plurality of dwell positions 61 in the same group of dwell positions 61. For the description of the dwell position 61, refer to the related description of the dwell position (61a, 61b, and 61c) in the embodiment of FIG. 3 described above.

In this embodiment, because the incident light directions of the two lens subgroups 35 are different, each lens subgroup 35 includes a plurality of lenses 31 with different equivalent focal lengths, and the driving assembly 6 can drive the reflective member 5 to move and rotate, so as to switch between different dwell positions 61. In this way, the image sensor 4 can receive light rays focused by each lens 31, so the camera module 10 not only can implement zoom shooting, but also can implement multi-directional shooting, making the function of the camera module 10 more diversified.

The driving assembly 6 includes a movement driving assembly 6121, a connecting rod 6122, a motor board 6123, a motor 6124, a gear assembly 6125, and a rotating shaft 6126. The movement driving assembly 6121 is mounted on the module bracket 2. One end of the connecting rod 6122 is connected to the movement driving assembly 6121, and the movement driving assembly 6121 is configured to drive the connecting rod 6122 to move. The movement driving assembly 6121 can be based on the arrangement manner of the plurality of lenses 31 in a single lens subgroup 35, and correspondingly refer to the structure of the driving assembly 6 in the foregoing embodiment. The motor board 6123 is connected to the other end of the connecting rod 6122. The motor 6124 is mounted on the motor board 6123. The rotating shaft 6126 passes through the motor board 6123 and is rotatably connected to the motor board 6123. The rotating shaft 6126 may be connected to the motor board 6123 through a bearing. In this case, the motor board 6123 can support and restrict the rotating shaft 6126, so that the reliability of the driving assembly 6 is higher. The motor 6124 is connected to one end of the rotating shaft 6126 through a gear assembly 6125. The other end of the rotating shaft 6126 is connected to the reflective member 5.

The gear assembly 6125 includes a plurality of gears that are connected to each other through meshing. One of the gears in the gear assembly 6125 is an input gear, and the input gear is fixedly connected to the motor 6124. One of the gears in the gear assembly 6125 is an output gear, and the output gear is fixedly connected to the rotating shaft 6126. The gear assembly 6125 can transmit the power of the motor 6124 to the rotating shaft 6126. By designing the quantity of teeth of the gears in the gear assembly 6125, a ratio of an output rotational speed of the motor 6124 to a rotational speed of the rotating shaft 6126 can be adjusted, thereby reducing the output rotational speed of the motor 6124 and increasing the output torque.

It can be understood that, in the foregoing embodiment, a driving assembly 6 drives a reflective member 5 to move (move and rotate), so as to meet the shooting needs of the two lens subgroups 35. In some other embodiments, a driving assembly may alternatively drive a reflective member to move, so as to meet the shooting needs of one of the lens subgroups, and another driving assembly drives another reflective member to move, so as to meet the shooting needs of another lens subgroup. In this case, there may be two image sensors, or two image sensors are combined into one image sensor with a larger area. This is not strictly limited in this embodiment of this application.

It can be understood that, in the foregoing embodiment, the housing 20 of the electronic device 100 is illustrated as an integrated structure after assembly, and the camera module 10 is fixed relative to the display screen 30 after being mounted in the housing 20. In some other embodiments, the housing 20 of the electronic device 100 includes a main housing portion and a movable housing portion. The movable housing portion is telescopically mounted on the main housing portion 201. The camera module 10 is mounted on the movable housing portion. In this case, both the display screen 30 and the back cover of the electronic device 100 can implement full-panel design. In some other embodiments, the housing 20 of the electronic device 100 may alternatively be a foldable housing. The foldable housing includes two flat plate parts and a curved part connected between the two flat plate parts. The camera module 10 may be mounted on one of the flat plate parts.

Figure 41:
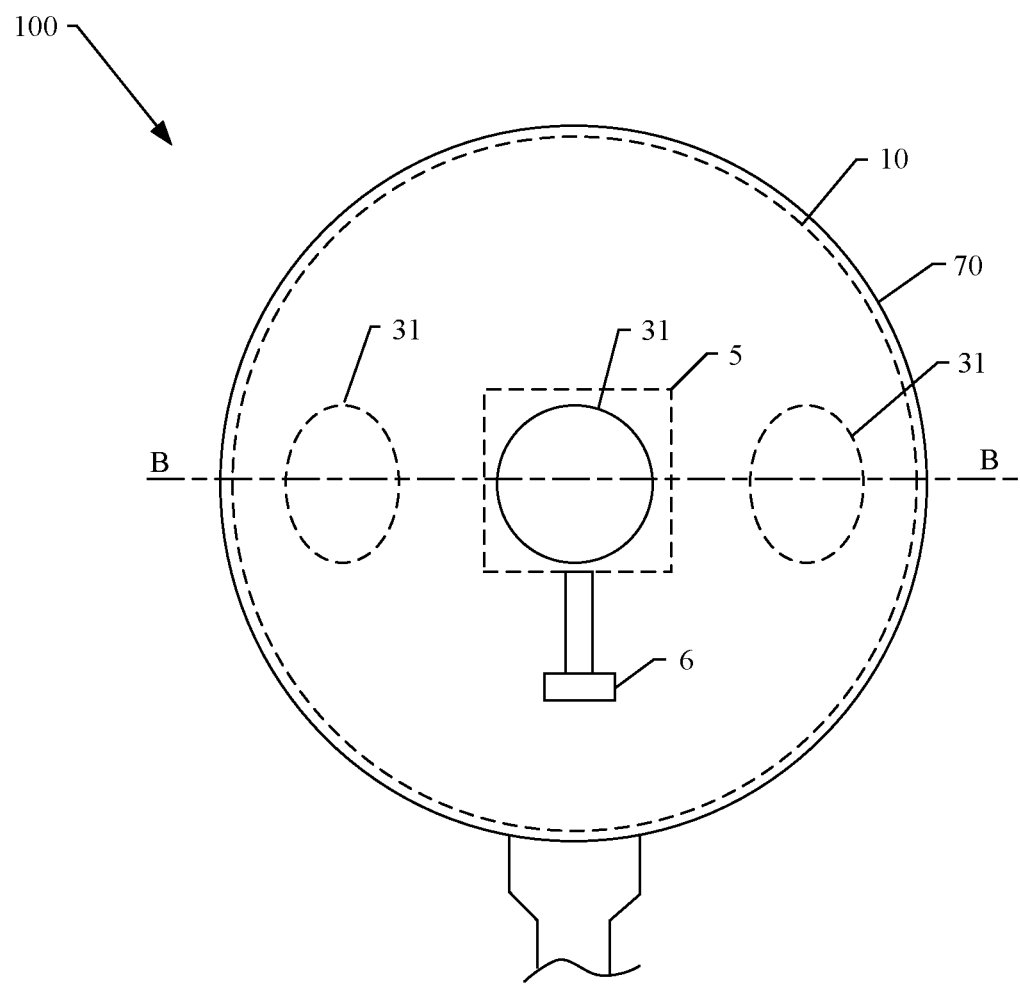
FIG. 41 is a front view of an electronic device according to still another embodiment of this application.

FIG. 41 is a front view of an electronic device 100 according to still another embodiment of this application. The following mainly describes the difference between this embodiment and the foregoing embodiment, and most of the technical content of this embodiment that is the same as the foregoing embodiment is not repeated hereinafter.

In this embodiment, an example in which the electronic device 100 is a panoramic camera is used for description. The panoramic camera may be applied to an unmanned aerial vehicle system, a deep-sea or high-altitude detection system, a monitoring system, or the like. In some other embodiments, the electronic device 100 may alternatively be a device having a plurality of shooting needs, such as an electronic eye.

The electronic device 100 includes a camera module 10 and a housing 20. The camera module 10 is mounted in the housing 70, the plurality of lenses 31 in the lens group of the camera module 10 have different incident light directions. For the structure of the lens 31, refer to the lenses (31a, 31b, and 31c) in the embodiment of FIG. 3 described above, the plurality of lenses 31 are arranged around a periphery of the reflective member 5. The driving assembly 6 is configured to drive the reflective member 5 to rotate.

In this embodiment, there are more than two lenses 31, and the lens group has more than three incident light directions. More incident light directions of the lens group lead to more shooting angles of the camera module 10 and fewer dead angles, helping implement panoramic shooting and 3D shooting.

In addition, currently in some environments (such as deep sea detection) that require a plurality of fields of view to shoot and require extreme conditions such as waterproof, dustproof, and high pressure, a conventional device that can implement circular shooting often requires the camera to move relative to the base with the change of the shooting angle, and a movable sealing apparatus is required to resist dust and water. However, even if the movable sealing apparatus is arranged, it is inevitable that leakage occurs, and the movable sealing apparatus experiences wear and aging at the moving friction part, shortening the device life of the device and reducing the reliability. However, according to the camera module 10 in this embodiment, the module bracket can completely seal other components of the camera module 10 inside the module bracket from the outside. The lens group does not need to be moved, but zooming is implemented through the rotation of the reflective member 5 located inside the module bracket, significantly improving the air-tightness of the camera module 10. The camera module 10 features a long service life and high reliability, and may be applied to an environment that requires extreme conditions such as waterproof, dustproof, and high pressure.

In some embodiments, the plurality of lenses 31 may include at least two lenses with different equivalent focal lengths. In some other embodiments, the equivalent focal lengths of the plurality of lenses 31 are the same.

Figure 42:
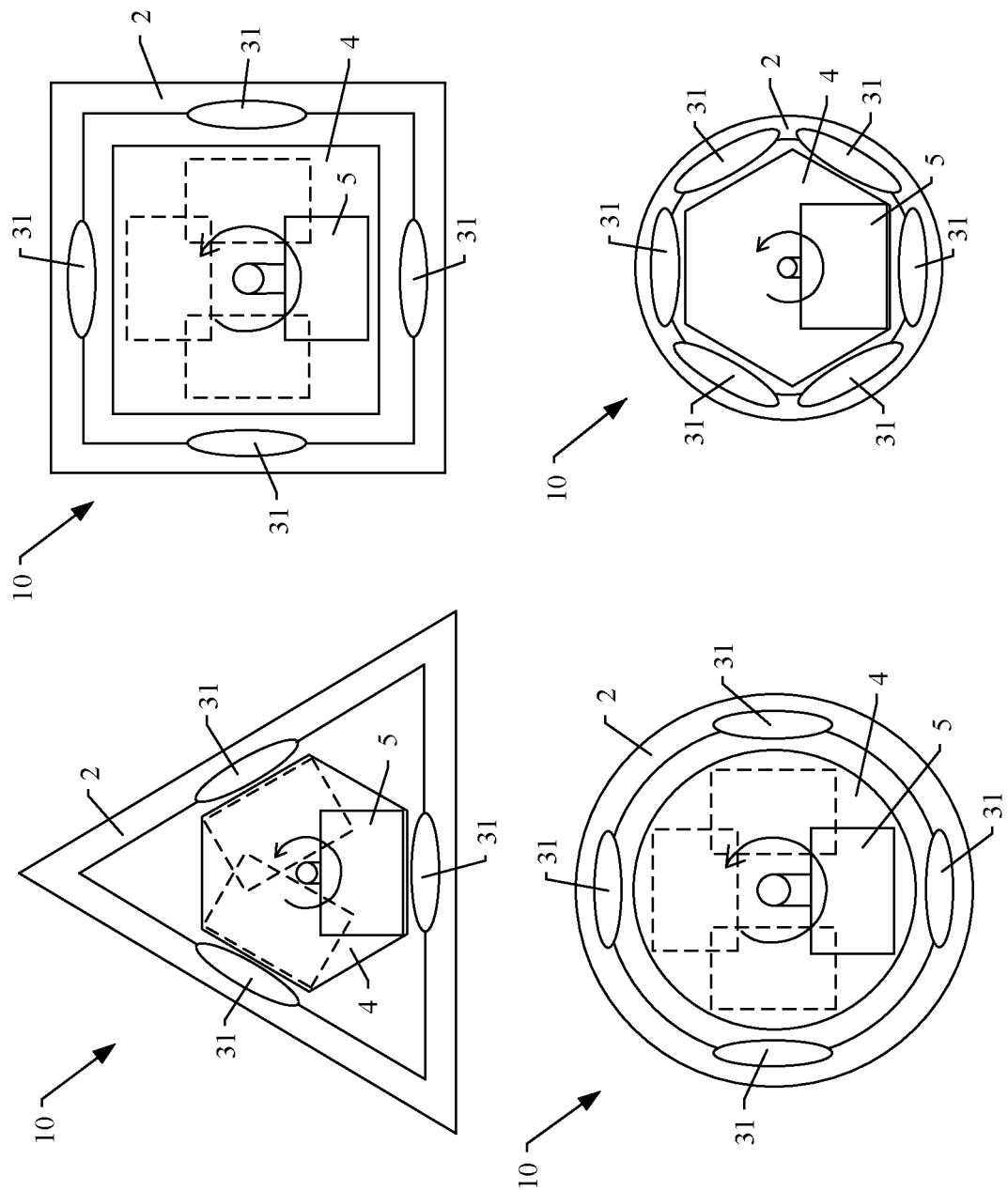
FIG. 42 is a schematic structural diagram of a camera module of the electronic device shown in FIG. 41 in some embodiments.

FIG. 42 is a schematic structural diagram of a camera module 10 of the electronic device 100 shown in FIG. 41 in some embodiments. A plane on which the diagram of FIG. 42 is located corresponds to a position of the B-B line in FIG. 41.

As shown in FIG. 42, in some embodiments, the module bracket 2 of the camera module 10 may be in the shape of a triangular prism as a whole or partially in the shape of a triangular prism, and the three lenses 31 in the lens group are respectively mounted on three sides of the triangular prism.

The camera module 10 has three shooting angles. The reflective member 5 is rotatably located at the centers of the three lenses 31.

In some other embodiments, the module bracket 2 of the camera module 10 may be in the shape of a cuboid as a whole or partially in the shape of a cuboid, and the four lenses 31 in the lens group are respectively mounted on four sides of the cuboid. The camera module 10 has four shooting angles. The reflective member 5 is rotatably located at the centers of the four lenses 31.

In still some embodiments, the module bracket 2 of the camera module 10 may be in the shape of a cylinder as a whole or partially in the shape of a cylinder, and a plurality of lenses 31 (for example, four or six lenses shown in the figure) in the lens group may be evenly arranged on a peripheral face of the cylinder. The reflective member 5 is rotatably located at the centers of the plurality of lenses 31.

In some other embodiments, the module bracket 2 of the camera module 10 may have other shapes, such as a hexagonal column shape and an elliptical column shape, and the plurality of lenses 31 in the lens group may alternatively have other arrangement structures. This is not strictly limited in this application.

In other embodiments, a plurality of lenses 31 may alternatively be arranged on each side of the module bracket 2 of the camera module 10, and the arrangement manner of the plurality of lenses 31 is not strictly limited. For example, the lens group 3 includes at least two lens subgroups with different incident light directions, each lens subgroup includes a plurality of lenses 31 with the same incident light direction and different equivalent focal lengths, and the reflective member 5 is located between the two lens subgroups. The driving assembly is configured to drive the reflective member 5 to move and rotate. The specific structure may be set with reference to the foregoing embodiments.

In this embodiment, because the lens subgroup includes a plurality of lenses 31 with the same incident light direction and different equivalent focal lengths, the camera module 10 can increase the change in focal length during the 3D shooting, and cooperate with a telephoto lens 31 to capture a distant object while obtaining shooting with different angles of view, so that the captured image of the distant object can have more detailed 3D changes.

In the foregoing embodiments, the image sensor 4 of the camera module 10 may be located in the direction of the rotating shaft of the reflective member 5, and the photosensitive surface of the image sensor 4 is substantially perpendicular to the direction of the rotating shaft of the reflective member 5.

Figure 43:
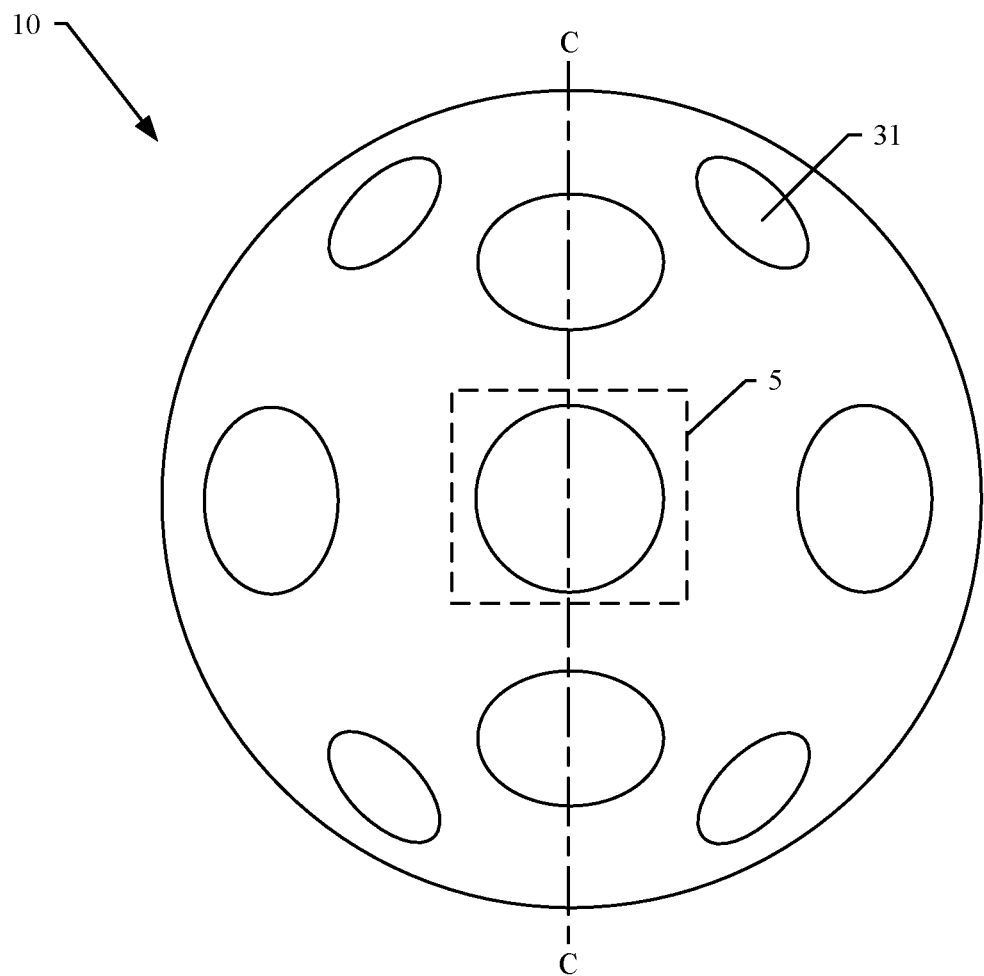
FIG. 43 is a schematic structural diagram of a camera module of the electronic device shown in FIG. 41 in some other embodiments.
Figure 44:
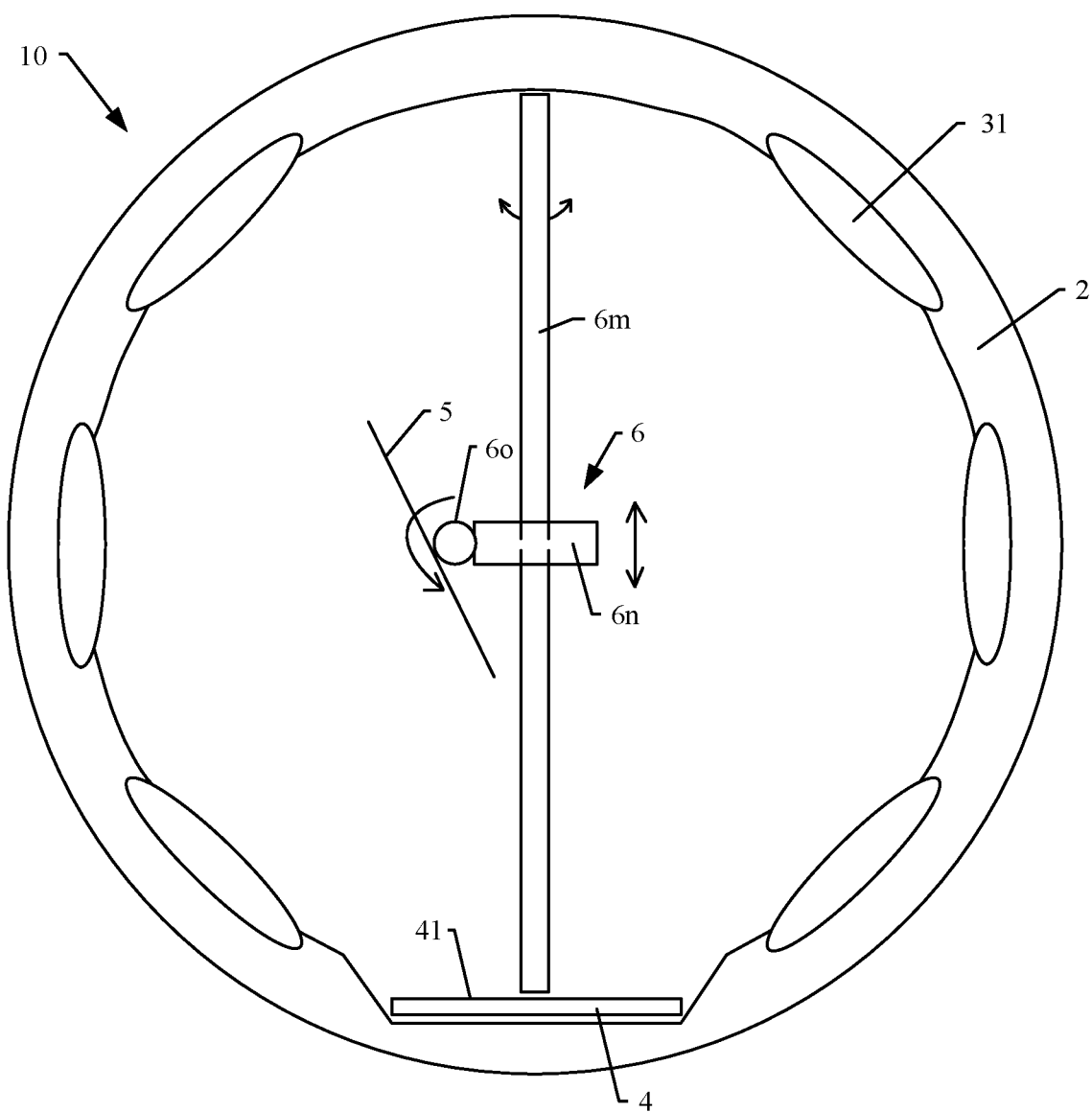
FIG. 44 is a schematic diagram of an internal structure of the camera module shown in FIG. 43.

Refer to FIG. 43 and FIG. 44 together. FIG. 43 is a schematic structural diagram of a camera module 10 of the electronic device 100 shown in FIG. 41 in some other embodiments. FIG. 44 is a schematic diagram of an internal structure of the camera module 10 shown in FIG. 43. A plane on which the diagram of FIG. 44 is located corresponds to a position of the C-C line in FIG. 43.

The plurality of lenses 31 in the lens group of the camera module 10 have different incident light directions. For the structure of the lens 31, refer to the lenses (31a, 31b, and 31c) in the embodiment of FIG. 3 described above, the plurality of lenses 31 are arranged around a periphery of the reflective member 5. The driving assembly 6 is configured to drive the reflective member 5 to rotate and move. In this embodiment, the plurality of lenses 31 of the lens group 3 may be arranged approximately in the shape of a spherical or ellipsoidal surface, so as to have more fields of view.

In some embodiments, the plurality of lenses 31 may include at least two lenses with different equivalent focal lengths. In some other embodiments, the equivalent focal lengths of the plurality of lenses 31 are the same.

In an example, as shown in FIG. 44, the image sensor 4 is mounted at the bottom of the module bracket 2. The driving assembly 6 includes a rotating shaft mechanism 6m, a slider mechanism 6n, and a reflective member rotating mechanism 6o. The rotating shaft mechanism 6m includes a rotating shaft and a first driving member. The extending direction of the rotating shaft is perpendicular to the photosensitive surface 41 of the image sensor 4, and the first driving member is configured to drive the rotating shaft to rotate. The slider mechanism 6n includes a slider and a second driving member, the slider is sleeved on the outer side of the rotating shaft, and the second driving member is configured to drive the slider to slide in a direction perpendicular to the photosensitive surface 41 of the image sensor 4 relative to the rotating shaft. The reflective member rotating mechanism 6o includes a rotating hinge and a third driving member. The rotating hinge connects the reflective member 5 and the slider, and the third driving member is configured to drive the reflective member 5 to rotate relative to the slider. In this embodiment, the driving assembly 6 can drive the reflective member 5 to switch between a plurality of dwell positions corresponding to the plurality of lenses 31, so that the camera module 10 implements zooming.

In the foregoing embodiment of this application, that the driving assembly drives the reflective member to switch between a plurality of dwell positions is described using an example in which the position adjustment of the reflective member by the driving assembly is step-wise adjustment. In some other embodiments, the adjustment of the reflective member by the driving assembly may alternatively be stepless adjustment. In addition to being able to stay on the foregoing plurality of dwell positions, the reflective member can alternatively stay between adjacent dwell positions. In this case, light rays focused by the lenses corresponding to one or more dwell positions adjacent to the current dwell position of the reflective member can be reflected by the reflective member to the image sensor. In this way, the shooting modes of the camera module are more diversified, improving the user's shooting experience.

In the foregoing embodiments of this application, the camera module includes a movable reflective member and a plurality of lenses. The driving assembly drives the reflective member to move, so as to change the position of the reflective member. The reflective member can reflect the light rays focused by at least one of the plurality of lenses to the image sensor, thereby not only meeting a variety of shooting needs, but also reducing the costs of the camera module.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. The embodiments of this application and the features in the embodiments can be combined with each other provided that there is no conflict. Therefore, the protection scope of this application shall be subject to the protection scope of the claims.

It should be noted that a part of this patent application document contains content protected by copyright. Except for making copies of the patent documents or the content of the recorded patent documents of the Patent Office, the copyright owner reserves the copyright.

What is claimed is:

1. A camera module, comprising:
a lens group comprising a plurality of lenses, wherein the plurality of lenses are fixed in the camera module;
an image sensor coupled to the lens group;
a reflective member configured to selectively reflect light rays focused by each of the plurality of lenses to the image sensor;
a driving assembly configured to drive the reflective member to move;
a fixing frame fixedly connected to the driving assembly, the fixing frame comprising a first arm and a second arm, wherein an included angle is formed between the first arm and the second arm; and
an anti-shake assembly connected to the fixing frame and the reflective member, wherein the anti-shake assembly is configured to enable the reflective member to rotate relative to the fixing frame,
wherein the reflective member is a triangular prism body that comprises:
a first side edge;
a first surface that is connected to the first side edge and that faces the first arm; and
a second surface that is connected to the first side edge and that faces the second arm, and
wherein the anti-shake assembly comprises:
a spherical hinge connected between the first side edge and the fixing frame;
a first set of magnetic attracting parts connected between the first surface and the first arm; and
a second set of magnetic attracting parts connected between the second surface and the second arm.

2. The camera module of claim 1, wherein the reflective member can be in one of a plurality of dwell positions, wherein the plurality of dwell positions are arranged in a one-to-one correspondence with the plurality of lenses, and wherein the driving assembly is configured to drive the reflective member to switch between the plurality of dwell positions.

3. The camera module of claim 2, wherein incident light directions of the plurality of lenses are the same, wherein equivalent focal lengths of the plurality of lenses are different, the plurality of lenses are arranged in a straight line, and wherein a moving direction of the reflective member is parallel to an arrangement direction of the plurality of lenses.

4. The camera module of claim 3, wherein the driving assembly comprises a motor, a lead screw, and a nut that is sleeved on an outer side of the lead screw and is threadedly connected to the lead screw, wherein the reflective member is fixedly connected to the nut, and wherein the motor is configured to drive the lead screw to rotate, so as to drive the reflective member to move between a plurality of dwell positions through the nut.

5. The camera module of claim 2, wherein incident light directions of the plurality of lenses are the same, wherein equivalent focal lengths of the plurality of lenses are different, wherein the plurality of lenses are in a triangular arrangement, an array arrangement, or an annular arrangement, and wherein the driving assembly is configured to drive the reflective member to move and rotate.

6. The camera module of claim 5, wherein the driving assembly comprises a first driving part, a second driving part, and a third driving part; wherein the first driving part is configured to drive the reflective member to move in a first direction; wherein the second driving part is configured to drive the reflective member to move in a second direction that is perpendicular to the first direction; and wherein the third driving part is configured to drive the reflective member to rotate in a third direction that is perpendicular to the first direction and the second direction, and that is parallel to the incident light direction of the plurality of lenses.

7. The camera module of claim 2, wherein incident light directions of the plurality of lenses are different, wherein the plurality of lenses are arranged around a periphery of the reflective member, and wherein the driving assembly is configured to drive the reflective member to rotate, or the driving assembly is configured to drive the reflective member to rotate and move.

8. The camera module of claim 7, wherein the plurality of lenses comprises a first lens and a second lens, wherein the first lens and the second lens are arranged back to back and have opposite incident light directions, and wherein a direction of a rotating shaft of the reflective member is perpendicular to a direction of a connection line between the first lens and the second lens.

9. The camera module of claim 2, wherein the lens group comprises at least two lens subgroups with different incident light directions, wherein each lens subgroup comprises a plurality of lenses with the same incident light direction and different equivalent focal lengths, wherein the reflective member is located between the two lens subgroups, and wherein the driving assembly is configured to drive the reflective member to move and rotate.

10. The camera module of claim 9, wherein the plurality of lenses in the same lens subgroup are in one of the following four arrangements: a linear arrangement, a triangular arrangement, an array arrangement, or an annular arrangement.

11. The camera module of claim 1, wherein a photosensitive surface of the image sensor is perpendicular to an equivalent center plane of each lens in the lens group, and the equivalent center plane of the lens is a plane on which a diameter of an equivalent optical center passing through the lens is located.

12. The camera module of claim 11, wherein the reflective member comprises a reflective layer for reflecting light, and an included angle between the reflective layer and a main optical axis of the lens corresponding to the reflective member is 45°; and wherein the lens group comprises a reference lens, and a minimum width A of the reflective layer meets the following:

$$A \geq \sqrt{2} \cdot B(B+C)(C-E)/B^2 + C^2,$$

in which B represents a radius of the reference lens, C represents an equivalent focal length of the reference lens, and E represents a minimum distance between the equivalent center plane of the reference lens and the reflective layer.

13. The camera module of claim 12, wherein the reflective member further comprises a substrate in one of the following two arrangements:
the reflective layer is formed on a side surface of the substrate facing the lens corresponding to the reflective member; or
the substrate is made of a transparent material and comprises a first side surface, a second side surface, and a third side surface, wherein the first side surface faces the lens corresponding to the reflective member, wherein the second side surface faces the image sensor, and wherein the reflective layer is formed on the third side surface and is configured to reflect light entering the substrate from the first side surface to the second side surface.

14. The camera module of claim 1, wherein a photosensitive surface of the image sensor is parallel to an equivalent center plane of each lens in the lens group, and the equivalent center plane of the lens is a plane on which a diameter of an equivalent optical center passing through the lens is located; and the camera module further comprises a reflecting member that is configured to reflect, to the image sensor, light reflected by the reflective member.

15. An electronic device, comprising:
a housing; and
a camera module mounted on the housing, wherein the camera module comprises:
  a lens group comprising a plurality of lenses, wherein the plurality of lenses are fixed in the camera module;
  an image sensor coupled to the lens group;
  a reflective member configured to selectively reflect light rays focused by each of the plurality of lenses to the image sensor;
  a driving assembly configured to drive the reflective member to move;
  a fixing frame fixedly connected to the driving assembly, the fixing frame comprising a first arm and a second arm, wherein an included angle is formed between the first arm and the second arm; and
  an anti-shake assembly connected to the fixing frame and the reflective member, wherein the anti-shake assembly is configured to enable the reflective member to rotate relative to the fixing frame,
wherein the reflective member is a triangular prism body that comprises:
  a first side edge;
  a first surface that is connected to the first side edge and that faces the first arm; and
  a second surface that is connected to the first side edge and that faces the second arm, and
wherein the anti-shake assembly comprises:
  a spherical hinge connected between the first side edge and the fixing frame;
  a first set of magnetic attracting parts connected between the first surface and the first arm; and
  a second set of magnetic attracting parts connected between the second surface and the second arm.

16. The electronic device of claim 15, wherein the reflective member can be in one of a plurality of dwell positions, wherein the plurality of dwell positions are arranged in a one-to-one correspondence with the plurality of lenses, and wherein the driving assembly is configured to drive the reflective member to switch between the plurality of dwell positions.

17. The camera module of claim 1, wherein the plurality of lenses are arranged in a straight line in a width direction of the camera module, a length direction of the camera module, or a combination thereof.

18. The camera module of claim 1, wherein the plurality of lenses are arranged in a straight line that is perpendicular to an optical axis of one of the lenses.

19. The electronic device of claim 15, wherein the plurality of lenses are arranged in a straight line in a width direction of the camera module, a length direction of the camera module, or a combination thereof.

20. The electronic device of claim 15, wherein the plurality of lenses are arranged in a straight line that is perpendicular to an optical axis of one of the lenses.

* * * * *